United States Patent
Mead et al.

(10) Patent No.: US 12,324,072 B2
(45) Date of Patent: Jun. 3, 2025

(54) ENVIRONMENT OPTIMIZATION FOR SPACE BASED ON PRESENCE AND ACTIVITIES

(71) Applicant: STEELCASE INC., Grand Rapids, MI (US)

(72) Inventors: Karl J. Mead, Grand Rapids, MI (US); Hyun Yoo, Grand Rapids, MI (US); Cherie Johnson, East Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 18/627,601

(22) Filed: Apr. 5, 2024

(65) Prior Publication Data
US 2024/0251495 A1 Jul. 25, 2024

Related U.S. Application Data

(63) Continuation of application No. 17/528,835, filed on Nov. 17, 2021, now Pat. No. 11,979,959, which is a
(Continued)

(51) Int. Cl.
*H05B 47/155* (2020.01)
*G05B 15/02* (2006.01)
(Continued)

(52) U.S. Cl.
CPC .......... *H05B 47/155* (2020.01); *G05B 15/02* (2013.01); *G05B 19/042* (2013.01); *H05B 45/20* (2020.01);
(Continued)

(58) Field of Classification Search
CPC .... G05B 15/02; H05B 47/155; H05B 47/115; H05B 45/20; H05B 47/19; H05B 47/16
See application file for complete search history.

(56) References Cited

U.S. PATENT DOCUMENTS 4,751,399 A 6/1988 Koehring
5,050,077 A 9/1991 Vincent
(Continued)

FOREIGN PATENT DOCUMENTS

AU 2011203137 A1 7/2011
AU 2013203919 A1 5/2013
(Continued)

OTHER PUBLICATIONS

Ah Kun et al., Co-Present Photo Sharing on Mobile Devices, 9th International Conference on Human Computer Interaction with Mobile Devices and Services (MobileHCI'07), 2007, pp. 277-284.
(Continued)

*Primary Examiner* — Abbas I Abdulselam
(74) *Attorney, Agent, or Firm* — Quarles & Brady LLP

(57) ABSTRACT

A method for facilitating space experiences for at least a first space user and for at least first and second different spaces, the method comprising the steps of storing first and second space experience specifications for the first and second different spaces, respectively, wherein the first and second space experience specifications indicate space affordance settings for the first and second spaces, respectively, sensing a trigger event associated with at least one of the first and second different spaces, where the sensed trigger event is associated with the first space, using the first space experience specification to control the first space affordances and where the sensed trigger event is associated with the second space, using the second space experience specification to control the second space affordances.

20 Claims, 37 Drawing Sheets

Related U.S. Application Data continuation of application No. 16/704,436, filed on Dec. 5, 2019, now Pat. No. 11,212,898, which is a continuation of application No. 16/041,199, filed on Jul. 20, 2018, now Pat. No. 10,561,006, which is a continuation of application No. 15/458,376, filed on Mar. 14, 2017, now Pat. No. 10,057,963, which is a continuation of application No. 15/184,225, filed on Jun. 16, 2016, now Pat. No. 9,642,219, which is a continuation of application No. 14/730,996, filed on Jun. 4, 2015, now Pat. No. 9,380,682.

(60) Provisional application No. 62/008,283, filed on Jun. 5, 2014.

(51) Int. Cl.
*G05B 19/042* (2006.01)
*H05B 45/20* (2020.01)
*H05B 47/115* (2020.01)
*H05B 47/16* (2020.01)
*H05B 47/19* (2020.01)
*H05B 47/125* (2020.01)

(52) U.S. Cl.
CPC ........... *H05B 47/115* (2020.01); *H05B 47/16* (2020.01); *H05B 47/19* (2020.01); *G05B 2219/2664* (2013.01); *H05B 47/125* (2020.01)

(56) References Cited

U.S. PATENT DOCUMENTS

| | | | |
|---|---|---|---|
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,570,301 A | 10/1996 | Barrus |
| 5,717,856 A | 2/1998 | Carleton |
| 5,872,924 A | 2/1999 | Nakayama |
| 5,898,579 A | 4/1999 | Boys |
| 5,915,091 A | 6/1999 | Ludwig |
| 5,933,597 A | 8/1999 | Hogan |
| 6,038,542 A | 3/2000 | Ruckdashel |
| 6,064,976 A | 5/2000 | Tolopka |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,293,243 B1 | 11/2007 | Ben-Shachar |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,873,470 B2 | 1/2011 | Baba |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |

(56) References Cited

U.S. PATENT DOCUMENTS

| | | |
|---|---|---|
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,049,301 B2 | 11/2011 | Hui |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| 8,073,614 B2 | 12/2011 | Coughlin |
| 8,076,800 B2 | 12/2011 | Joannopoulos |
| 8,076,801 B2 | 12/2011 | Karalis |
| 8,081,083 B2 | 12/2011 | Hinterlong |
| 8,084,889 B2 | 12/2011 | Joannopoulos |
| 8,091,029 B1 | 1/2012 | Gay |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,214,061 B2 | 7/2012 | Westrick, Jr. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |

(56) References Cited

U.S. PATENT DOCUMENTS

| | | |
|---|---|---|
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| D692,010 S | 10/2013 | Verghese |
| 8,552,592 B2 | 10/2013 | Schatz |
| 8,554,476 B2 | 10/2013 | Coughlin |
| 8,554,477 B2 | 10/2013 | Coughlin |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,596,716 B1 | 12/2013 | Caruso |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,670,018 B2 | 3/2014 | Cunnington |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,737,950 B2 | 5/2014 | Jonsson |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,792,912 B2 | 7/2014 | Gits |
| 8,797,159 B2 | 8/2014 | Kirkpatrick |
| 8,810,379 B2 | 8/2014 | Murphy |
| 8,812,028 B2 * | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,884,742 B2 | 11/2014 | Gits |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 9,098,502 B1 | 8/2015 | Horling |
| 9,140,555 B1 | 9/2015 | Andersson |
| 9,176,214 B2 | 11/2015 | Berrett et al. |
| 9,204,251 B1 | 12/2015 | Mendelson |
| 9,247,828 B2 | 2/2016 | Cvek |
| 9,339,106 B2 | 5/2016 | Epstein |
| 9,380,682 B2 | 6/2016 | Mead |
| 9,465,524 B2 | 10/2016 | Epstein |
| 9,642,219 B2 | 5/2017 | Mead |
| 9,703,274 B2 | 7/2017 | Li |
| 9,716,861 B1 | 7/2017 | Poel |
| 9,766,079 B1 | 9/2017 | Poel |
| 9,804,731 B1 * | 10/2017 | Baloga ............ G06F 3/04847 |
| 9,852,388 B1 | 12/2017 | Swieter |
| 9,871,978 B1 | 1/2018 | Epstein |
| 9,877,266 B1 | 1/2018 | Knas |
| 9,921,726 B1 | 3/2018 | Sculley |
| 9,955,316 B2 | 4/2018 | Jampani |
| 9,955,318 B1 | 4/2018 | Scheper |
| 9,980,112 B1 | 5/2018 | Newby |
| 10,021,530 B2 | 7/2018 | Sigal |

(56) References Cited

U.S. PATENT DOCUMENTS

| | | |
|---|---|---|
| 10,038,952 B2 | 7/2018 | Labrosse |
| 10,044,871 B2 | 8/2018 | Bargetzi |
| 10,057,963 B2 | 8/2018 | Mead |
| 10,121,113 B1 | 11/2018 | Swieter et al. |
| 10,161,752 B1 | 12/2018 | Poel |
| 10,225,707 B1 | 3/2019 | Scheper |
| 10,353,664 B2 | 7/2019 | Poel |
| 10,433,646 B1 | 10/2019 | Schmidt et al. |
| 10,459,611 B1 | 10/2019 | Sculley et al. |
| 10,561,006 B2 | 2/2020 | Mead et al. |
| 10,614,694 B1 | 4/2020 | Zwier et al. |
| 10,634,503 B2 | 4/2020 | Hill |
| 10,664,772 B1 | 5/2020 | Poel |
| 10,733,371 B1 | 8/2020 | Baloga |
| 10,860,954 B1 | 12/2020 | Yeluguri |
| 10,970,662 B2 | 4/2021 | Swieter |
| 11,085,771 B1 | 8/2021 | Scheper |
| 11,100,282 B1 | 8/2021 | Baloga |
| 11,143,510 B1 | 10/2021 | Poel |
| 11,150,859 B2 | 10/2021 | Poel |
| 11,168,987 B2 | 11/2021 | Poel |
| 11,212,898 B2 | 12/2021 | Mead |
| 11,280,619 B1 | 3/2022 | Scheper |
| 11,307,037 B1 | 4/2022 | Scheper |
| 11,321,643 B1 | 5/2022 | Poel |
| 11,330,647 B2 | 5/2022 | Sculley |
| 11,402,216 B1 | 8/2022 | Scheper |
| 11,402,217 B1 | 8/2022 | Scheper |
| 11,687,854 B1 | 6/2023 | Swieter |
| 11,690,111 B1 | 6/2023 | Sculley |
| 11,713,969 B1 | 8/2023 | Poel |
| 11,744,376 B2 | 9/2023 | Schmidt |
| 11,956,838 B1 | 4/2024 | Sculley |
| 2001/0051885 A1 | 12/2001 | Nardulli |
| 2002/0015097 A1 | 2/2002 | Martens |
| 2002/0130834 A1 | 9/2002 | Madarasz |
| 2003/0097284 A1 | 5/2003 | Shinozaki |
| 2003/0103075 A1 | 6/2003 | Rosselot |
| 2003/0107498 A1 | 6/2003 | Drennan |
| 2003/0218537 A1 | 11/2003 | Hoch |
| 2004/0001095 A1 | 1/2004 | Marques |
| 2004/0015401 A1 | 1/2004 | Lee et al. |
| 2004/0051644 A1 | 3/2004 | Tamayama |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2004/0261013 A1 | 12/2004 | Wynn |
| 2005/0018826 A1 | 1/2005 | Benco |
| 2005/0027581 A1 | 2/2005 | Kjesbu |
| 2005/0071213 A1 | 3/2005 | Kumhyr |
| 2005/0144259 A1 | 6/2005 | Buckley |
| 2005/0160368 A1 | 7/2005 | Liu |
| 2005/0197877 A1 | 9/2005 | Kalinoski |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0021363 A1 | 2/2006 | Mizukoshi |
| 2006/0026502 A1 | 2/2006 | Dutta |
| 2006/0045107 A1 | 3/2006 | Kucenas |
| 2006/0080007 A1 | 4/2006 | Gerard |
| 2006/0080432 A1 | 4/2006 | Spataro |
| 2006/0168618 A1 | 7/2006 | Choi |
| 2006/0218027 A1 | 9/2006 | Carrion |
| 2007/0008181 A1 | 1/2007 | Rollert |
| 2007/0094065 A1 | 4/2007 | Wu |
| 2007/0118415 A1 | 5/2007 | Chen |
| 2007/0136095 A1 | 6/2007 | Weinstein |
| 2007/0162315 A1 | 7/2007 | Hodges |
| 2007/0197239 A1 | 8/2007 | Sane |
| 2007/0198744 A1 | 8/2007 | Wensley |
| 2007/0216131 A1 | 9/2007 | Potappel |
| 2007/0226034 A1 | 9/2007 | Khan |
| 2007/0282661 A1 | 12/2007 | Franco |
| 2007/0288291 A1 | 12/2007 | Earle |
| 2008/0028323 A1 | 1/2008 | Rosen |
| 2008/0091503 A1 | 4/2008 | Schirmer |
| 2008/0120370 A1 | 5/2008 | Chan |
| 2008/0122635 A1 | 5/2008 | Fujikawa |
| 2008/0162198 A1 | 7/2008 | Jabbour |
| 2008/0184115 A1 | 7/2008 | Back |
| 2008/0201664 A1 | 8/2008 | O |
| 2008/0239994 A1 | 10/2008 | Xiong |
| 2008/0244417 A1 | 10/2008 | Simpson |
| 2008/0288355 A1 | 11/2008 | Rosen |
| 2008/0291021 A1 | 11/2008 | Bhogal |
| 2008/0300660 A1 | 12/2008 | John |
| 2009/0019367 A1 | 1/2009 | Cavagnari |
| 2009/0055234 A1 | 2/2009 | Li |
| 2009/0066486 A1 | 3/2009 | Kiekbusch |
| 2009/0094533 A1 | 4/2009 | Bozionek |
| 2009/0106567 A1 | 4/2009 | Baarman |
| 2009/0146982 A1 | 6/2009 | Thielman |
| 2009/0164581 A1 | 6/2009 | Bove |
| 2009/0210822 A1 | 8/2009 | Schindler |
| 2009/0212637 A1 | 8/2009 | Baarman |
| 2009/0265280 A1 | 10/2009 | Taneja |
| 2009/0271713 A1 | 10/2009 | Stull |
| 2009/0286556 A1 | 11/2009 | Yumoto |
| 2009/0300174 A1 | 12/2009 | Floris |
| 2009/0327227 A1 | 12/2009 | Chakra |
| 2010/0017245 A1 | 1/2010 | Kristiansen |
| 2010/0037151 A1 | 2/2010 | Ackerman |
| 2010/0070334 A1 | 3/2010 | Monteverde |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0153160 A1 | 6/2010 | Bezemer |
| 2010/0153983 A1 | 6/2010 | Philmon |
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0084804 A1 | 4/2011 | Khorashadi |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0267002 A1 | 11/2011 | Baarman |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0016678 A1 | 1/2012 | Gruber |
| 2012/0022909 A1 | 1/2012 | Ayatollahi |
| 2012/0032484 A1 | 2/2012 | Cvek |
| 2012/0032522 A1 | 2/2012 | Schatz |

(56) References Cited

U.S. PATENT DOCUMENTS

| | | |
|---|---|---|
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112668 A1 | 5/2012 | Van de Sluis |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0143639 A1 | 6/2012 | Rollert |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0216129 A1 | 8/2012 | Ng |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0229592 A1 | 9/2012 | White |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0080255 A1 | 3/2013 | Li |
| 2013/0088154 A1 | 4/2013 | Van Hoof |
| 2013/0099587 A1 | 4/2013 | Lou |
| 2013/0113249 A1 | 5/2013 | Cvek |
| 2013/0117158 A1 | 5/2013 | Cvek |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0278631 A1 | 10/2013 | Border |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0325526 A1 | 12/2013 | Tyler |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0026025 A1 | 1/2014 | Smith |
| 2014/0028112 A1 | 1/2014 | Hui |
| 2014/0032327 A1 | 1/2014 | Prakash |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0046713 A1 | 2/2014 | Harvey |
| 2014/0049118 A1 | 2/2014 | Karalis |
| 2014/0052974 A1 | 2/2014 | Masters |
| 2014/0054961 A1 | 2/2014 | Metcalf |
| 2014/0058778 A1 | 2/2014 | McLarty |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108084 A1 | 4/2014 | Bargetzi |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0149519 A1 | 5/2014 | Redfern |
| 2014/0150059 A1 | 5/2014 | Uchida |
| 2014/0159589 A1 | 6/2014 | Pandharipande |
| 2014/0159652 A1 | 6/2014 | Hall |
| 2014/0164934 A1 | 6/2014 | Yang |

(56) References Cited

U.S. PATENT DOCUMENTS

| | | |
|---|---|---|
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens |
| 2014/0223313 A1 | 8/2014 | Aebi |
| 2014/0225978 A1 | 8/2014 | Saban |
| 2014/0229578 A1 | 8/2014 | Chu |
| 2014/0236659 A1 | 8/2014 | Hapse |
| 2014/0244043 A1 | 8/2014 | Foster |
| 2014/0244678 A1 | 8/2014 | Zamer |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2014/0365568 A1 | 12/2014 | Huang |
| 2015/0005011 A1 | 1/2015 | Nehrenz |
| 2015/0012843 A1 | 1/2015 | Ouyang et al. |
| 2015/0015399 A1 | 1/2015 | Gleckler |
| 2015/0035440 A1 | 2/2015 | Spero |
| 2015/0069915 A1 | 3/2015 | Ogawa |
| 2015/0085063 A1 | 3/2015 | Fish |
| 2015/0149929 A1 | 5/2015 | Shepherd |
| 2015/0179012 A1 | 6/2015 | Sharpe |
| 2015/0193739 A1 | 7/2015 | Min |
| 2015/0195620 A1 | 7/2015 | Buchner et al. |
| 2015/0200982 A1 | 7/2015 | Velagaleti |
| 2015/0201480 A1 | 7/2015 | Ogawa |
| 2015/0229644 A1 | 8/2015 | Nozawa |
| 2015/0234468 A1 | 8/2015 | Hwang |
| 2015/0296594 A1 | 10/2015 | Blum |
| 2015/0301727 A1 | 10/2015 | Miyazawa |
| 2015/0321590 A1 | 11/2015 | Mizoi |
| 2015/0324754 A1 | 11/2015 | Bathiya |
| 2015/0330780 A1 | 11/2015 | Yuzawa |
| 2015/0369612 A1 | 12/2015 | Nishimura |
| 2015/0370272 A1 | 12/2015 | Reddy |
| 2016/0026253 A1 | 1/2016 | Bradski et al. |
| 2016/0044071 A1 | 2/2016 | Sandholm |
| 2016/0049064 A1 | 2/2016 | McNabb |
| 2016/0162844 A1 | 6/2016 | Rachuri |
| 2016/0171566 A1 | 6/2016 | Pugh |
| 2016/0231731 A1 | 8/2016 | Carver |
| 2016/0253048 A1 | 9/2016 | Silcock |
| 2016/0304013 A1 | 10/2016 | Wolas |
| 2016/0327922 A1 | 11/2016 | Sekiguchi |
| 2016/0342950 A1 | 11/2016 | Pignataro |
| 2017/0046113 A1 | 2/2017 | Noyes et al. |
| 2017/0060350 A1 | 3/2017 | Zheng et al. |
| 2017/0083275 A1 | 3/2017 | Shin |
| 2017/0208664 A1 | 7/2017 | Mead |
| 2017/0223312 A1 | 8/2017 | McNelley |
| 2017/0238401 A1 | 8/2017 | Sadwick |
| 2017/0293458 A1 | 10/2017 | Poel |
| 2017/0314803 A1 | 11/2017 | Jacobson |
| 2018/0004178 A1 | 1/2018 | Haines |
| 2018/0107444 A1 | 4/2018 | Dunn |
| 2018/0137369 A1 | 5/2018 | Roth |
| 2018/0143025 A1 | 5/2018 | Kurata |
| 2019/0004178 A1 | 1/2019 | Motoyama et al. |
| 2019/0053012 A1 | 2/2019 | Hill |
| 2019/0118838 A1 | 4/2019 | Lequio |
| 2019/0141291 A1 | 5/2019 | McNelley |
| 2019/0272141 A1 | 9/2019 | Poel |
| 2019/0294018 A1 | 9/2019 | Shrivastava |
| 2019/0370700 A1 | 12/2019 | Ludwig |
| 2020/0007921 A1 | 1/2020 | Ojala |
| 2020/0049509 A1 | 2/2020 | Hill |
| 2020/0096346 A1 | 3/2020 | Dhandapani |
| 2020/0096573 A1 | 3/2020 | Cha |
| 2020/0116493 A1 | 4/2020 | Colburn |
| 2020/0250879 A1 | 8/2020 | Foster |
| 2020/0272163 A1 | 8/2020 | Ha |
| 2021/0027208 A1 | 1/2021 | Clark |
| 2021/0392290 A1 | 12/2021 | McNelley et al. |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |
| WO | 2017142541 A1 | 8/2017 |
| WO | 2019133264 A1 | 7/2019 |

OTHER PUBLICATIONS

Cisco, WebEx Meeting Center User Guide For Hosts, Presenters, and Participants, Version 8.23, Copyright 1997-2011 Cisco and/or its affiliates.
Citrix, GoToMeeting User Guide, Copyright 2015 Citrix Systems.
Citrix, GoToWebinar User Guide, Copyright 2015 Citrix Systems.
CiviCRM Books: User and Administrator Guide for Version 4.5, Published Sep. 2014, http://book.civicrm.org/user/current/email/scheduled-reminders/.
Davis, A Careful Return: How A Global Pandemic Changed a Workplace Design Firm's Office Spaces—And Its Business Direction Toward Safety-Tech Solutions, AV Technology, 2020, 13(6), 15(3), https://dialog.proquest.com/professional/printviewfile?accountid=131444, 3 pages.
Events and Room Reserve Scheduled Task Setup for Email Notifications, Article No. 268, Apr. 22, 2013, http://kb.evanced.info/article.php?id=268.
Greenberg et al., The Notification Collage: Posting Information to Public and Personal Displays, Proceedings of the ACM Conference on Human Factors in Computing Systems, [CHI Letters 3(1)], pp. 514-521.
Join.me forum and FAQ, Apr. 3, 2014.

(56) References Cited

OTHER PUBLICATIONS

Krumm et al., The NearMe Wireless Proximity Server, UbiComp 2004, The Sixth International Conference on Ubiquitous Computing, pp. 283-300, Sep. 7-10, 2004.
Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.
Lomas et al., Collaboration Tools, Educause Learning Initiative, 2008, 2(11):1-11.
Marrinan et al., SAGE2: A New Approach for Data Intensive Collaboration Using Scalable Resolution Shared Displays, 10th IEEE International Conference on Collaborative Computing: Networking, Applications and Worksharing, 2014, pp. 177-186.
NFS Technology Group, Rendezvous—Technology for Meeting Room, Desk Scheduling and Event Management, http://myrendezvous.net/rendezvous-event-booking-software/calendar-management/, Mar. 1, 2016, 2 pages.
Oracle Communications, Oracle Data Sheet—Calendar Server, Copyright 2015 Oracle and/or its affiliates, http://www.oracle.com/us/industries/communications/communications-calendar-server-ds-071728.pdf.
Stirworks, Inc., The Height-Adjustable, Standing Stir Kinetic Desk, http://www.stirworks.com/, Copyright 2015 Stirworks, Inc., 6 pages.
Tam et al., A Framework for Asynchronous Change Awareness in Collaborative Documents and Workspaces, International Journal of Human-Computer Studies, 2006, 64:583-598.

\* cited by examiner

720 — 722 — 724 — 726 — 700

Rest Activity Sub-Database
User XXXXX (Default Settings)

| Phase | Trigger | Env. Factor | Preference |
|---|---|---|---|
| (3) Emerge | End of duration | Lighting Color | Fade to warm orange/yellow |
| | Door opening | | Fade to blue |
| | 2nd RFID read | | Fade to purple |
| | User Stands | | Fade to bright white |
| | Verbal command ("End rest") | | Return to invite conditions |
| | Space empty | | |
| | | Lighting Effect | Pulse   No pulse   Pulse to sound |
| | | Lighting brightness | Bright   Intermediate   Dim |
| | | Sound | Fade to City Walk |
| | | | Fade to Riverbank |
| | | | Fade to Prairie Wind |
| | | | Fade to Rainstorm |
| | | | Fade to Field At Work . . . |
| | | | No sound . . . |
| | | Volume | 12/20 |
| | | Temperature | 72 F |
| | | Air Circulation | Off   Intermediate   High |
| | | Privacy | Off (All notice) |
| | | | Intermediate (Selective notice) |
| | | | On (No notice) |
| | | Display(s) | NA |
| | | | Turn on – welcome information |
| | | | Auto sync with portable device . . |
| (4) Invite | Space Empty (30+ seconds) | Lighting Color | Fade to green |
| | | | Fade to blue |
| | | Lighting Effect | Pulse   No pulse   Pulse to sound |
| | | Lighting brightness | Bright   Intermediate   Dim |
| | | Sound | Fade to City Walk |
| | | | No sound . . |
| | | Volume | NA |
| | | Temperature | 78 F |
| | | Air Circulation | Off   Intermediate   High |
| | | Privacy | Off (All notice) |
| | | | Intermediate (Selective notice) |
| | | | On (No notice) |
| | | Display(s) | NA (Off) |
| | | | Turn on – welcome information |
| | | | Auto sync with portable device . . |

Fig. 26

ENVIRONMENT OPTIMIZATION FOR SPACE BASED ON PRESENCE AND ACTIVITIES

CROSS-REFERENCE TO RELATED APPLICATIONS

This application continuation application of U.S. patent application Ser. No. 17/528,835 filed on Nov. 17, 2021, which is a continuation application of U.S. patent application Ser. No. 16/704,436 filed on Dec. 5, 2019, which is a continuation application of U.S. patent application Ser. No. 16/041,199 filed on Jul. 20, 2018, which is a continuation application of U.S. patent application Ser. No. 15/458,376 filed Mar. 14, 2017, which is a continuation application of U.S. patent application Ser. No. 15/184,225 filed Jun. 16, 2016, which is a continuation application of U.S. patent application Ser. No. 14/730,996 filed Jun. 4, 2015, which claims the benefit of U.S. Provisional patent application Ser. No. 62/008,283 filed on Jun. 5, 2014, each of which is incorporated herein by reference in its entirety.

STATEMENT REGARDING FEDERALLY SPONSORED RESEARCH OR DEVELOPMENT

Not applicable.

BACKGROUND OF THE DISCLOSURE

The field of the invention is office spaces and more specifically spaces that automatically adapt to user presence and optimize for specific experiences or activities within spaces.

During the course of a typical work day, employees of a company or other business entity often perform various tasks or activities. For example, during a typical day, a specific employee may work individually, may work with one other employee in a dyadic fashion to share ideas and develop new ideas, may work with two or more other persons to share information or develop concepts in a larger conference setting, may spend a portion of her day on the phone conversing with colleagues or customers, may participate in a video conference with one or more remote colleagues or clients or may spend some time resting by either napping or simply meditating.

In the office space industry it is generally recognized that space affordances can facilitate or hinder activities and that recognition has lead to differently afforded spaces that have been at least somewhat optimized for different activities. For instance, a typical personal office space may include a desk, a task chair and a computer including a display screen on the desk. In contrast, a typical conference space may include a large table, a plurality of chairs arranged about the edges of the table and a projector or large electronic display screen for presenting content from a computer or the like that is being shared within the conference space. Clearly office spaces and conference spaces are differently afforded and each set of affordances enhances the specific use assigned to the space.

In addition to assemblies that provide work surfaces, support chairs for space users and screens for accessing digital information, many spaces have other affordances that, while capable of enhancing specific activities within the spaces, are essentially ignored or are underutilized by space users for one reason or another. For instance, most office spaces include some type of lighting device(s) (e.g., a desk light, a floor lamp, overhead lighting, upward or downward directed shelf lighting, etc.) for illuminating general ambient space, work surfaces, wall surfaces, etc. Here, even where lighting devices are controllable so that light intensity can be adjusted, most lights are either off or turned on to their highest intensity level regardless of whether or not an intermediate intensity level may be optimal for some purpose. For example, in a conference room, lights are often completely on when digital content is not shared and off when digital content is not being shared with no in between. In personal office spaces lights are usually either on with high intensity or off despite the fact that other lighting settings may be optimal depending on the activity performed within the office space. Many spaces include several lighting devices which are often all on or all off regardless of whether those settings are optimized for specific activities.

Other space affordances that are rarely adjusted despite the fact that they can have a great impact on how well activities are performed within a space include temperature control devices (e.g., heaters, cooling devices, etc.), air flow devices (e.g., fans), audio devices (e.g., speakers and audio players that can play sound tracks), electronic display screens that are not being used to present content within a space, etc.

There are several reasons space users do not optimally adjust many affordances within office spaces. First, in many cases, a user simply does not have an understanding that each of the affordances can be adjusted to optimize specific activities. For instance, for many space users high intensity light on a primary work surface with dimmed ambient light optimizes the user's ability to focus on individual work being performed on the primary work surface. Nevertheless, many space users simply rely on a single intensity ambient light to light their work surfaces. As another instance, where a person uses a space to facilitate a resting activity (e.g., take a short nap), in many cases the resting activity would be enhanced where temperature is increased by a few degrees. Nevertheless, space temperature is only rarely adjusted by space users. As yet one other example, it is known that white noise can drown out voices or other noises within a walkway adjacent a space yet even where white noise sound tracks are available to space users, the tracks are rarely played. Many other examples of optimized environmental characteristics that are not understood by space users exist.

Second, even where a space user has a general understanding that certain activities can be enhanced by optimally adjusting affordances, in many cases the user has no understanding of which settings are optimal for which activities. Here, confused, a user often simply uses affordances as set when the user occupies a space without adjusting the affordances to optimize space use for specific activities.

Third, even where a space user recognizes that activities can be enhanced by optimally adjusting affordances and has a good understanding of how those affordances should be optimized for at least some activities, in many cases different affordances are controlled by different control systems or devices and therefore, to adjust several affordances to optimal settings, a user would have to adjust many (e.g., 4-6) different devices. The burden of optimally adjusting many devices each time the activity within a space is changed means that space users simply use space with affordances set "as is" and do not bother with optimizing the affordances to specific activities. This is particularly true in cases where one person may use many different spaces during a day to perform many different tasks. For instance, in a case where an employer has remote employees that "hotel" in spaces in different facilities, most employees will not take the time to optimally set affordance characteristics even if they understand how the setting can affect their activities. In hotelling cases, often-times affordances and controls therefore are different in different spaces and, while a user may understand a control device in one space that is routinely used by the user, the user may not understand another interface for a similar affordances in a different space. The end result is that the user will not take advantage of the capability of setting optimized affordances in differently controlled spaces.

Fourth, in many cases, while a space user may understand how affordance settings can be optimized for that user for a specific activity (e.g., user preferences for individual focused work), the user often times will have no understanding of how the affordances can be optimized for other types of activities. Again, a user may understand that bright task lighting on a primary work surface with dimmed lighting in the ambient can optimally support individual focused work but may have no clue that the lighting should be changed for dyadic use of the same space where the user and another space user are sharing ideas in an open conversation and should be changed again for video conferencing and yet again during a resting activity. In these cases, instead of manually adjusting affordances to optimize for specific activities, users typically forego adjustment and simply use less than optimal settings for specific activities.

In addition to there being optimized environment characteristics for different activities performed in a space, it is believed that there are also different optimized characteristic sets for different phases of any given activity. For instance, in the case of a space optimized for facilitating a resting activity (e.g., a short nap), there may be several phases of the activity including an invite phase that invites a user to use the space for a rest activity, a welcome phase that helps a user take control of the space, an activity phase during which a resting activity is performed and an emerge phase that helps a user emerge from the resting activity. Here, there are optimal changes to a space environment that can enhance each of the different phases of the activity. Again, here, most users are unaware of optimized affordance settings for phases and even if they understand that optimized affordance settings for each phase exist, the burden of adjusting the affordance settings is too great to be performed for each activity within the space.

Thus, there is a need for a system where affordance settings within a space can be optimized for the space and for specific activities within the space in a simplified manner. There is also a need for a system where affordance settings can be optimized easily for specific users of spaces.

BRIEF SUMMARY OF THE DISCLOSURE

It has been recognized that the environment within a space substantially affects how well specific activities can be accomplished within the space. It has also been recognized that many affordances within spaces that can be adjusted to control space environment are poorly utilized and therefore that many space environments are not optimized for specific activities. Moreover it has been recognized that many of the poorly utilized affordances can be automatically controlled by a system server that, based on trigger events that occur within or proximate a space, adjust affordances either automatically or substantially independent of input from space users so that space environment can be optimized for specific activities or so that at least particularly advantageous environments for specific activities can be provided. In at least some cases actions that a space user would perform during normal use of a space such as closing a door to the space, presenting an identification (e.g., RF) device to take control of the space, sitting down within the space, standing up within the space, etc., may be used as triggers for adjusting space affordances to change environmental characteristics. Thus, space characteristics may be optimized or adjusted substantially automatically without requiring a user to understand how to operate a control interface associated with a specific space.

It has also been recognized that many space experiences have different generally repeatable phases and that the environment within a space can facilitate each of the phases when adjusted appropriately. Thus, where a space is to be used for individual focused work for instance, while light may be high intensity on a primary work surface with dim ambient light there around (e.g., a focused light pattern) while a space user is focusing on work, there may be a phase in or welcome period when the user first takes control of the space, taking materials out of a book bag, setting up the space with materials on the primary work surface, etc. as well as an emerge or phase out period when the user is preparing to leave the space by packing up materials, making sure no materials are left behind, cleaning up the primary and other work spaces, etc., during which the focused lighting pattern is not optimal or even advantageous. Here, lighting and other space affordances (e.g., temperature, sound effects, air circulation, etc.) may all be adjusted differently during each of the different phases in ways designed to enhance activities performed during each phase. Again, actions by a user within the space during normal use of the space may be selected as triggers for commencing next sequential phases in a space experience so that changes to space affordance settings occur generally automatically without requiring any dedicated action, gesture or input from the user for controlling the settings. Thus, for instance, in one embodiment, a system server may control lighting devices within a first space to generate pulsing green light during an invite phase when the space is available for use (e.g., is not scheduled for use during a current or temporally immanent period of time). When a user enters the space and closes a door to a space egress, the door closing may trigger a welcome phase where lighting changes, a first sound track is played, etc. When the user presents an identification device to a reader in the space to schedule use of the space during the current period, upon reading the device, the system may again change to lighting as well as the sound track, temperature in the space, air circulation, notice capability of personal devices within the space (e.g., block delivery of e-mails, texts, etc., to devices in the space), etc. Near the end of the scheduled period of use, the system may based on time, automatically trigger an emerge phase, again changing the lighting and sound effects, changing space temperature and air circulation, change the notice capability of personal devices within the space, etc. When the user opens the door to exist the space, settings may revert back to the invite settings to invite use of the space by another user.

Interruptions inevitably occur during space use. To deal with interruptions during an ongoing space experience, the system may be programmed to automatically recognize when conditions within a space have changed and to adjust space affordances accordingly. For instance, where a user is performing individual focused work activity in a space and the lighting is high intensity on a work surface and dim generally within the ambient and a second person opens a door to the space, the system may sense the door opening (e.g., the trigger) and immediately change the lighting setting to have an intermediate level of light intensity within the entire space and to dim the intensity on the primary work surface. Thereafter, when the second person leaves the space and closes the door, the lighting setting may revert back to the individual focused work setting automatically. Other affordance adjustments based on sensed interruptions are contemplated.

It has also been recognized that more than one space experience may be provided by affordances associated with a space even if the space is optimized for one type of space experience and that a system server or controller (e.g., a computer of some type either remote or local) may control affordances based on the set of affordances available within a space. For instance, where a space experience specification specifies seven optimal affordance settings for a space and a specific space only includes five of the seven affordances, the server will nevertheless control the five affordances according to the specification in at least some embodiments of the present disclosure to present as much of an optimized environment for a specific experience as possible.

In at least some embodiments separate spaces are optimally afforded for different space experiences. For instance, in at least some cases a first subset of spaces may be optimally fitted out to support resting activities, a second subset of spaces may be optimally fitted out to support dyadic activities, a third subset of spaces may be optimally fitted out to support individual focused work, etc. In these cases, in at least some embodiments, when a user takes control of a space, the space experience associated with the optimal activity may be commenced automatically. In some cases a user may be able to select a different space experience causing the system server to control the space according to a specification for the different experience that was selected.

In some embodiments lighting devices used within the spaces are color controllable so that the lighting devices can generate illumination of virtually any color. For instance, in at least some cases RGB LEDs may be provided on lighting devices and may be controlled to generate any desired light color. The different color illumination may be used to enhance space experiences. For instance, during a rest (e.g., nap) activity, space lighting may be dark blue, during a welcome phase of a space experience the lighting may be a warm yellow/orange, where focused work is performed lighting may be bright white, etc. Light intensity and special effects may also be controlled to enhance specific activities and phases of different experiences. For instance, light intensity may be pulsed in a sinusoidal pattern or to follow a sound track in some cases. As another instance, lighting color and effect may be controlled to simulate different effects like a rising sun, lightening in a dark sky, etc. Other effects are contemplated.

In at least some cases a space or room control interface device may be provided adjacent or within a space for manually adjusting affordances via an intuitive interface. For instance, lighting, sound, temperature, circulation, etc., may be controlled via a touch screen interface.

In at least some embodiments a space user can adjust affordance settings for specific types of space experiences (e.g., rest, individual focused work, dyadic space use, etc.) and can store those personalized settings. Thereafter, the system may when the specific user is identified in a space and a specific space experience is to be performed, use the personalized settings to present the experience to the space user.

In at least some embodiments where a space user has a personal portable device (e.g., a smart phone, a tablet type computing device, a laptop, etc.) in a space, the system may use one or more capabilities of the personal device to present at least some space experience effects. For instance, where a portable device includes speakers or an earphone jack, experience sound tracks may be played on the user device to be presented to the user.

Many personal devices include some type of data collector or sensor. For instance, many personal devices include an accelerometer, a gyroscope, an elevation detector, etc. As another instance, many personal devices include a camera that can obtain images. As yet another instance, some personal devices can now sense gestures proximate the devices (e.g., adjacent a display screen). In at least some embodiments it is contemplated that one or more of the sensors or data collectors on a personal device may be used to obtain information that can operate as a trigger for controlling space affordances. For instance, where a personal device is within a user's pocket and the user stands up during individual focused work, the accelerometer or some other sensor may sense the change in posture and send a wireless signal to a system server which may then change the lighting effect within the space according to an experience specification. As another instance, a portable device camera may be positioned within the space to obtain images transmitted to the system server for examination to identify other trigger activities.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 26 is a detailed schematic diagram of apportion of an exemplary rest activity specification of FIG. 24;

DETAILED DESCRIPTION OF THE DISCLOSURE

Figure 1:
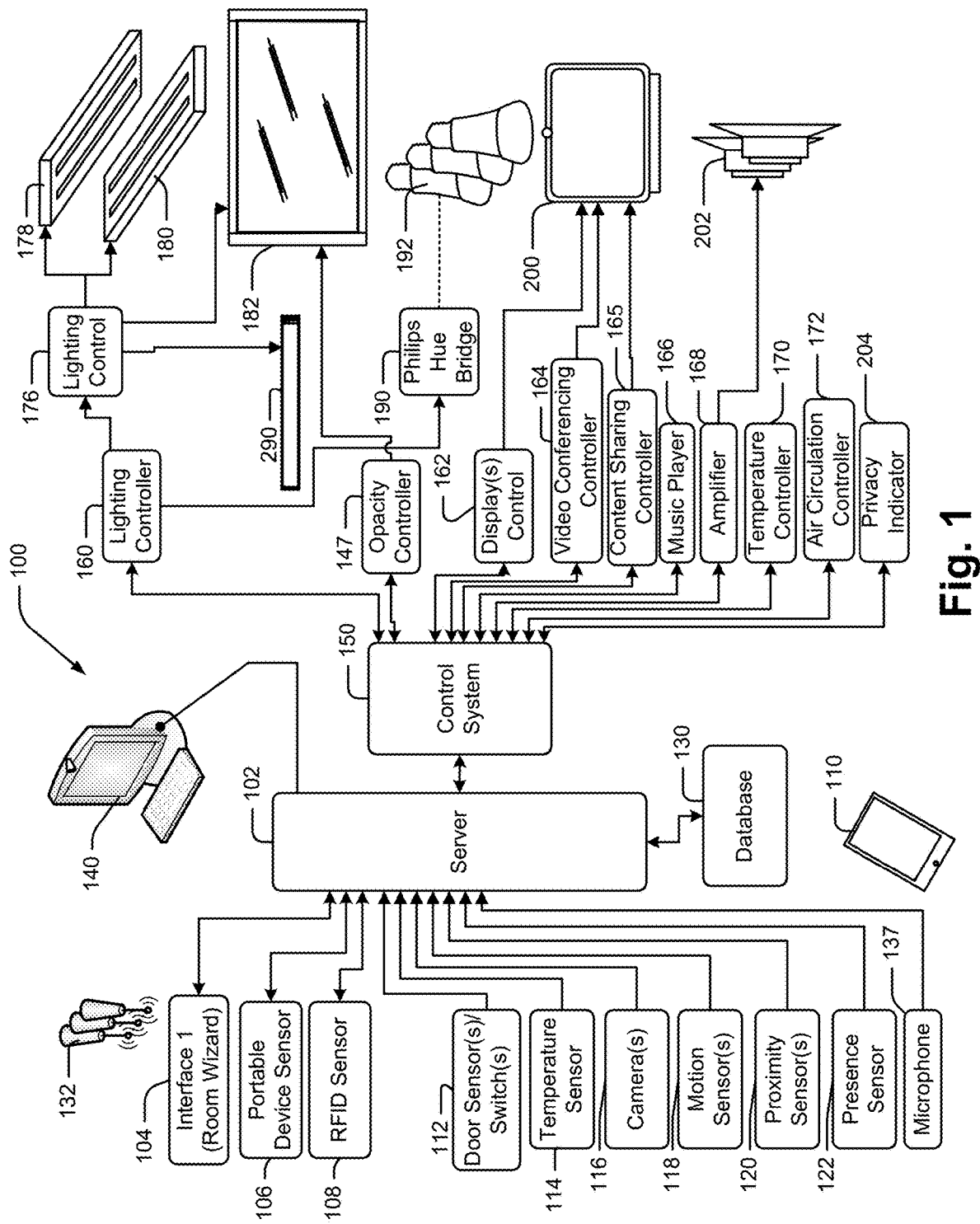
FIG. 1 is a schematic diagram of a space experience control system according to at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary environment optimization system 100 for use with one or more facility spaces, an exemplary space 220 shown in FIG. 2. The exemplary space 220 is defined by wall structure including first and second lateral or side wall subassemblies 222 and 224, end wall subassemblies 226 and 228, a ceiling subassembly 240 and a floor subassembly (not labeled). U.S. patent application Ser. No. 14/028,928 titled "Floor-To-Ceiling Partition Wall System" that was filed on Sep. 17, 2013 is incorporated herein by reference in its entirety and describes one wall system that may be used to construct wall subassemblies 222, 224, 226 and 228. Some of the walls in the '928 application include glass panel members and others include opaque panel members for blocking sightlines. In FIG. 2 the side wall subassemblies 222 and 224 are generally of the glass type while the end wall subassemblies 226 and 228 are of the opaque panel type. The wall subassembly 228 forms a door opening for entering/exiting the space 220 and subassembly 228 includes a glass door 105 mounted for sliding motion between an open position (as illustrated) and a closed position where the door 105 closes the door opening into space 220.

Referring again to FIG. 1, the system 100 includes, among other components, a server 102, at least one interface device 104, 106, 108, 110, one or more sensor devices 112, 114, 116, 118, 120, 122, 137, a database 130, a control system 150, and a subset of output devices associated with specific spaces within a facility that, along with other components, define spaces and that are controllable to change environments within the spaces. For instance, the output devices may include overhead lighting or under shelf lighting 178, upward facing lighting units 180 for on top of wall mounted storage bins (see 274 in FIG. 2), one sided panel light assemblies 182, two sided panel light assemblies 228, indirect wall mounted lighting devices 290, lights including bulbs 192, display screens 200, speakers 202 for generating sound, indicators 204 of different types, etc., as well as controllers for controlling output of the output devices and sub-systems for implementing various affordances such as a video conferencing controller 164 and a content sharing controller 165. In at least some cases one or more of the glass type wall panels may be constructed using glass where opacity of the glass can be controlled via a controller 147 or the like as another space experience affordance.

Server 102 may include any type of computing device having the capability to run space control software to take inputs from the interface devices and the sensors and to provide output control signals to the controller 150 for controlling various aspects of any given space. The server 102 may for instance, include a remote or local stationary computer dedicated to controlling the devices in one or several different spaces within one or several facilities. As another instance, the server 102 may include a portable computer in some cases that runs software to perform various functions. The server 102 may be hard wired to the control system 150 or may be wirelessly connected in some cases.

Server 102 is linked to database 130. Database 130 stores programs run by server 102 to perform various processes as described hereafter as well as specifications for how the affordances within specific spaces are controlled as a function of various sensed parameters. Hereinafter, unless indicated otherwise, any specific sequence of affordance control will be referred to as a "space experience". The space experience specifications can be changed by a system administrator using a workstation 140 or other interface device in at least some cases. Also, in some cases, any or at least a subset of system users may be able to change a subset or all of the space experience specifications or may be able to customize one or more space experience specifications for their own use using an interface 140 or using a room controller device (e.g., 104). Any changes to a space experience specification may be stored in database 130 for subsequent use.

Referring again to FIG. 1, one type of interface device 104 may include a space mounted and dedicated flat screen input device like the one sold by Steelcase Inc. that is referred to as the "Room Wizard". The Room Wizard device was originally provided for the purpose of maintaining a schedule for spaces like conference rooms, offices, etc. To this end, a Room Wizard runs software to maintain a schedule and enabled users to reserve space remotely via a web based interface or locally by accessing screen shots presented by the flat screen and reserving time within an associated space. In the present disclosure, in at least some embodiments, a Room Wizard device or one similar thereto may also be programmed to include room control software algorithms to enable a user to control space affordances as well as to enable a conferee to save different space experiences for subsequent use. In at least some embodiments the interface 104 may also be used to select a space experience to be implemented during a period of use in a particular space. Hereinafter, unless indicated otherwise, a period of use in a particular space will be referred to as a "space session".

RFID sensor 108 is a radio frequency sensor device that can be used to sense an RF identification card, badge, fob, etc. (e.g., an RFIF device), to obtain information therefrom. For instance, an RFID card may include information for determining the identity of a system user that is associated with the card so that one system user can be distinguished from others. As another instance, an RFID card may simply indicate characteristics of personalized space experiences for a system user associated with the card as opposed to indicating the identity of the user. RFID sensor devices are well known and therefore will not be described here in detail. It should suffice to say that when an RF identification device is placed within a sensing range or area associated with the sensor 108, the sensor 108 obtains the information stored on the identification device and provides that information to server 102. Here, the RF sensor may be any type of RF sensor including an NFC sensor or some type of conventional wireless communication (e.g., RF should be considered broadly to include any type of wireless communication unless indicated otherwise).

It is also contemplated that this information could be provided via traditional wireless connections to the user's devices or via an IR connection. It would also be possible to utilize a wired connection, although it is believed the wireless connection is particularly advantageous.

Portable device sensor 106 is a sensor for sensing that an electronic portable device associated with a specific user is within an area associated with a facility space. For instance, sensor 106 may include a blue tooth or sonic sensor device mounted within a doorway into a space to sense when a portable device passes through the doorway. Here, the Bluetooth or sonic signal may be transmitted periodically and may cause any portable device within the doorway or even within the space associated with the doorway to generate an identifying signal so that the identity of a user entering the space can be determined. Again, any signal obtained by device 106 is provided to server 102.

Many spaces may be equipped with wireless access devices 132 mounted in ceiling structure or at other locations to facilitate communication between server 102 and personal portable electronic devices like tablet type devices, smart phones, laptop computers, 110, etc. In at least some cases signals received by a set of access points proximate a space may be used to triangulate the location of a specific portable device and to determine when the device is located within a specific space. Triangulation algorithms are well known in the industry and therefore are not explained here in detail. Once a portable electronic device is associated with a space, control screens for the space may be presented via the interface device that are similar to the screens that can be presented via a Room Wizard interface screen.

Referring again to FIGS. 1 and 2, door sensor 112 includes one or more proximity or motion sensor devices mounted within a door for sensing when the door is either moving or is in an open or closed position or both moving and in an open or closed position. In FIG. 2 two sensors 112 are located along the top edge of the egress into a space where sliding glass door 105 is mounted to wall subassembly 228 for sliding movement between an open position (shown in FIG. 2) and a closed position (not shown). The sensor 112 on the right as illustrated is located to sense either when the door is in the open position or to sense when the door starts to move from the open position toward the closed position by sensing the leading edge of the door. The sensor on the left as illustrated is located to sense either when the door 105 is closed or to sense when the door starts to move from the closed position toward the open position by sensing the leading edge of the door. In other embodiments a single sensor device may sense all door conditions. For instance, a single sensor device located at the location of the sensor 112 on the right in FIG. 2 may sense codes on a rear surface of the door 105 as the door slides between positions where different codes indicate different juxtapositions (e.g., opened, closed, etc.) of the door 105.

Referring again to FIG. 1, in at least some cases a temperature sensor 114 may be provided in one or a subset of spaces within a facility to sense and provide a temperature reading to server 102 for an associated space. In FIG. 2, an exemplary temperature sensor 114 is shown mounted within the space defining wall 222. Sensor 114 should be located at an intermediate height within the space to obtain a temperature reading at a height within the space that is commensurate with the location occupied by a system user within the space 220.

In addition to or instead of the temperature sensor 114, other types of sensors including a motion sensor 118, a proximity sensor 120 or a presence sensor 122 may be provided within or adjacent space 220 (see again FIG. 2) for sensing motion or presence of a system user within space 220. While only one device is shown in FIG. 2 as representing each of several different types of sensors, it should be appreciated that each sensor may be a separate device, that is some embodiments there may be several instances of a single type of device associated with a space 220 and that any or a subset of the sensors may be positioned at other locations associated with space including in other walls subassemblies, in the egress into space 220, in the ceiling subassembly 240, in the floor subassembly, in any one of the furniture affordances within the space 220 (e.g., with a desk or table structure 250, within a wall mounted bin structure 274, etc.

In addition, a sensor may be located within a moveable affordance within space 220 such as within a lounge chair 252 for supporting a user in space 220. Here, in at least some cases a wireless transceiver may be provided within the lounge chair for transmitting signals when a sensor therein senses something. For instance, the sensor in chair 252 may sense presence of a user in the chair via proximity, motion, weight, etc., and may wirelessly transmit a signal to an access point 132 associated with space 220.

Furthermore, any of the motion, presence, proximity, etc., sensors may be mounted as at 115 in FIG. 2 within an egress into the space 220 to sense when a user moves through the egress and into the space and/or when a user exits the space 220. Signals from each of sensors 118, 120 and 122 are provided to server 102 for processing.

Referring again to FIGS. 1 and 2, one or more cameras 116 may be mounted within a space 220 to obtain images within the space 220 that can be analyzed by the server 102 to assess activities occurring within the space. For instance, instead of using motion or proximity sensors to sense when someone is within space 220, camera images can be examined to identify a person within the space 220. In addition to simply determining if the space is occupied, images can be used for other purposes such as, for instance, counting persons within a space, determining the position of one person in the space or the relative juxtapositions of two or more persons within the space, recognizing posture of a person or persons within the space, identifying gestures by a person or persons within the space, etc.

Any of the conditions or circumstances identified using images from one or a plurality of cameras within the space can be used as a trigger for a specific space experience or for a space experience to transition from one phase to a next sequential phase. In FIG. 2, two cameras 116 are mounted to the ceiling structure 240 where each has a different perspective on essentially the same field of view. Here the server 102 would use images from both cameras to assess circumstances within the space. In addition to using cameras 116 to obtain space images, in at least some embodiments a camera 280 associated with a displays screen 200 or useable for teleconferencing or video conferencing may be used to obtain images of the space 220 useable to assess circumstances within the space.

Use of a video conferencing camera may be particularly useful where the space 220 is relatively small so that the cameras 280 is capable of obtaining images of a relatively large portion of the space 220. In at least some cases camera 280 may have an adjustable/controllable field of view so that, when not being used to facilitate a video conference, the camera's field of view can be expanded to obtain images corresponding to a relatively large portion of the space area. Then, during a video conferencing session, the camera's field of view may be altered and optimized to obtain images of a conferee using the space 220.

The video conferencing camera may also be located in a position to view the usable space with high definition (e.g., generating high definition images). The camera may be able to generate images useable by a processor running a face recognition program to determine the identity of a user within a space. This could in turn be used to adjust the affordances in accordance with the particular preferences of the user. In addition to identifying a user via facial features, other biometric information may be sensed via other types of features including an eye scanning sensor, a finger print reader, etc.

Referring again to FIG. 1, control system 150 may include a room control system like the ones provided by Creston Corporation that can be used to manually control various environmental affordances within a space including lighting, video conferencing, data sharing, sound, etc. Known controllers enable space users to manually adjust environmental affordances as desired. For instance, temperature could be adjusted to suit a user's preference. Lighting could be turned on or off and in some cases light intensity may be adjusted. A video conferencing session may be initiated and controlled. The control system 150 has other capabilities as described here after.

Figure 2:
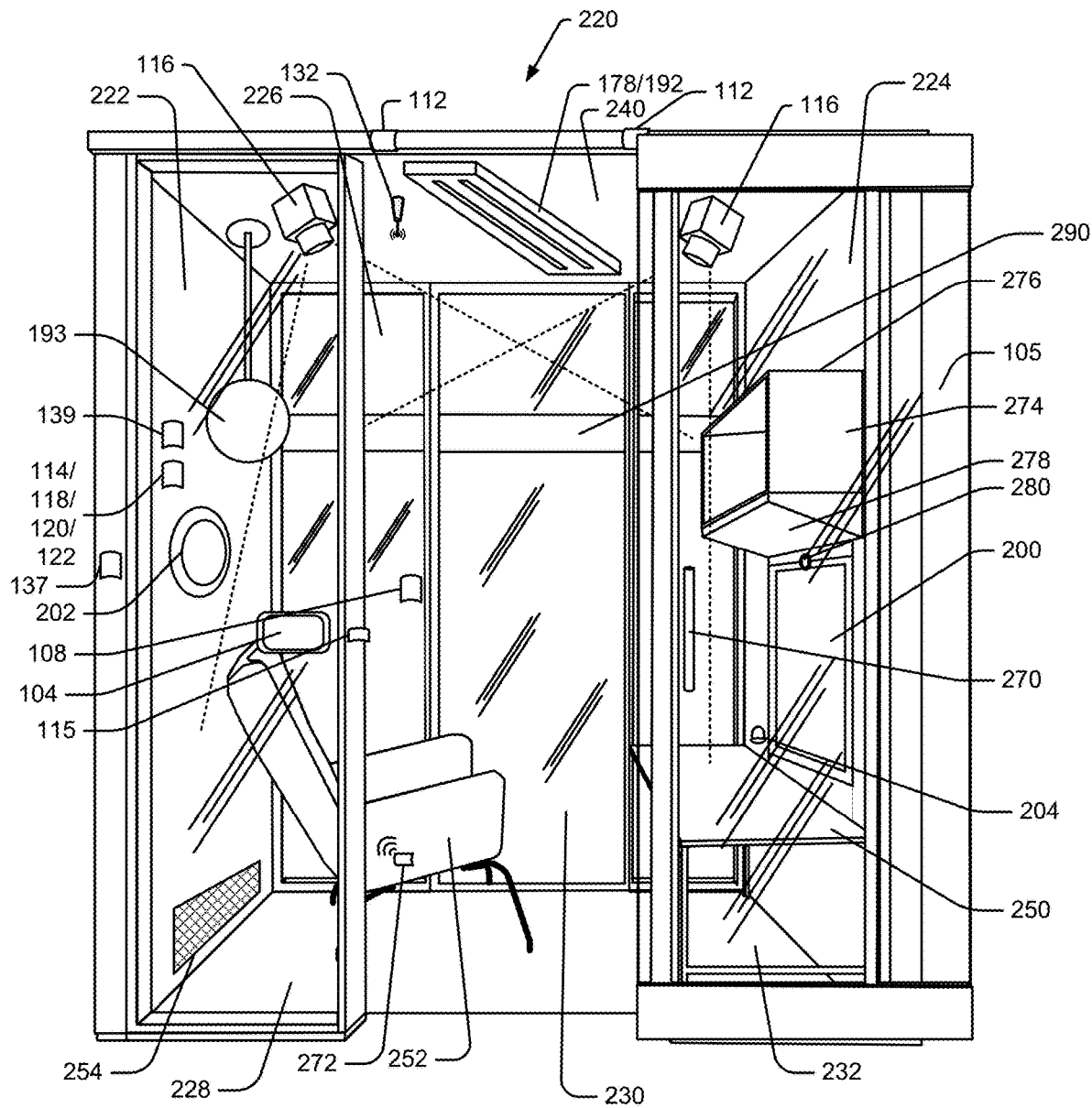
FIG. 2 is a perspective view of an exemplary space including various space affordances that is consistent with at least some aspects of the present disclosure.

Referring to FIG. 1, control system 150 provides output control signals to various system components including, among others, a lighting controller 160 which in turn drives a lighting control 176 and/or another intermediate control bridge device 190. The lighting control 176 drives lighting devices 178, 180 and 182. The lighting devices 178 include overhead ceiling mounted lighting devices. Each device 178 may be a simple white light generating device controllable to adjust light intensity and light color output within a relatively narrow range. In other cases each lighting device may include components controllable to generate many different lighting effects such as virtually any lighting color, pulsating lighting, flickering lighting, lighting that fades on and off, lighting that fades from one color to another, etc. For instance, in at least some embodiments RGB LEDs may be used to construct each of the lighting devices 178 where each RGB LED can be controlled to generate virtually any color of light. Here, in at least some embodiments, the LEDs may be mounted within a light assembly including one or more light pipes that guide and disperse light therefrom into the space 220 (see again FIG. 2). Here, the idea is that the RGB LED light devices can be controlled to facilitate various space experiences as will be described in greater detail below. Although not shown, one or more devices 178 may be mounted to an undersurface 280 of one or more wall mounted bins 274 for generating downward directed light to wash a portion of the wall assembly 224 as well as the top surface of a table 250 there below.

Lighting devices 180 are similar to devices 178 and therefore, in at least some cases, will include RGB LEDs and other structure for generating various lighting effects to facilitate various space experiences. Referring to FIG. 2, although not shown, devices 180 may be supported along top surfaces 276 of wall mounted bins 274 for generating upwardly directed light to wash a portion of the wall subassembly 224 that resides above the bin 274.

Figure 3:
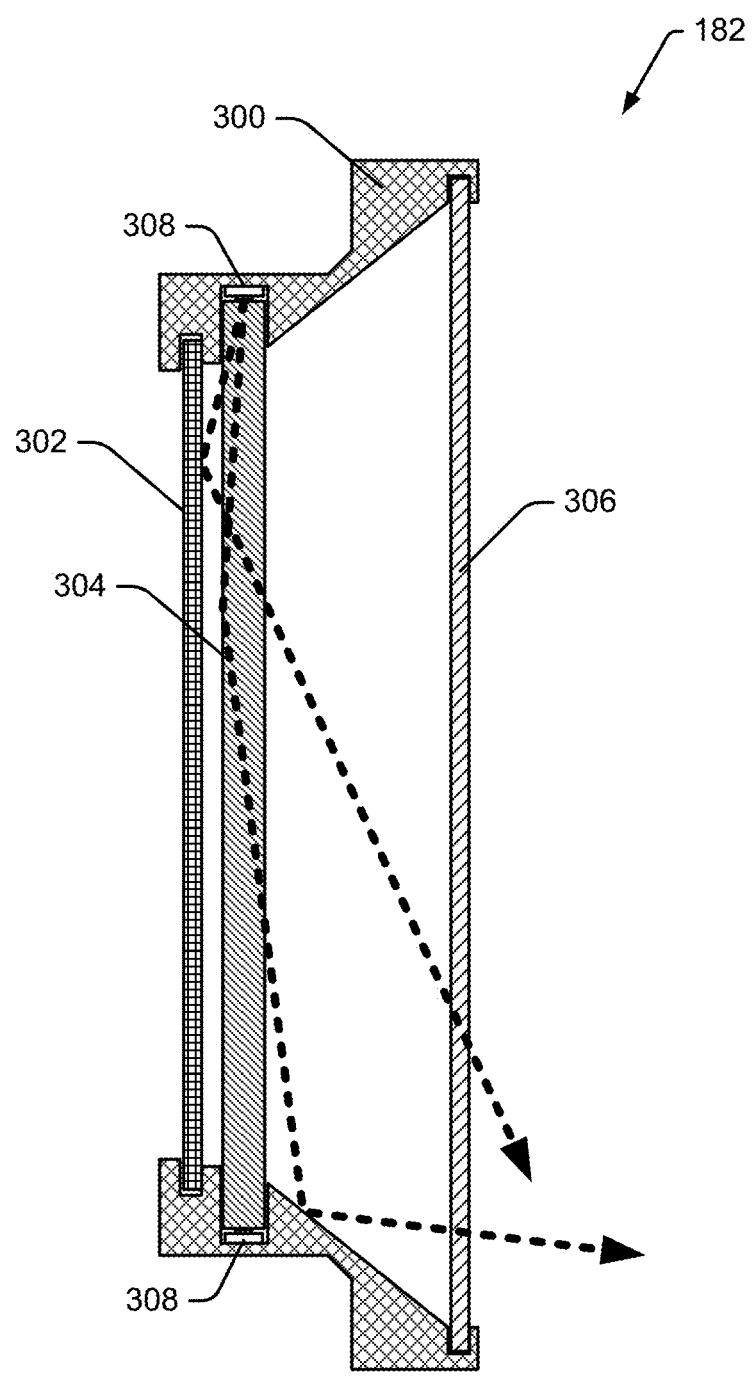
FIG. 3 is a cross sectional view of a single sided LED light panel assembly that may be used to form various sections of a space defining wall as shown in FIG. 2 and in other figures in this disclosure.

Lighting device 182 is a light panel that, when illuminated, effectively glows as it emits light to one side of the device structure. This type of lighting device is generally described in U.S. patent application Ser. No. 13/913,254 titled "Panel Light Assembly" which was filed on Jun. 7, 2013 and which is incorporated herein in its entirety by reference. The basic structure of light panel 182 is shown in cross section in FIG. 3. Referring to FIG. 3, panel 182 includes a rigid frame structure 300 formed out of four extruded or otherwise formed rails (two shown in cross section at 300 in FIG. 3) that form a plurality of channels for receiving, supporting and separating three planar members 302, 304 and 306 as well as LED sub-assemblies 308. Member 302 is a reflector member that includes a reflective surface that, upon mounting in the frame 300, faces member 304 and is separated therefrom by a gap.

Member 304 is a light pipe type member that is defined by edges and that is formed of a generally clear material selected to guide light from the edges while leaking light out surfaces thereof. Light that leaks toward reflector member 302 is reflected back through member 304 and out the front surface thereof. In some embodiments both surfaces of member 304 are polished. In other cases one or both surfaces of member 304 may have some treatment (e.g., mechanical machinations, frosting, etc.) to cause light to disperse there from. LED sub-assemblies 308 are mounted along one, two or each edge of member 308 to direct light there into.

Member 306 is a light transmitting cover member and includes an external surface when mounted that is substantially flush with adjacent surfaces of the frame member 300. Light from member 304 passes through cover member 306 to illuminate a space adjacent thereto.

Figure 4:
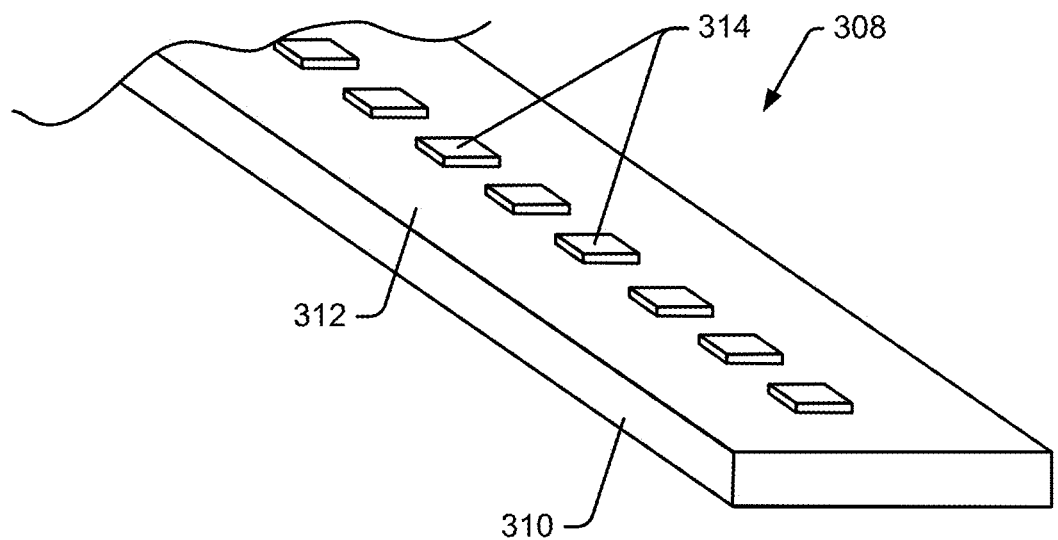
FIG. 4 is a partial perspective view of an LED PCB board that may be used in the assembly of FIG. 3.
Figure 5:
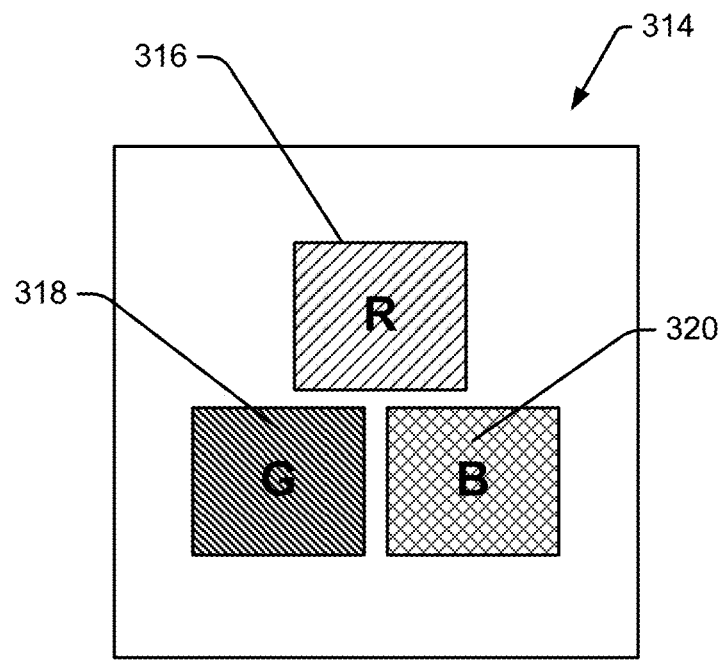
FIG. 5 is a top plan view of an exemplary RGB LED that may be used in the assembly of FIG. 4.

Referring to FIG. 4, an exemplary LED subassembly 308 includes a ribbon of printed circuit board (PCB) 310 or other support substrate and a line of RGB LEDs 314 mounted to a top surface 312 thereof. Referring to FIG. 5, each RGB LED 314 includes three different LEDs, one red, one green and one blue, that can be independently controlled to adjust intensity. When LEDs on two or more colors are illuminated at the same time and the light is directed in member 308, the light mixes in member 308 and creates a combined color. Thus, for instance, a shade of yellow can be generated by turning on green and blue LEDs at the same time. LED intensity is controllable using a PWM technique or other control algorithm. Thus, each light panel 182 can be used to generate light having virtually any desired color. In addition, by controlling the LEDs in device 182 differently during a sequence, the lighting effect can be controlled to facilitate a different space experience.

Figure 6:
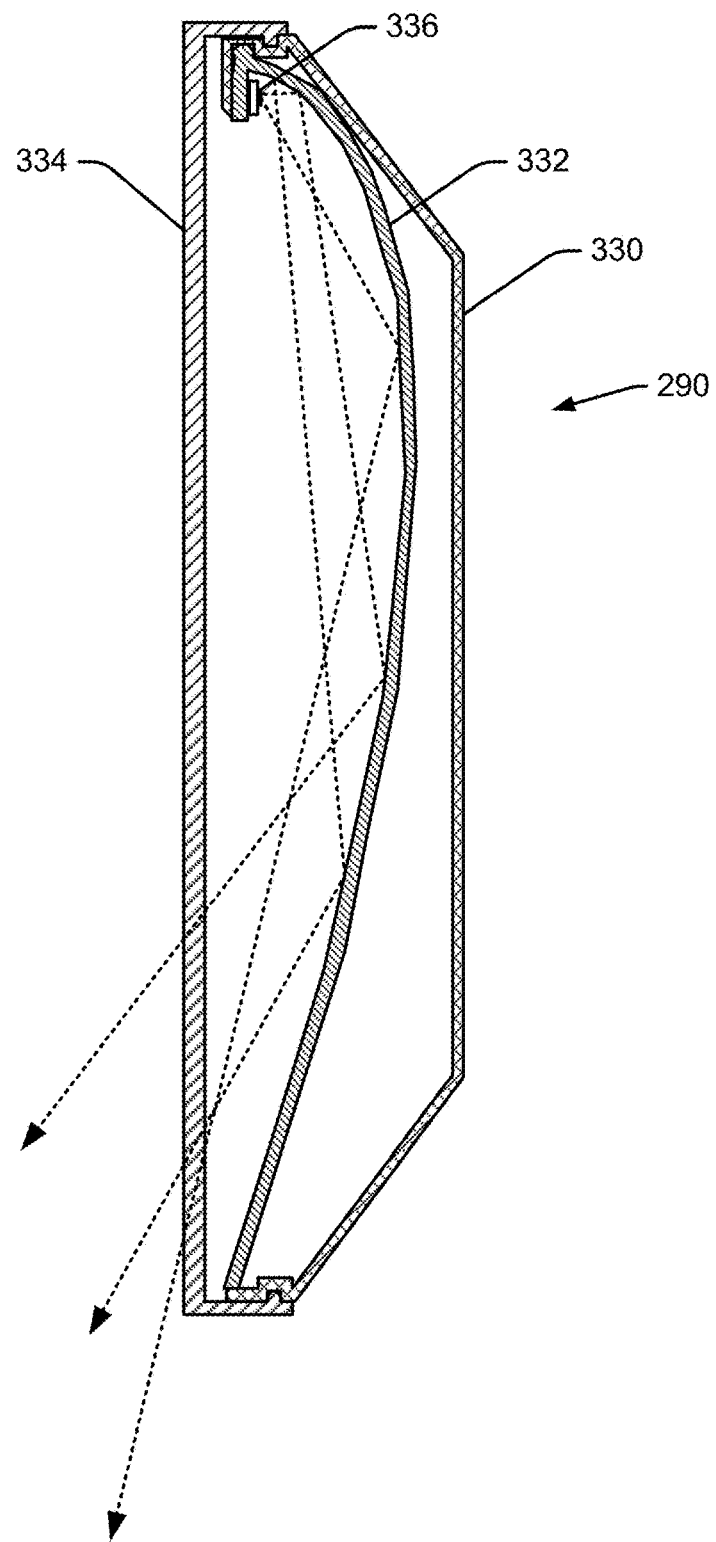
FIG. 6 is a cross sectional view of an indirect light assembly that may be used in a space defining wall that is consistent with some aspects of this disclosure.

Referring again to FIG. 2, one or more indirect lighting devices 290 may be mounted within one or more of the space defining wall structures. Referring also to FIG. 6, an exemplary indirect light structure 290 includes, among other things, a bent metal or extruded housing structure 330, a reflector member 332, a cover member 334 and an LED subassembly 336. Housing structure 330 includes wall members that form a cavity and that have upward and downwardly facing edge channels for mating with lip members formed by cover member 334. Reflector 332 is mounted within the cavity and forms a reflective surface that faces an internal surface of cover member 334. The LED subassembly 336 may be similar to the subassembly described above with respect to FIGS. 4 and 5 and therefore may include RGB LEDs controllable to generate light of any desired color. Light from subassembly 336 is directed at the reflective surface of member 332 and reflects therefrom and passes through cover member 334 and into an adjacent space.

In the case of either of the lighting device 182 and 290 described above, after the device is mounted to a support frame structure, an opaque panel is usually mounted on the opposite side of the frame structure to give a finished appearance.

Figure 7:
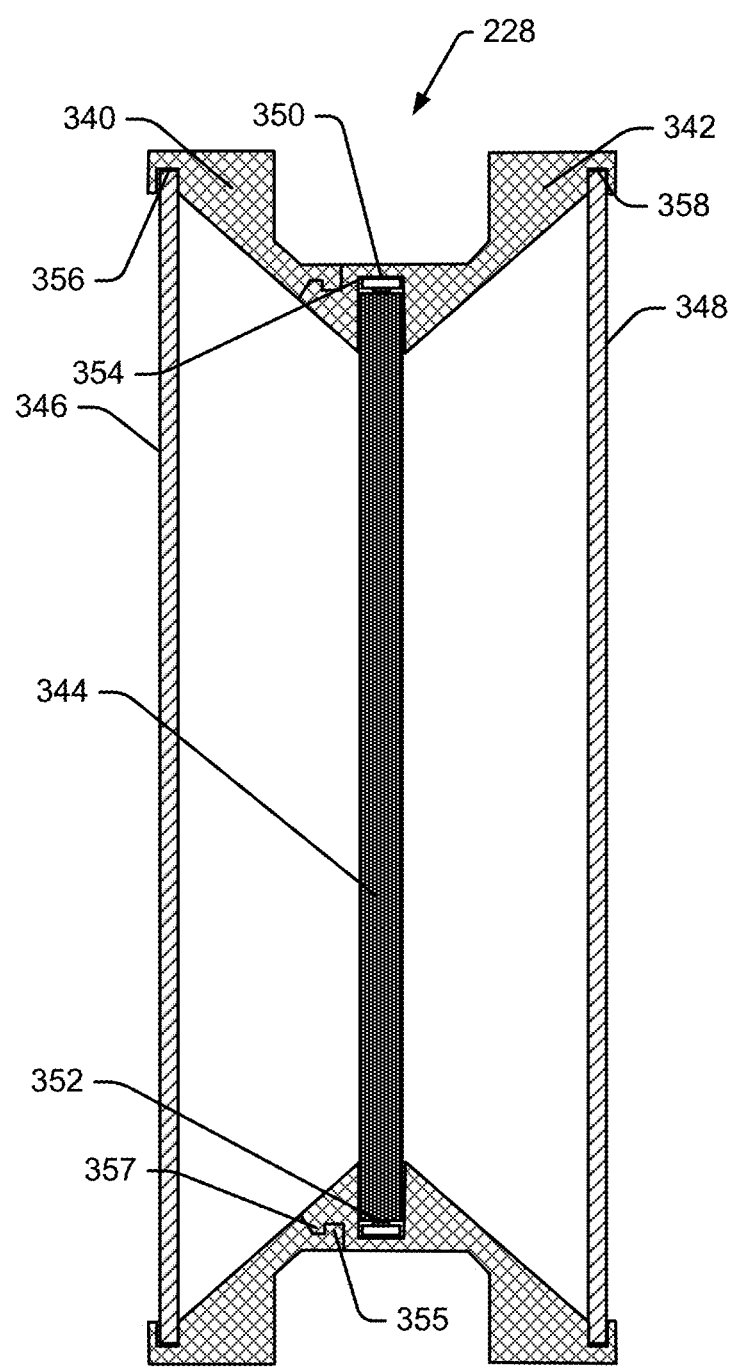
FIG. 7 is a cross sectional view of a two sided light panel that is consistent with at least some aspects of the present disclosure.

FIG. 7 shows a two sided light panel assembly 228 that is similar to the assembly shown in FIG. 3, albeit where the reflecting member 302 has been effectively replaced by a second cover member 346. Assembly 228 includes a dual part frame structure 340 and 342 that snap together from opposite sides of a support frame to mount the assembly 228 to the support frame. Frame structures 340 and 342 form resilient mating ribs or lips 355 and 357 that engage in a friction fit to effectively sandwich the support frame structure there between. Although not shown additional locking structure may be provided for locking the frame structures 340 and 342 together on a frame. Structure 342 forms first and second channels 358 and 350 about its internal perimeter that receive and support a light transmissive cover member 348 and a light guide member 344 and LED subassemblies 308. Structure 340 forms a channel 356 about its internal perimeter that receives and supports a second light transmissive cover member 346. Light from within guide 344 escapes there from and passes to either side of the assembly 228 lighting space on either side thereof. In at least some cases the guide 344 may include surface disturbances (e.g., etching, frosting) or internal doping with reflective specs or the like that varies or is uniform throughout its area to better disperse light passing there through to areas adjacent the assembly.

Referring again to FIG. 1, bulbs 192 may include Phillips' Hue bulbs that each include RGB LEDs and control circuitry for generating virtually any light color and a range of different intensities. Each bulb may be mounted in any of several different types of lamp assemblies including a hanging lamp assembly 193 as shown in FIG. 2. Other lamp assemblies are contemplated. The bridge 190 shown in FIG. 2 may be a Phillips' Hue bridge and may be used to wirelessly control one or more of the bulbs 192.

Referring again to FIG. 1, video conferencing controller 164 is a controller for controlling a video conference within the space 220 and is therefore linked to a display screen 200 as well as, perhaps, a camera 280 associated therewith. The conferencing system may be any one of the system provided by Cisco Systems or other video conferencing system manufacturers.

Figure 8:
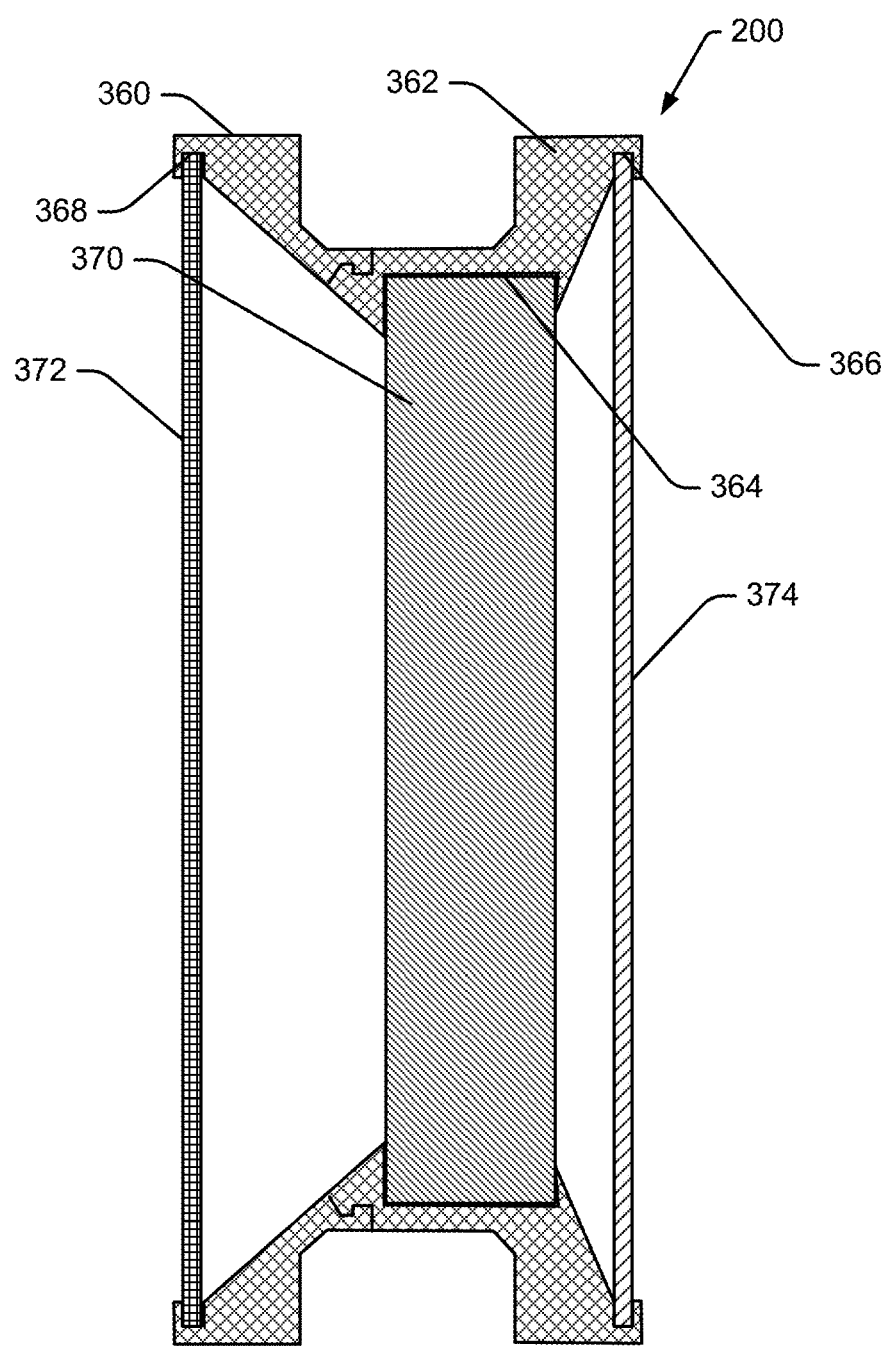
FIG. 8 is a cross sectional view of a display assembly consistent with at least some aspects of the present disclosure.

Referring again to FIG. 1, display device(s) 200 may be any type of flat panel display device that is spatially associated with space 220. For instance, display 200 may be mounted to or otherwise supported by a desk or table assembly 250 within space 220. In other cases a display device may be mounted to one of the wall subassemblies. In still other cases it is contemplated that a display device may be mounted within one of the wall assemblies. To this end, see for instance the structure shown in FIG. 8 where a two part frame subassembly similar to the frame shown in FIG. 7 supports an electronic display screen 370. In this case a first frame structure 362 forms a channel 366 for supporting a transparent cover member 374 that is substantially flush with the adjacent portion of the frame structure 362 and also forms a channel 364 for receiving the display screen 370. In FIG. 8 the emissive surface of display 370 faces member 374. The second frame structure 360 forms a single channel for supporting opaque panel member 372 to give a finished appearance on the opposite side of the wall structure.

Figure 9:
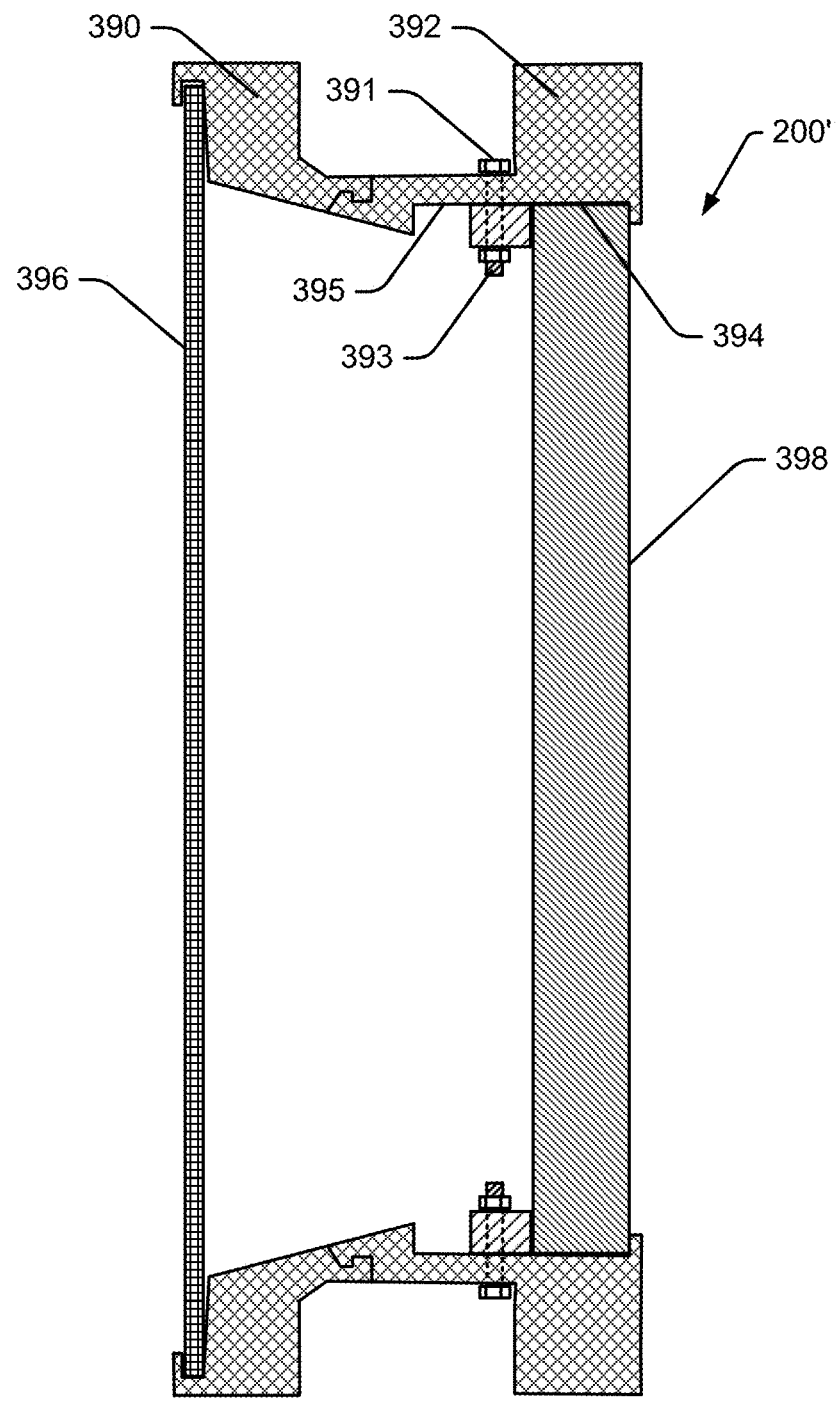
FIG. 9 is a cross sectional view of another display assembly consistent with some aspects of the present disclosure.

Yet another configuration where a display screen 200' is mounted within a wall structure is shown in FIG. 9. In FIG. 9, a frame includes a two part structure 390 and 392 where frame structure 390 is similar to frame structure 360 described above with respect to FIG. 8. Frame structure 392, however, is different in that structure 392 only forms a single channel 394 for receiving and support a display screen 398 so that a front surface of display 398 is substantially flush with adjacent portions of frame structure 392.

In either of the two configurations shown in FIGS. 8 and 9 where a display screen is mounted within a wall structure, it is contemplated that different thickness display screens will be available for use. For this reason in at least some structure may be provided to compensate for different screen thicknesses. In this regard see in FIG. 9 that mounting blocks 391 are provided in some cases to clamp against a rear surface of a display screen during mounting. A fastening bolt 393 is provided for each mounting clamp which passes through a block opening and a slot in the frame structure 392. A nut 395 on the distal end of each bolt can be tightened to sandwich a display screen between the block and a facing lip on the frame structure 392. Thus, to install a screen, the screen is mounted via the blocks and bolts to a frame structure 392 and then the frame structures are clipped together from opposite sides of a support frame to secure the assembly 200' to the support frame. Again, an additional locking mechanism may be provided to maintain the frame structures 390 and 392 secured together.

Although only a lounge chair 252 and a simple table assembly 250 are shown in FIG. 2, additional or other furniture affordances may be provided within a space 220. To this end, see for instance FIG. 10 that includes a sofa type lounge 400a that is long enough to support at least two persons side by side comfortably. Here, the lounge includes a seat structure 402 and a back rest support structure 404. A utility well 406 is formed between end sections of the seat structure and a cover member 408 is hinged to the lounge 400a to open and close thereby enabling access to the well 406. In at least some embodiments control devices 410 (two shown) are provided within the well 406 (or within an arm rest structure, not shown) that can be used to link to a space mounted displays screen 200. In at least some embodiments each control device 410 is cabled to a port within the well 406 and another end of the cable is linkable to a portable computing device like a laptop 418, a tablet type device (not shown) or a smart phone device (not shown). U.S. patent application Ser. No. 13/912,442 titled "Personal Control Apparatus And Method For Sharing Information In A Collaboration Workspace" that was filed on Jun. 78, 2013 describes one control device that may be used as device 410 and is incorporated herein in its entirety by reference for its teachings of a control apparatus for content presented on a display screen. Referring again to FIG. 1, in addition to including the control devices 410, the sub-system of FIG. 10 may also include a content sharing system controller 165 akin to the one described in the '442 application that manages who has control of a display screen 220 based on various rules.

Figure 10:
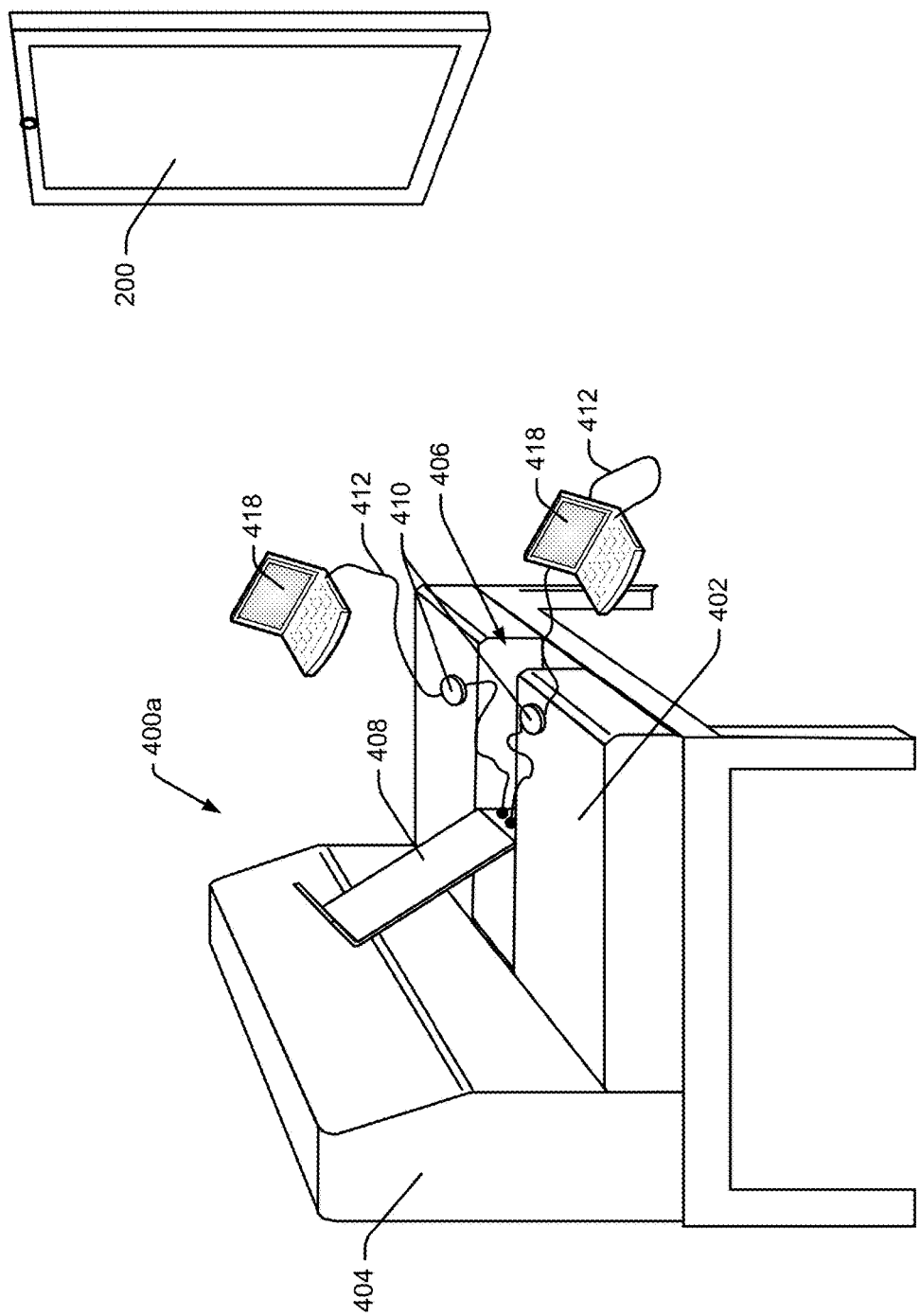
FIG. 10 is a perspective view of a lounge assembly that is consistent with at least some aspects of the present disclosure.

Referring still to FIG. 10, various events associated with use of the control devices within the well 410 may also be used to trigger specific space experiences or phases of those experiences. For instance, opening door or cover member 408 may be sensed and trigger a phase change. Connecting a control device 410 to a computer may be sensed and trigger a phase change. Selection of a button on a control device 410 may trigger a phase change. Disconnecting a device 410 from a source laptop or the like may trigger a phase change. Closing the cover 408 may trigger a phase change.

Referring again to FIGS. 1 and 2, in other embodiments it is contemplated that the content sharing controller 165 may support wireless linkage within space 220 to one or more display screens. To this end, the '442 application referenced above also teaches a wireless process for associating a portable computing device with display screens within a space and for then controlling content presented on the screens the wireless teachings of the '442 patent are incorporated herein by reference.

Referring to FIG. 1, a music player 166 is provided for playing audio clips. For instance, player 166 may be programmed to play various sound tracks including one or more white noise tracks, one or more nature tracks (e.g., a rainstorm track, a wind track, a waves crashing track, etc.), one or more scene tracks (e.g., a street café track, a bus terminal track, etc.). although not shown, player 166 may be equipped to fade one track in while simultaneously fading a second track out so that transitions between different tracks are not perceived as abrupt. Amplifier 168 links control system 150 to speakers 202 and controls the volume of the tracks played by player 166.

Temperature controller 170 uses signals from control system 150 to regulate temperature within space 220. To this end controller may be linked to a space heater and perhaps some type of cooling (e.g., air conditioning) unit associated with space 220. Similarly air circulation controller 172 is used to regulate air circulation within space 220 and may be linked to a fan or the like that is mounted behind a circulation vent (see 254 in FIG. 2).

Privacy indicator 204 in at least some embodiments, includes a simple light device that is spatially associated with space 220 and that can indicate when a certain level of privacy can be relied upon. For instance in FIG. 2, when door 105 is completely closed, server 102 may cause indicator 204 to illuminate to indicate privacy. As another instance, where a microphone or other sound sensor is mounted outside space as shown at 137, sound picked up at 137 may be compared to sound sensed within space 220 via an internal microphone 139 to identify when sound initiated in space 220 carries outside space 220 and to identify the volume of sound outside space 220. Then, if sound that carries from inside space 220 to outside space 220 is below a threshold level, indicator light 204 may be illuminated and if the sound rises above that level the indicator light 204 may be turned off. Other ways of sensing privacy are contemplated.

Referring again to FIG. 2, in still other embodiments one or more glass panels that form parts of a space dividing structure (e.g., a wall) may include electronically controlled tinting or "dynamic" glass where transparency of the glass can be controlled by a system user or automatically by the server 102 to further facilitate certain space experiences. For instance, in some experiences a user may want transparent walls or panels while during others the user may desire opaque walls or panels. Two companies that have developed dynamic glass technology and products include Smart Shade and View, Inc., either of which could provide dynamic panel glass for embodiments of the disclosure.

While the above system includes a large number of different types of sensors, interface devices and output devices, it should be appreciated that the present disclosure contemplates systems with far fewer devices and sub-systems. For instance, while some embodiments may include dual sided light panels as described with reference to FIG. 7 above, other embodiments will not include such panels. As another instance, some embodiments may include display screens and/or speakers while other embodiments do not. As yet another instance, some embodiments may include control devices as described above with respect to FIG. 10 while others do not include such control devices.

Figure 11:
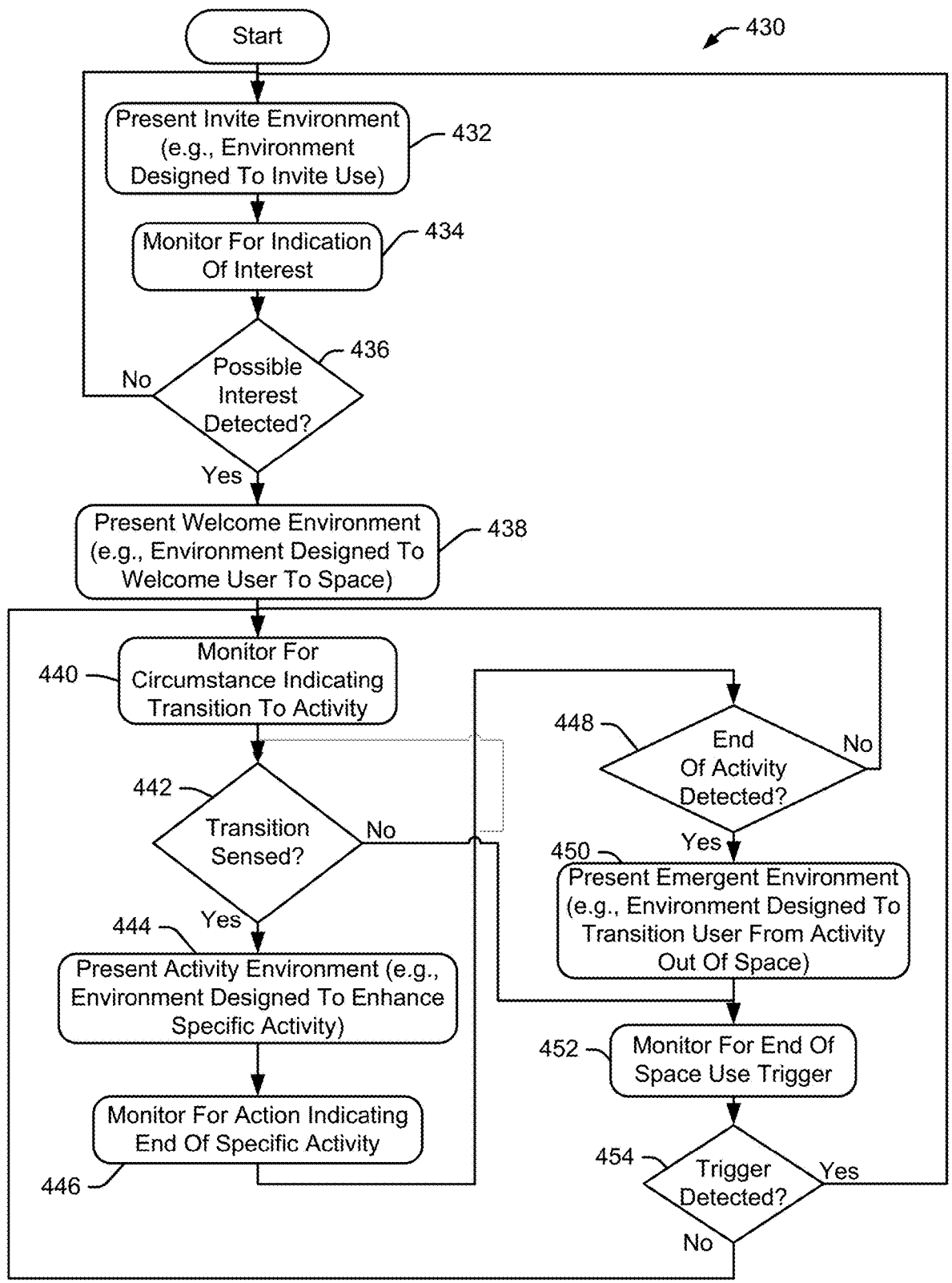
FIG. 11 is a is a flow chart illustrating a method for controlling space affordances to facilitate several phases of a generic space experience.

It has been recognized that different subsets of the above described affordances may facilitate different optimized or enhanced multi-phase space experiences. For instance, in a case where a person intends to use a personal space to rest for a few minutes prior to a next meeting, a properly afforded space may automatically run through a multi-phase space experience to invite the user into the space, transition the user to a rest state, help the user maintain the rest state and help the conferee emerge from the rest state. As another example, in a case where two users intend to use a space to share content from personal portable devices with each other in a dyadic fashion, a properly afforded space may run through a space experience program to invite the users into the space, to help a first user that arrives to prepare for the dyadic session, to transition the users to a dyadic sharing environment where displays can be easily used to facilitate sharing and perhaps some content development and to help the user's transition out of the dyadic environment when the session is completed. Many other sequences Referring now to FIG. 11, a process 430 that is consistent with at least some aspects of the present disclosure is illustrated. During the entire process shown in FIG. 121, server 102 (see again FIG. 2) monitors inputs from one or more sensor devices 112, 114, 116, 118, 120, 122, etc., and determine how to control space affordances as a function of the sensed inputs to facilitate a specific space experience. At block 432 server 102 controls the affordances associated with a specific space (e.g., lighting, sound, etc.) to present an "invite environment" within the space. Here, it is contemplated that in at least some embodiments, where two spaces within a facility have similar affordances and therefore similar capabilities to present space experiences, all invite environments will have similar characteristics so that system users can become accustomed to quickly recognizing an invite experience and distinguishing that experience from others. Here, the invite environments may only be similar because different spaces may and often do have different environmental affordances. For instance, a first space may include one or several display screens (see again 200 in FIG. 2) while other spaces may have no display screens. Nevertheless, each of the two spaces may include similar lighting, audio components for generating sound, sensor arrays, temperature and circulation affordances, etc. Here, the common affordances may be controlled in a similar fashion to facilitate a space experience and the screens in the first space may be used to enhance the experience.

An invite experience should be an experience that indicates that a particular space is available for use and that can be reflected in at least some fashion in each of several different spaces irrespective of the affordances within each space. For instance, where a facility includes thirty separate spaces within a general area that can be used by one person or a small group of persons and where each of the spaces includes at least some light device that is capable of generating various colors of light, a universal invite environment may include generating green colored light using each light device in a space that is capable of generating green light. Thus, where fifteen of the thirty spaces are available for use, a user may simply observe which spaces are generating green light and therefore which spaces are inviting use. Other more complex invite environments are contemplated.

Referring again to FIG. 11, while the invite environment is presented at block 432, at block 434 server 102 monitors sensed inputs to identify specific circumstances or triggers that indicate that a user at least near the space has an interest in using the space. For example, an interest in using a space may be identified when the system senses that a user has entered the space, when a user closes a door after having entered the space, when a user verbally announces (e.g., annunciates "control space") a desire to claim the space, etc. at block 436, if no trigger indicating interest is identified, control continues to loop back through blocks 432 and 434 where the invite environment persists.

Once a possible interest trigger is identified, control passes to block 438 where server 102 controls the output devices in an associated space to present a "welcome environment" (e.g., a second phase of a space experience). The welcome environment is designed to welcome a user and transition the user to an activity to be performed within the space. While many different welcome environments are contemplated, it is envisioned that the welcome environments associated with different activities to perform within a space will be different depending of the activity to which the space experience is transitioning to. For example, if the activity to be facilitated within a space is a rest or meditation type activity, the welcome environment may be one designed to, in addition to indicating a transition from the invite state, reduce stress and calm the user. For instance, the welcome state may call for the color of the lighting in the space to be changed from the universal green associated with an invite environment to a warm yellow/orange and may cause a relaxing sound track to be faded in at a low volume, may reduce air circulation within the space and may control one or more display screens within the space to present a color output that is similar to the color of the light generated by the lighting devices within the space.

As another example, where the activity to be facilitated includes focused individual work, the welcome environment may first include a change from green to warm yellow/ orange light and a city sound track that includes the sounds of a busy street to indicate a transition from the invite state and then the light may slowly fade to extremely bright white light throughout the space 220 and a cool blast of air via the air circulation controller 172 to invigorate the user during a two minute period prior to the focused activity. During the two minute welcome phase the user could stow a bag and/or a garment, get materials out of a bag and set them up on the work surface and get seated in a comfortable position within the space.

As yet one other example, in a case where a space is to be used for dyadic collaboration between two persons, the welcome environment may in addition to changing from green light to warm yellow/orange, call for turning on displays screens within the space and starting a process designed to enable two persons to share content via those screens. For instance, the process designed to enable sharing may include stepping through a password entry process enabling users in the space to associate their portable devices with the space whereby the system generates a random password which is presented on each screen in the space and each user enters the same password into their portable devices to associate each portable device with the space and hence with the displays mounted within the space 220. In other cases where the system includes hardware controllers like the controllers 410 described above with respect to FIG. 10, the system may simply instruct each user to plug one of the control devices 410 into their portable device as part of the welcome environment phase.

Referring again to FIG. 11, while the welcome environment is presented, server 102 monitors for a circumstance or trigger that indicates a transition to the activity phase to be facilitated. For instance, a successful RFID read may comprise a transition trigger, the end of a period (e.g., a 2 minute welcome environment process) may trigger a transition, a user in a space assuming a different position such as a seated position may comprise a transition trigger, etc. If a trigger is not detected at 442, control passes to block 452 where server 102 monitors for an end of space use trigger. Here, it is recognized that an interest trigger may be detected at 436 and thereafter a potential space user may not transition to an activity within the space and may instead end use of the space in some fashion. Transition to block 452 enables exit from the activity monitoring loop.

If a transition trigger occurs at block 442, server 102 presents an "activity environment" at block 444 that is designed to enhance the specific activity to be facilitated within the space. For instance, where the activity is a rest activity, server 102 may automatically fade to a rainstorm sound track that mimics rain falling on pavement and light thunder noise and may also fade to a dark blue light that pulses along with the sound of the periodic thunder noise. As another instance, where the activity is focused individual work, server 102 may automatically lower the light intensity surrounding a work surface while maintaining high intensity white light on top of the work surface and the sound may fade to a low volume white noise track to drown out any ambient noises proximate the space.

In the case of a dyadic activity, the activity environment may include fading a sound track off and lowering lighting in a space generally while still having area lighting lit up above or proximate conferees in the space.

At block 446 server 102 monitors for a trigger or action that indicates the end of a specific activity or the end of a period assigned to the specific activity. For instance, in the case of a rest activity, the trigger may be the end of a period over which the activity was to occur. Thus, if a rest period or session was to include a total of thirty minutes including a two minute transition in during the welcome phase and a two minute transition out phase near the end of the session, server 102 would be programmed to recognize the end of a 28 minute period as a trigger and, at block 448, would move to block 450 at the end of the period and would present an "emerge environment".

As another instance, in the case of focused individual work, the trigger may be a conferee standing up within the space and opening the space door 105. In another embodiment the trigger may be a conferee turning off or otherwise disassociating her personal portable device from the space. In still another case the trigger may be 5 minutes prior to a next scheduled time for the space (e.g., prior to the start time of use of the space by another person). Other triggers are contemplated.

In the case of dyadic activities, the trigger may include opening of the space door, one or both of two conferees leaving the space, at least one conferee leaving and remaining out of a space for at least a threshold time period (e.g., five minutes), delinking of portable devices from the space, etc.

Until an end of activity trigger occurs at block 448, control continues to loop back through blocs 440, 442, 444 and 446. Once an end of activity trigger occurs, control passes to block 450 where server 102 controls the space affordances to present an "emerge" environment to indicate the end of an activity period and to help transition a space user out of the space. For instance, in the case of a rest activity within a space, the system may fade lighting up to a bright yellow light that floods the space, present a video of the sun coming up, fade in a morning sounds track including chirping birds and light waves rolling in on a beach, increase air circulation and decrease temperature by a few degrees. In the case of individual focused work, the system may increase area light generally while decreasing intensity of light on a work surface so that the light in an entire space is essentially uniform but at an intensity that is less than optimal for individual focused work, fade in a different sound track and change other environmental characteristics. In the case of dyadic work, in addition to changing lighting, sound, temperature and air circulation characteristics, the system may also facilitate storing of any digitally developed work product by querying conferees if any content (e.g., documents or files opened in the space) should be stored for subsequent use, e-mailed to one or several accounts such as one or more e-mail accounts associated with the conferees in the space, etc.

At block 452, server 102 monitors for an end of space use trigger. The end of space use trigger indicates that the person or persons that were most recently using the space no longer intend to use the space. For instance, an end of space use trigger may include a person leaving the space. In other cases an end of space trigger may require that a person remain outside a space for at least three minutes (e.g., some threshold duration). In other cases an end of space use trigger may require that a person affirmatively disconnect the person's portable device (e.g. a tablet, phone, etc.) from the space and leave the space for at least three minutes. In yet other cases a person may have to leave a larger space such as a building or a floor on a building or a depart on a floor of a building to disassociate from a personal or conference space.

Referring again to FIG. 11, at block 454, until an end of space use trigger is detected, control continues to loop back up to block 440 where server 102 monitors for circumstances indicating a transition to an activity. If a trigger is detected at 454, control passes back up to block 432 where server 102 represents the invite environment (e.g., green light) to invite other persons to use the space.

The space experience described above with respect to FIG. 11 includes four stages or phases and four trigger based transitions between the four phases at blocks 436, 442, 448 and 454. In other cases it is contemplated that less or more phases may occur, depending on the space experience that is being facilitated. It is also contemplated that more than one trigger may be specified for each of the phase transitions that occurs. For instance, referring again to FIG. 11, at block 448 where server 102 monitors for an end of activity trigger, server 102 may be programmed to monitor for any one of a space user leaving a space, affirmatively indicating an end to use of the space via a Room Wizard or the like, disassociating the user's personal device from the space, etc.

In at least some embodiments it is contemplated that different spaces may be fitted out with different affordances that are optimized for different activities. For instance, some spaces may be optimized to facilitate individual rest activities while other spaces may be optimized to facilitate individual focused work and still other spaces may be optimized to facilitate dyadic conferencing activities or video conferencing activities. In these cases, when a user transitions to an activity within the space at block 442 in FIG. 11, the server may automatically facilitate the activity that the space is optimized to present. For instance, when a user enters a space optimized for rest activities and closes a door to the space and causes the user's RFID device to be read (e.g., a block 442 trigger in FIG. 11), server 102 may present the rest activity space experience. As another instance, when a user enters a different space optimized for dyadic activities and a claiming or activity trigger occurs, the system may immediately present the dyadic space experience.

In at least some cases it is contemplated that while a space may be optimally designed to facilitate one or another space experience, a user may be able to use the space to facilitate a different space experience, albeit one that is less than optimal given affordances within the space. For instance, where only a first space that is optimized for dyadic activities is available for use at a specific time (e.g., all other spaces are used by others) but a user wants 30 minutes of rest, the user may opt to use the dyadic space for rest. Here, the user would specify a rest activity and server 102 would identify the affordances associated with the dyadic space and present a rest space experience within the dyadic space even though the experience would not be optimized for rest.

Figure 12:
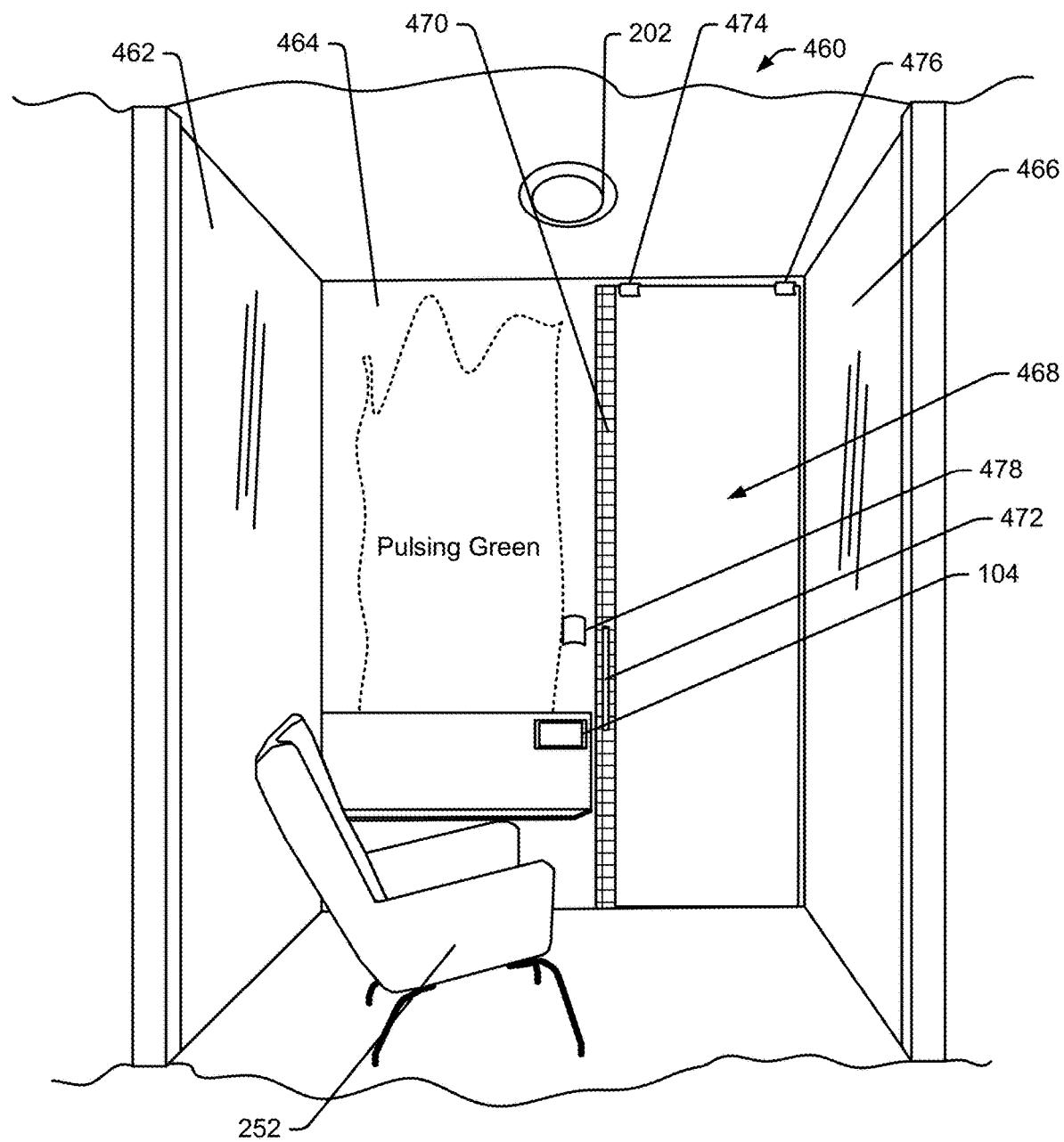
FIG. 12 is a perspective view of another space optimized to facilitate a specific type of space experience according to at least some aspects of the present disclosure.

Referring now to FIG. 12, an exemplary space 460 that includes affordances that are optimized for presenting a rest space experience is shown. The space affordances include single sided illuminated wall panels 462, 464, 466 (see again the single sided light panel structure in FIGS. 3 through 5) and a fourth panel (not shown) where one of the panels 464 forms an egress 468 that is closable via a sliding door 470 that includes a handle 472. Sensors 474 and 476 are mounted within the egress 468 to detect the location of the door 470. A speaker 202 is mounted in a ceiling structure, an RFID sensor/reader 472 is mounted in wall structure 464 and a room control device (e.g., a Room Wizard) 104 is also mounted within the wall structure 464. A comfortable lounge chair 252 is provided within the space 460. In at least some embodiments the lounge chair 452 may have at least some reclining capabilities.

Figure 13:
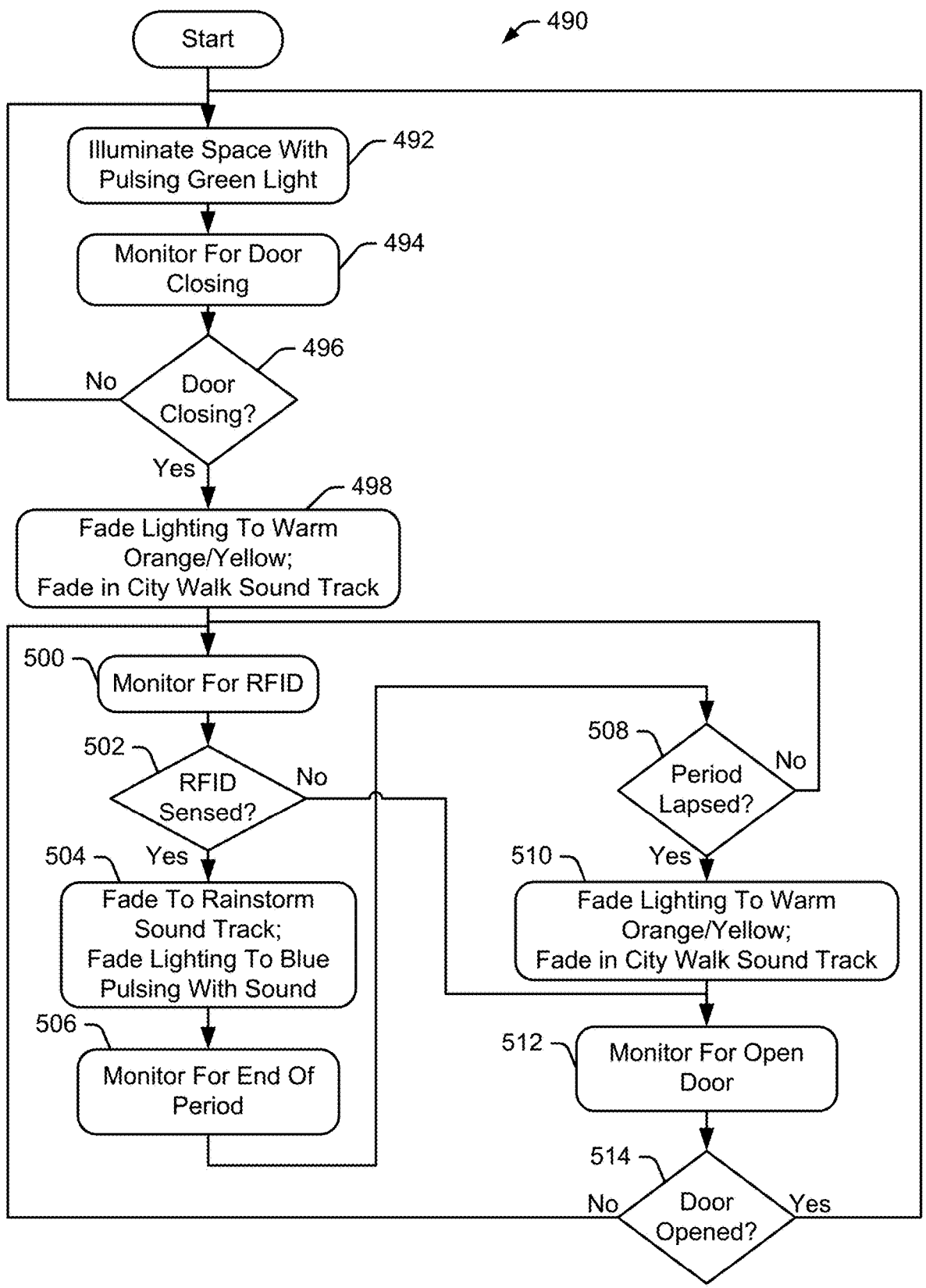
FIG. 13 is a flow chart similar to the FIG. 11 flow chart, albeit for facilitating a rest space experience within the space shown in FIG. 12.
Figure 14:
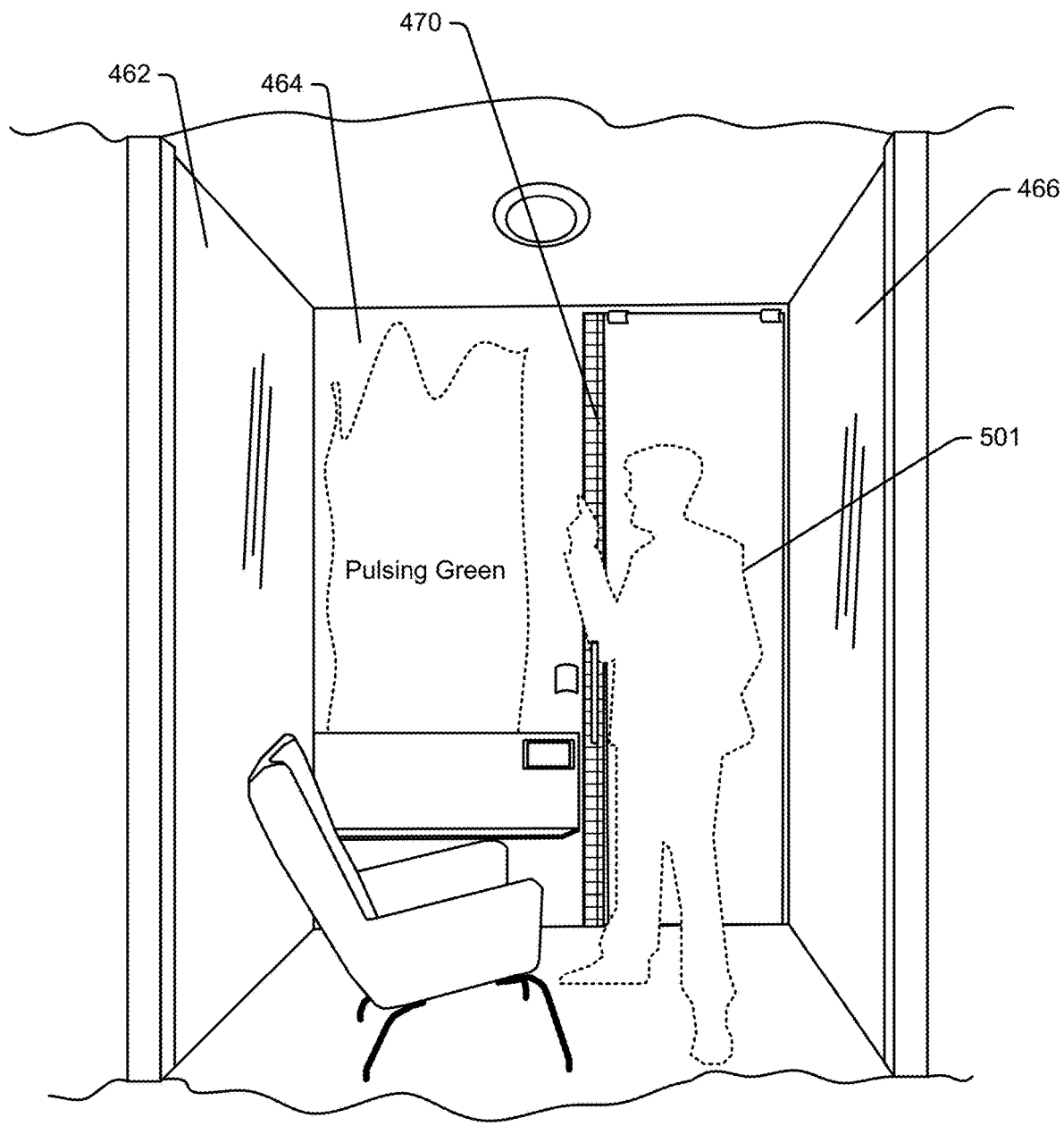
FIG. 14 is similar to FIG. 12, albeit showing a space user standing within the space.
Figure 15:
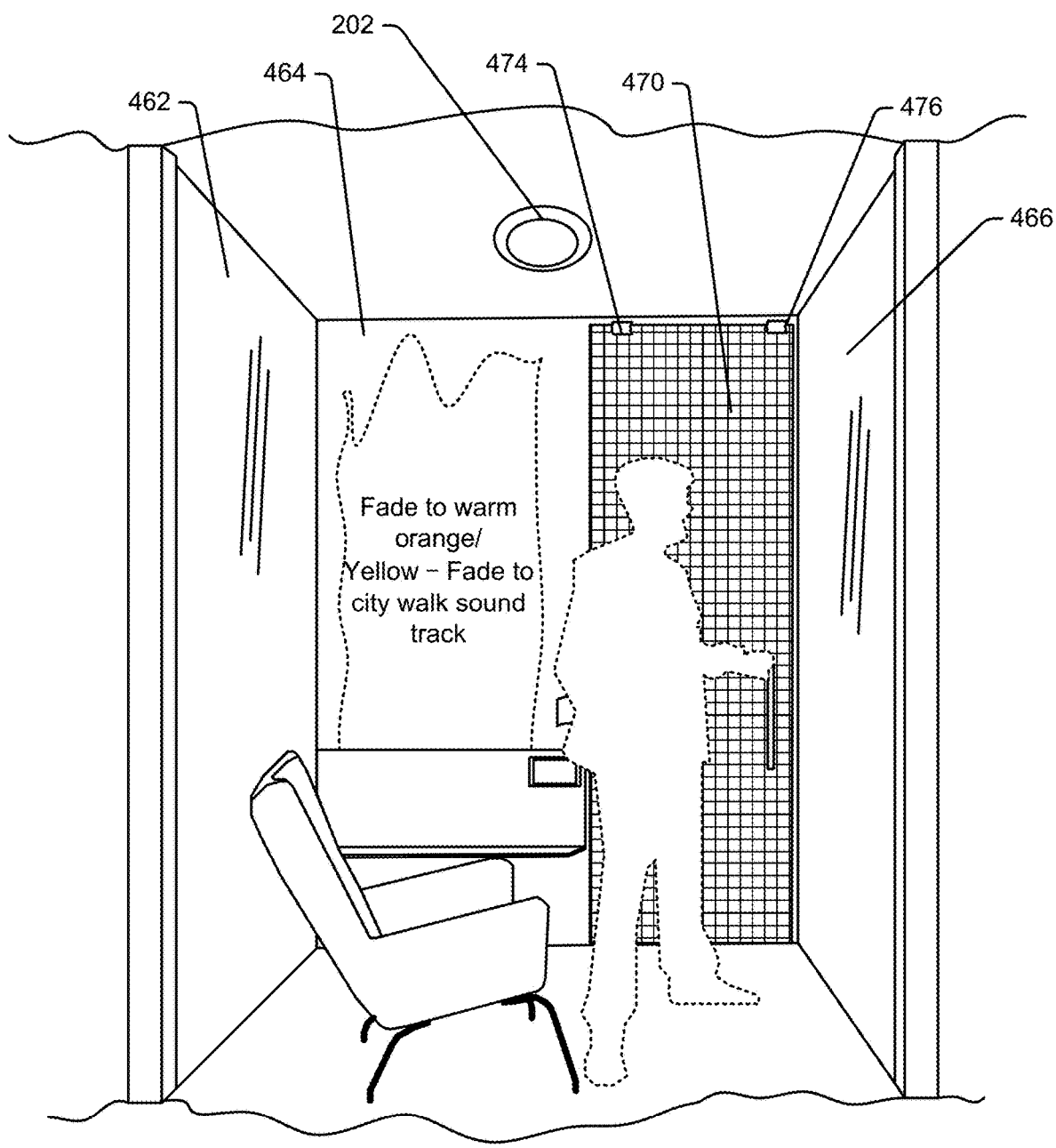
FIG. 15 is similar to FIG. 1, albeit showing the user closing the door to the space illustrated.

Referring to FIG. 13, a process 490 that shows an exemplary rest space experience that may be facilitated within the space 460 of FIG. 12 is shown. Referring also again to FIG. 1, at block 492, server 105 presents an invite environment by illuminating the wall light panels 462, 464, 466 and the fourth light panel (not shown) with pulsing green light. In FIG. 14, a potential space user 501 has entered the space. At this point the invite environment is continually presented in this example. At block 494 server 105 monitors sensor 474 to determine when the door 470 starts to move to the closed position. In FIG. 15 it can be seen that the user has closed the door 470. At block 496, once door movement toward the closed position is sensed, control passes to block 498 where server 102 fades the light within the wall panels from the pulsing green to a non-pulsed warm orange/yellow and also fades on a city walk sound track.

Figure 16:
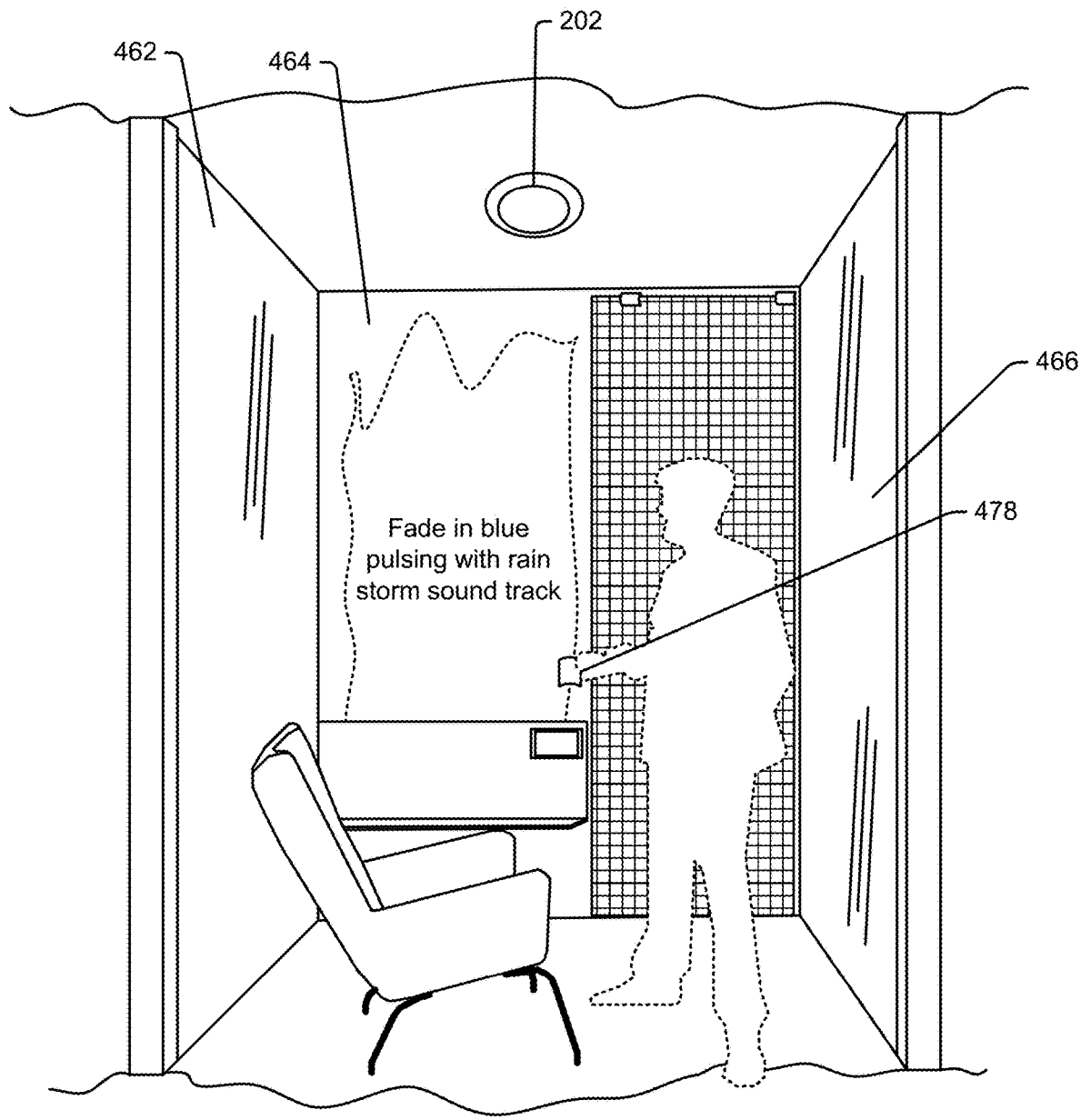
FIG. 16 shows the user of FIG. 15 presenting an RFID card for reading by a reader within the space.
Figure 17:
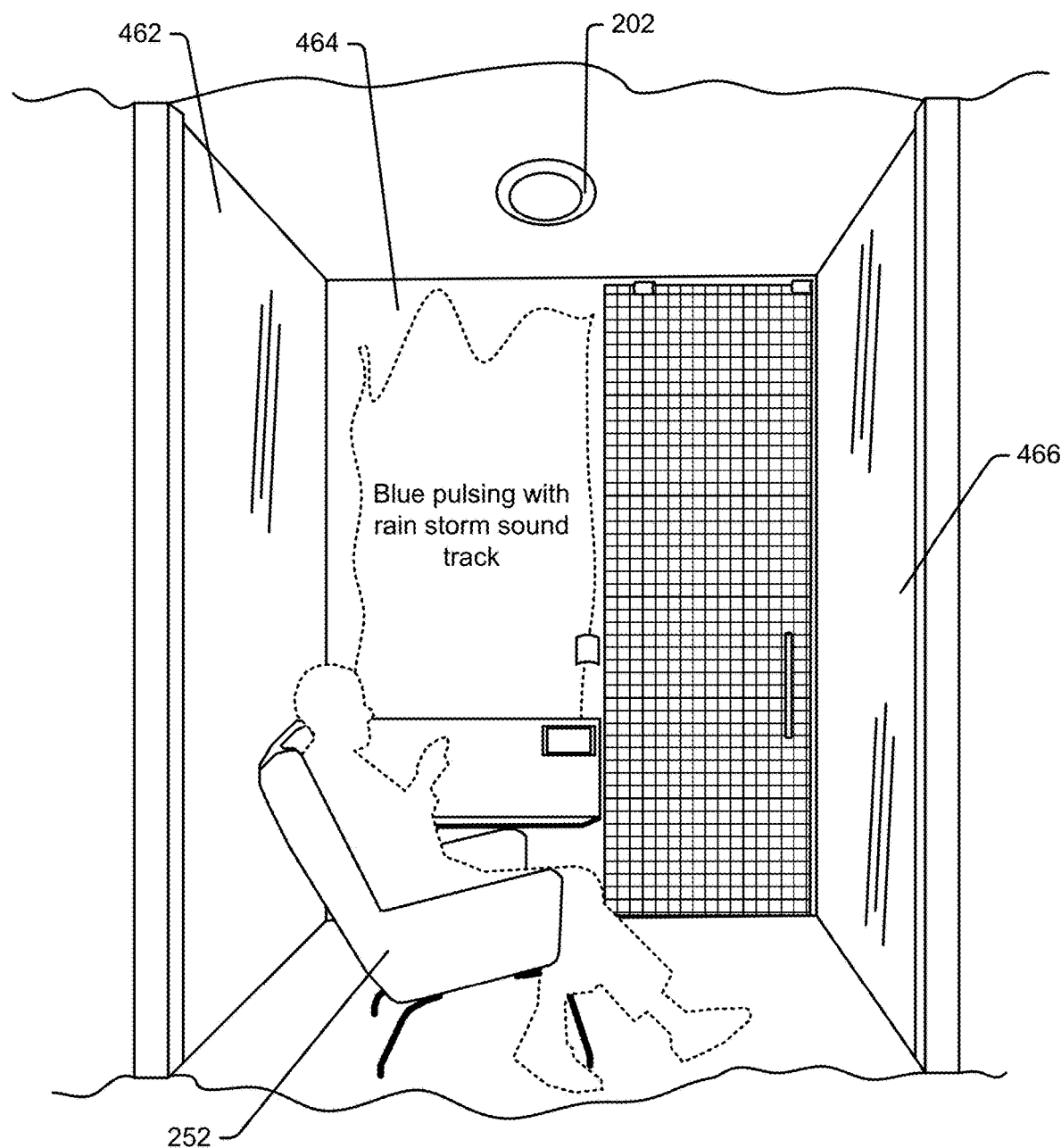
FIG. 17 shows the user of FIG. 16 in a seated position within the space.

At block 500 server 102 monitors sensor 472 for an RFID device read. IN FIG. 16 the user presents an RFID device to be read by sensor 478. Once and RFID device is read at 502, control passes to block 504 where server 102 fades in a rainstorm sound track and fades the lighting effect to a blue pulsing effect where the pulses are synchronized with the sound track. Here, the blue pulsing light and sound track are designed to facilitate rest. As shown in FIG. 17, the user sits in the lounge 452 and assumes a comfortable position as the light and sound track fade into the rest phase states.

Figure 18:
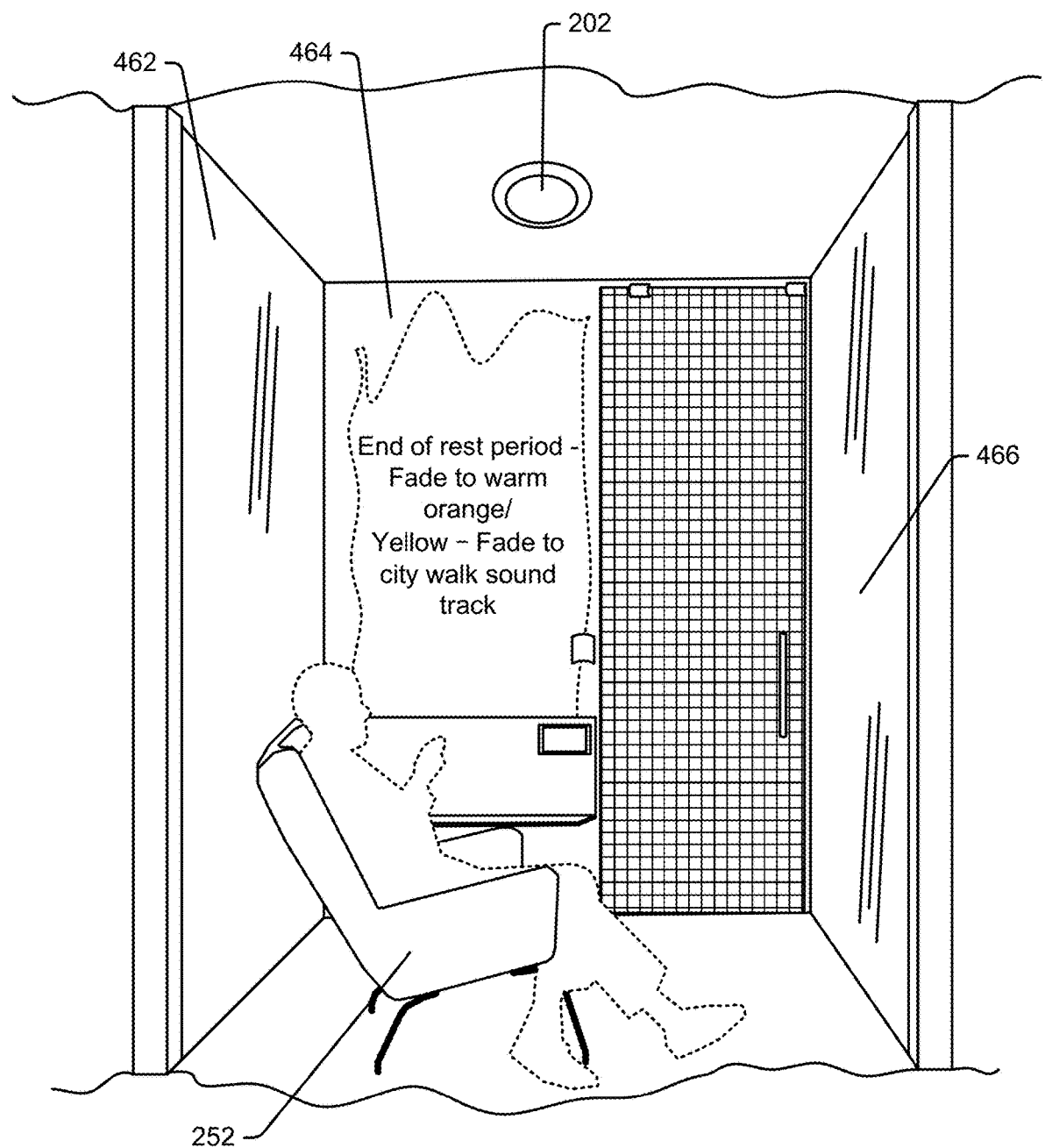
FIG. 18 shows the user of FIG. 17 seated at the end of a rest activity and during an emerge phase of a space experience.

At block 506 server 102 monitors for an end of activity trigger. Here, in at least some embodiments, the end of activity trigger will be the end of a period (e.g., a 30 minute rest period). At block 508, as the end of a period is approaching (e.g., two minutes prior to the end of the period during which the user has reserved the space for), control passes to block 510 where server 102 fades to the emerge environment. In this case the server 102 fades to a warm orange/yellow and fades in the city walk sound track again. This time the warm light may be pulsing and the city walk sound track may fade to a higher volume than presented at block 498. Near the end of the reserved period, the system may identify a next scheduled event for the space user and may generate an audible message to the user indicating the next event. In the alternative, the server may identify two or more events scheduled for the user and present a full or truncated schedule in an audible message. In FIG. 18 it is shown that at the end of an activity the system will present an emerge environment.

Figure 19:
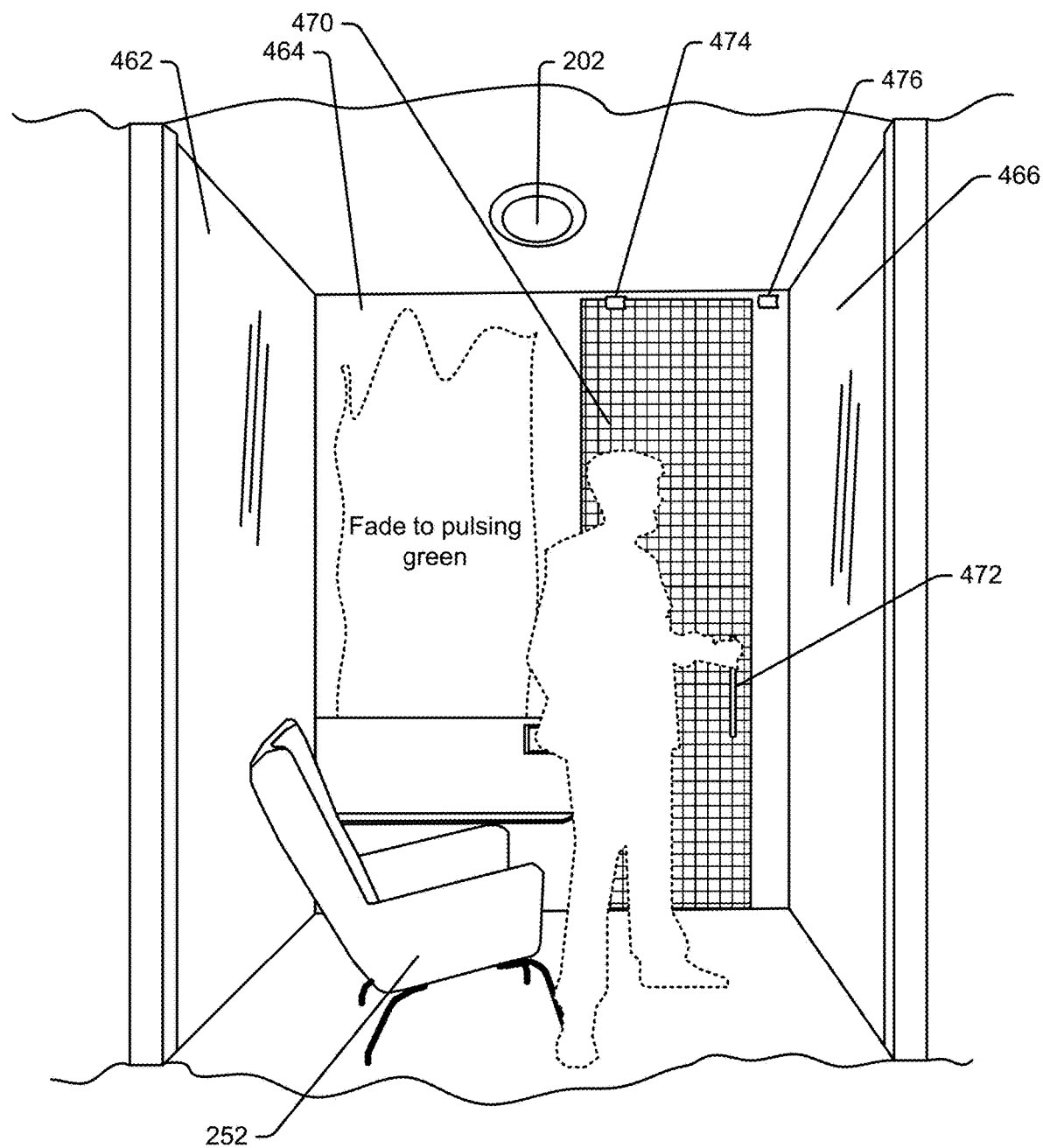
FIG. 19 shows the user of FIG. 18 opening a space door which acts as a trigger to start an invite phase of space control.

At block 512 server 102 monitors for an end of space use trigger. In FIG. 13, the end of space use trigger includes opening the space door. In FIG. 19 the user is shown opening the door 470 which triggers the end of space use. Once door 470 is opened, control passes back up to block 492 where server 102 again presents the invite environment (e.g., green pulsating walls).

As described above, other triggers and phase environments for a rest space experience are contemplated. For instance, the simple door open trigger at block 514 may be replaced by a door open and remains open for at least three minutes trigger if the period during which the space is reserved has not lapsed. As another instance, an RFID read may not be required to kick off a rest activity and closing a door within the rest space 460 may suffice for server 102 to present a rest space experience.

Figure 20:
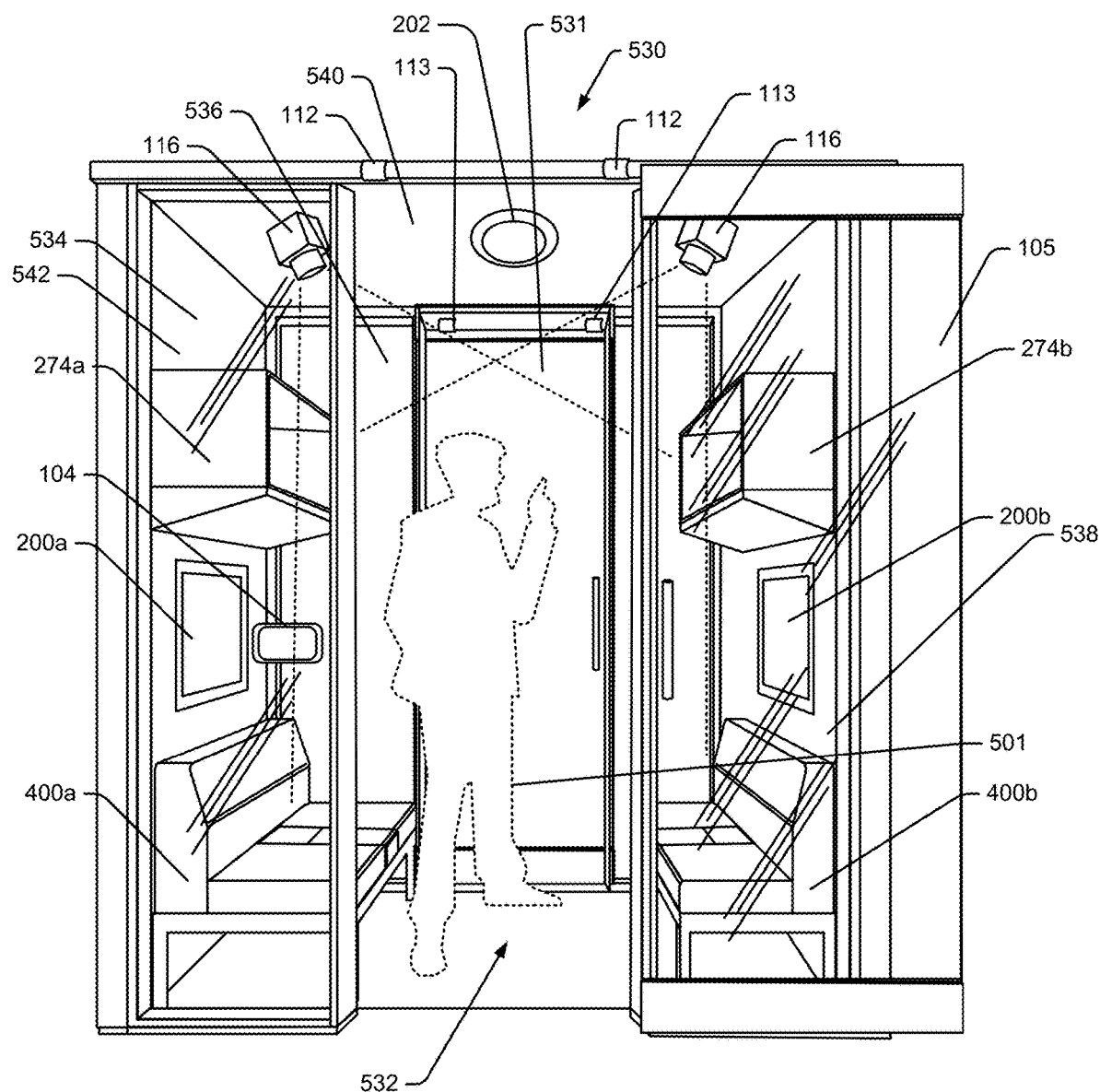
FIG. 20 is a perspective view of a space user in yet another space optimized for a specific activity that is consistent with at least some aspects of the present disclosure.

Referring now to FIG. 20, an exemplary space optimized to facilitate dyadic activities is shown. The dyadic space includes four wall subassemblies 534, 536, 538 and 542 that form a rectilinear space 532 and a ceiling structure 540 that closes off the top of the space. Each of lateral walls 534 and 538 may includes opaque panel assemblies generally. A storage bin 274a 274b is mounted to each of the lateral walls 534 and 536 at about head height (e.g., a lower floor member of each of the bins may be anywhere between four and a half feet and six feet above the floor structure). An upwardly shining light (see again 180 in FIG. 1) may be mounted to the top surface of each of the bins 274a and 274b for directing light toward the upper portion of each of the walls 534 and 538.

Each of the end walls 536 and 542 is similarly constructed and each includes double sided RGB LED light panels that can be controlled to generate virtually any color light and that shine light to either side thereof when illumination is turned on. Each end wall 536 and 542 forms an egress and includes a sliding glass door 105, 531 that can be opened or closed.

Referring still to FIG. 20, a lounge structure 400a, 400b akin to the lounge structure described above with respect to FIG. 10 is provided against each of the lateral wall subassemblies 534 and 538 such that persons sitting on the different lounges face each other. Each lateral wall includes a flat panel display screen 200a and 200b mounted therein at a height below the bottom surface of one of the bins 274a and 274b and above the lounge 400a or 400b positioned there below. In at least some embodiments each of the displays 200a and 200b may be offset to one side (e.g., closer to one of the end walls 536 or 542 than the other) so that if a user sits on one end of a lounge 400a, the display 200a can be seen substantially unobstructed to the side of the user's head. In some embodiments display 200a may be offset to one wall (e.g., 536) while the other screen 200b is offset to the other wall (e.g., 542).

Where each of the lounges 400a and 400b includes control devices like the ones described above with respect to FIG. 10, the control devices provided by one of the lounges may control one or both of the display screens 200a and 200b within the space 532. Thus, for instance, where a user links a portable device to a controller 410, output of the linked device may be presented on one or both of the displays 200a and 200b at the preference of the user. In other cases portable devices within space 532 may be wirelessly linked to server 102 for controlling output on the displays 200a and 200b.

Figure 34:
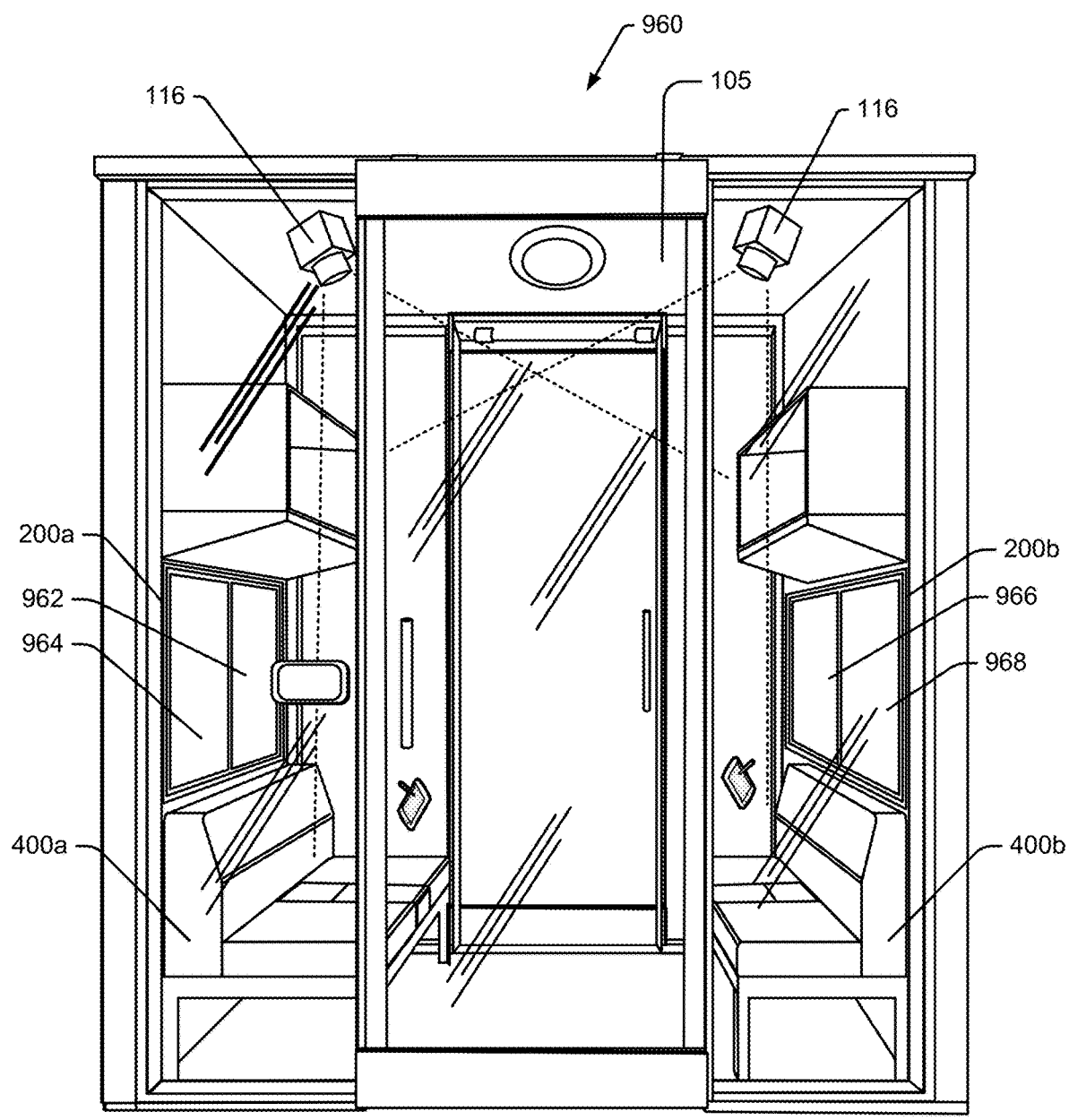
FIG. 34 is similar to FIG. 20, albeit illustrating a different set of display screens within a space.

Referring to FIG. 34, in another embodiment each of the displays screens 200a and 200b within a space 960 may have large dimensions selected so that the display screens cover substantially the entire surface of a wall section behind each of the lounges 400a and 400b above the lounge backrest portions. Here, a space user may use all or a portion of one of the display screens 200a or 200b or all or different portions of each of the display screens to present content within the space 960. In addition, a processor driving each of the display screens may be programmed to, in at least some cases, divide the space of each screen into two or more subspaces that can be controlled independently by one or different persons within the space 960 to present content. For instance, in FIG. 34 display 200a is shown divided into two spaces 962 and 964 while display 200b is shown divided into two spaces 966 and 968, where each of the spaces may be controlled to present different content via a wireless personal portable device (e.g., see 970 and 972 in FIG. 34) or via connection to one of the controllers 410 provided within one of the lounge assemblies 400a or 400b as described above.

Where one person is using space 960, in most cases it will be advantageous for that person to present content on displays that are opposite that person within space 960 and that face that person. For instance, in FIG. 34, a user seated on lounge 400a would likely prefer presenting content on display 200b while a user on lounge 200b would likely prefer presenting content on display 200a. In addition, a user on a right side of lounge 400a facing screen 200b would likely want content presented on display 200b centered on the portion of display 200b directly in front of that user (e.g., the left portion 968 of the display 200b that is aligned with the user on the right portion of lounge 400a while a user on the left side or portion of lounge 400a would likely want content presented on the right portion 966 of display 200b that is aligned with that portion. Where different sections of the display 200b (and 200a for that matter) are selectable for presenting content via a controller 410 or virtual on screen tools presented to a user via a portable device, the user could select the most suitable portion of a display in space 960 for presenting content based on the user's location.

Figure 35:
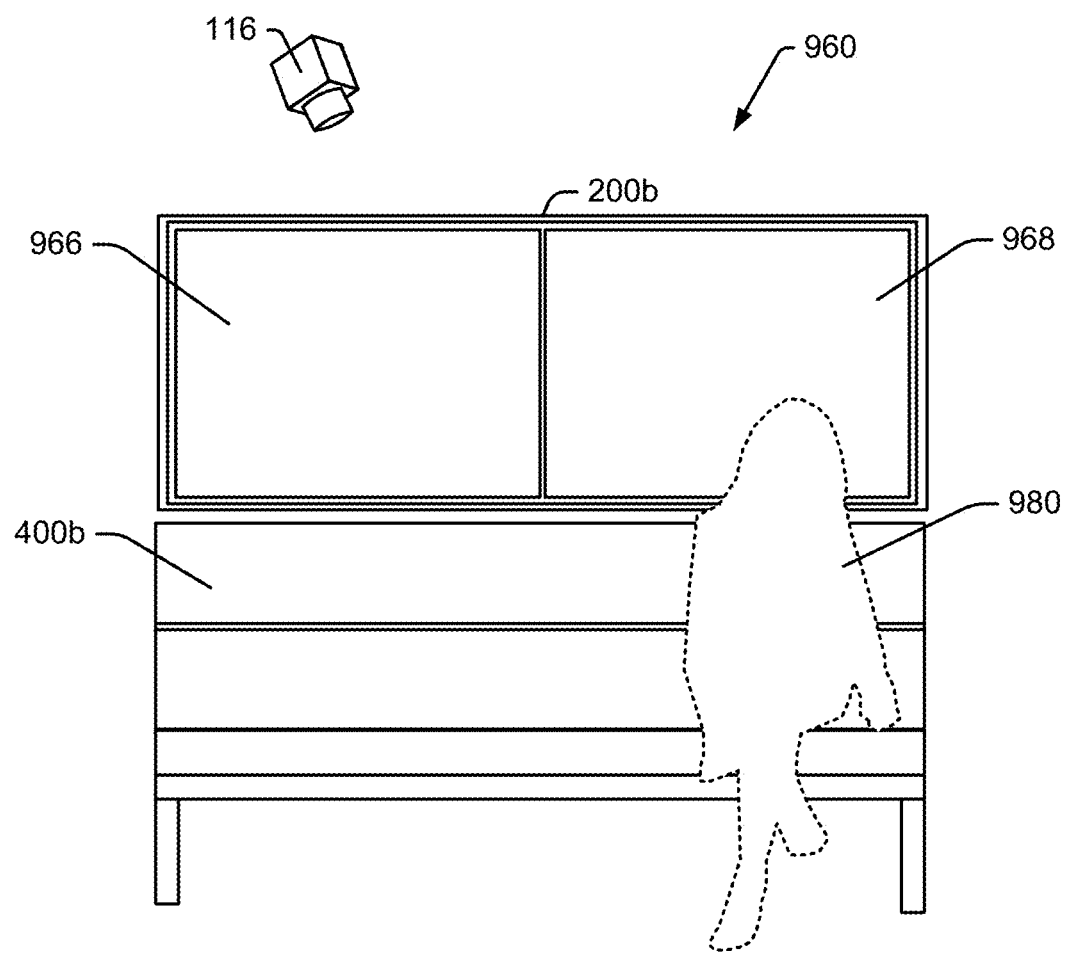
FIG. 35 is a front plan view of some of the components shown in FIG. 34.

In at least some cases the system server 102 may be programmed to use sensed information from within space 960 to determine user locations and may be programmed to automatically identify optimal emissive surface spaces for use by persons within the space 960 given intended use of the space. For instance, where a single person enters space 960 and closes the door 105, the system may recognize that a single person is in the space 960. Images from one of cameras 116 may be used to sense a person, the location of the person, the juxtaposition of the person within space 960, etc. When the person sits down on the right side of lounge 400a facing screen 200b and has a personal portable computing device (e.g., a tablet), the system may automatically start a process to link the portable device wirelessly to the server 102 to control content on the portion 968 of display 200b aligned with and spaced from the user. Once the portable device is wirelessly linked to the server 102, the server 102 may identify the location of the person on, for instance, the right side portion of lounge 400a and may present content in space 966. To this end, see also FIG. 35 where display 200b is shown and is divided virtually into two spaces 966 and 968. Here, the first person's content would be presented in space 968 apart from the first person.

Continuing, if a second person enters space 960 and sits across from the first person on the left section of lounge 400b (see the person 980 in FIG. 35), the server may recognize the second person's location and shift the first person's content on display 200b to section 966, to the side to the second person. In addition, in at least some cases, the system may automatically present the first person's content on the left portion 962 of display 200a (see again FIG. 34) to the side of the first person for the second person to view.

In some cases first and second person's can present content via the displays 200a and 200b at the same time. For instance, in FIG. 34, the first person may present content via display sections 962 and 968 so that the first person and a second person on lounge 400b can view the content at the same time without turning away from each other while the second person on lounge 400b presents in spaces 964 and 966 for both persons to view. Here, each person may use one of the controllers 410 described above or may use a virtual wireless controller (see again FIG. 10 above).

Figure 36:
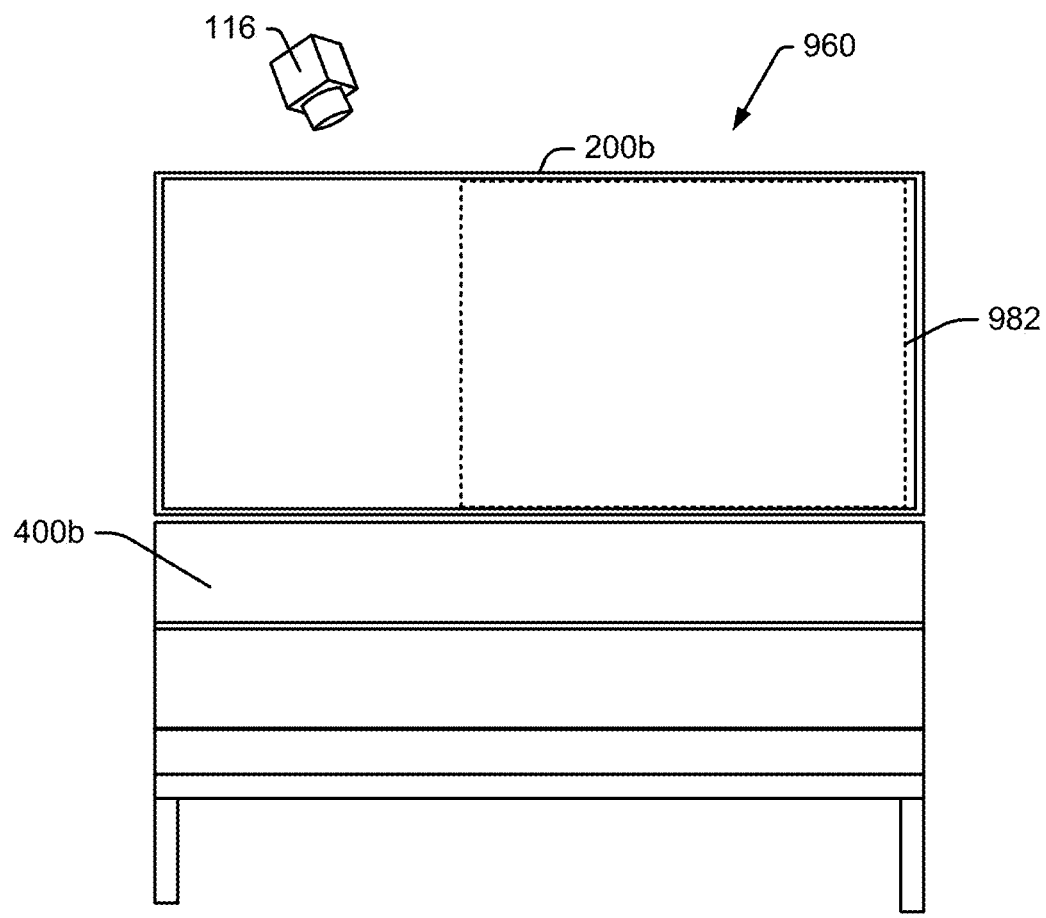
FIG. 36 is similar to FIG. 35, albeit illustrating a different virtual division of display screen space.

Referring to FIG. 36, in some cases when one person uses a space 960 to view content, the system may automatically recognize the single person use of space 960 and optimize content display size and display location for the specific user. For instance, in some cases the optimum size may be the largest size possible given formatting (e.g., dimensions) of content to be displayed. In FIG. 36, a single person's virtual content space is labeled 982 and is as large as possible therein given dimensions of the content to be presented therein. The single person content window may be automatically placed in front of the single user based on current location within the space. Referring to FIGS. 34 and 36, space 282 is automatically located at a location that would be in front of a user seated on the right half of lounge 400*a*. If the user moves from lounge 400*a* to lounge 400*b*, the content window may be moved from display 400*b* to an aligned location on display 400*a* automatically, based on images from cameras 116 or information generated by other sensors associated with space 960.

Figure 37:
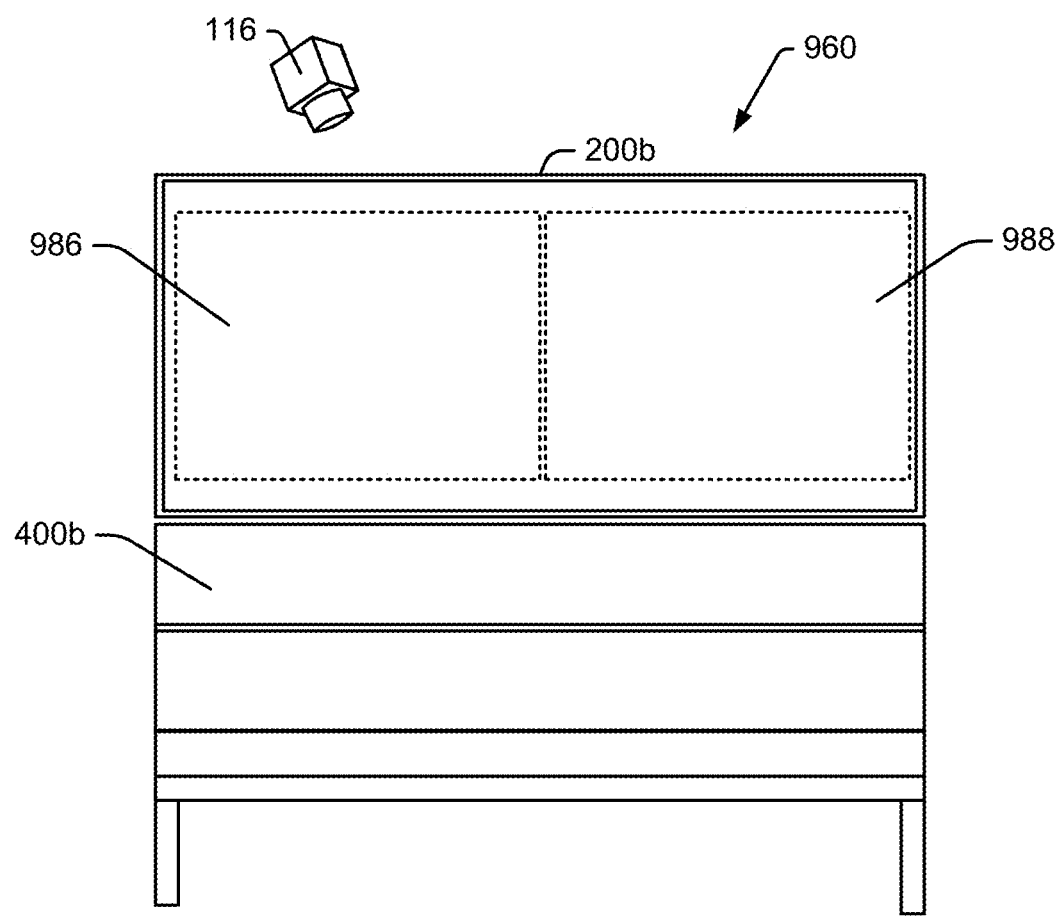
FIG. 37 is similar to FIG. 36, albeit illustrating a different virtual division of display screen space.

When a single user requires two adjacent content spaces or each of two persons in space 960 requires a separate content window on one of the space walls, the sizes of the spaces used by each of the persons may again be automatically optimized. For instance, see FIG. 37 where spaces the size of each virtual space 986 and 988 is relatively smaller than the size of space 982 in FIG. 36 to optimize for presenting two content spaces automatically. In FIG. 37, the height dimension of each space 986 and 988 is less than the maximum height allowed by display screen 200*b* to maintain the relative dimensions of the content being presented.

Referring again to FIG. 20, a speaker 202 is mounted in the ceiling structure 540. Two cameras 116 are mounted to the ceiling for obtaining images of fields of view within space 532. Images from the cameras 116 are provided to server 102 for processing. Door sensors 112 and 113 are provided for each of the doors 105 and 531. A space control device (e.g., a Room Wizard) 104 is mounted to an external surface of wall subassembly 534.

Referring yet again to FIG. 20, in the case of a space 530 optimized for dyadic activities, prior to a user entering the space, the space may pulse green light within the two sided light panel wall subassemblies 536 and 542. In addition, the display devices 200*a* and 200*b* may also pulse green to present an invite environment. When a user 501 walks into the space 532, analysis of images from cameras 116 may cause server 102 to recognize that a user is present within the space. User recognition within the space 532 may operate as an interest trigger and server 102 may then fade or otherwise present a welcome phase environment (e.g., warm yellow/orange light, a welcoming sound track, control of displays 200*a*, 200*b* to provide simple instructions, etc.).

Figure 21:
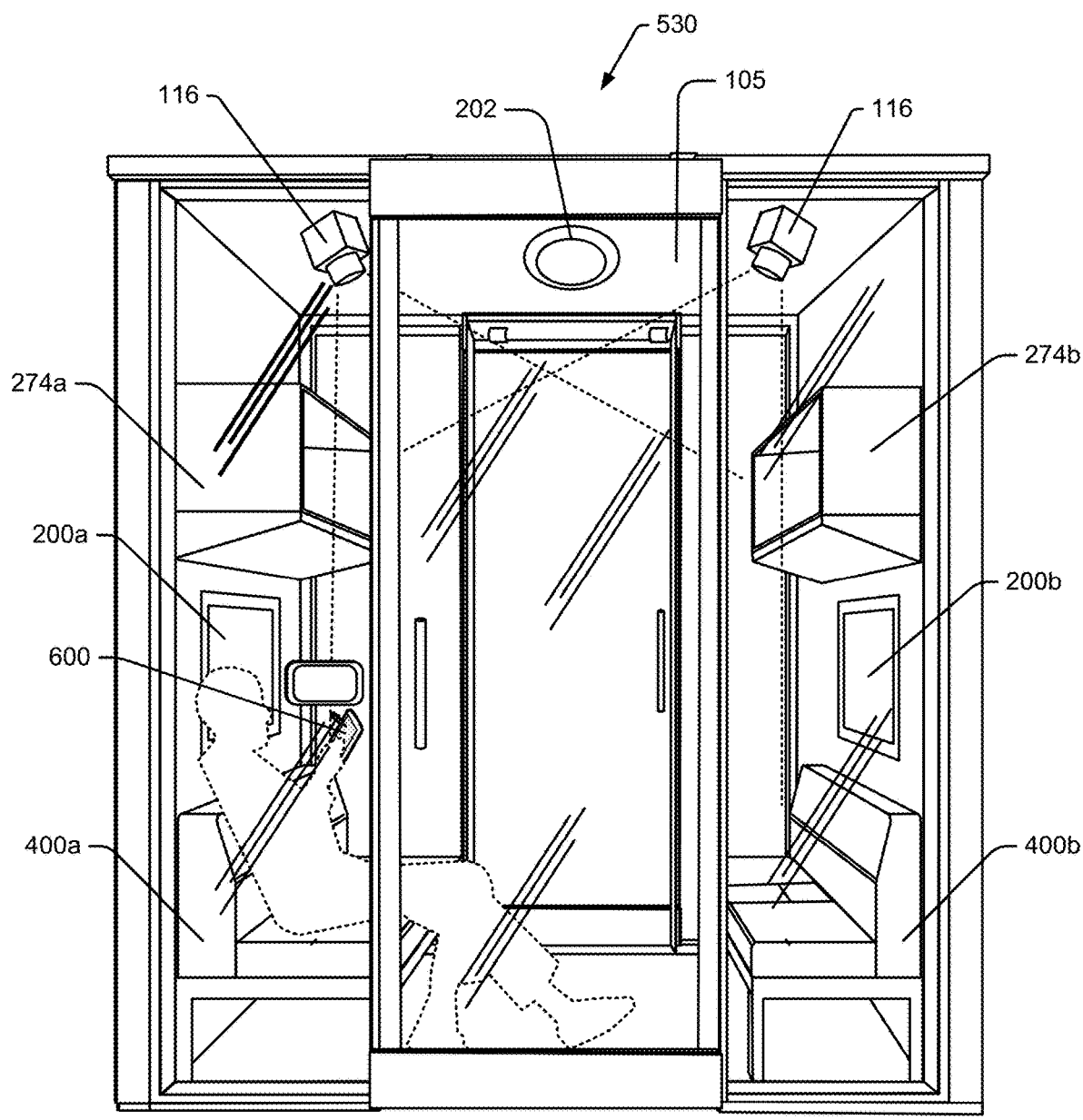
FIG. 21 shows the user of FIG. 21 in a seated position within the space and with the space door closed.

Referring to FIG. 20, change in the user's posture such as the user 501 sitting down on one of the lounges 400*a* may be discernible within camera images and may operate as an activity trigger causing server 102 to recognize a claiming of the space 532. Upon sensing that a user has assumed a seated position, server 102 may present an activity phase environment for a single person where for instance, a personal portable device 600 used by the user and present in the space 530 is automatically linked to the space 530 for controlling one or both of the display screens within the space. For example, where the user is facing screen 200*b* as in FIG. 21, the server 102 may only associate the user's device 600 with display 200*b*. If the user were facing display 200*a* instead, the server 102 may only associate the user's device 600 with display 200*a*.

If a second user enters space 530 to confer with the first user, images from cameras 116 may be used to recognize the second person and to present a different space experience or to transition to a different phase in an experience being presented. For instance, where a first user has been using the space 530 to view a document on screen 200*b*, when the second person enters the space 530, the system may automatically "hide" the document on display 200*b* and change the lighting in the space so that the lighting is optimized for a two person discussion. Where the second user assumes a seated position facing the first user, the system may control the lighting again to optimize for viewing display screens by dimming light in the walls 536 and 542 and increasing the intensity of light generated by the upwardly directed light fixtures mounted to the tops of bins 274*a* and 274*b*. Other changes may include coordinated light color changes and light effects (e.g., pulsing), sound track changes, temperature, air circulation, etc.

Other space affordance packages optimized for specific activities are contemplated. For instance, see FIG. 22 that shows another space configuration 640 including wall subassemblies (only three of four shown) 644, 646 and 648 and a ceiling assembly 650 that define a space 642. Wall subassembly 644 includes a plurality of single sided light panels while each of walls 646 and 648 includes opaque panels generally with indirect light panels 652 like the one described above in FIG. 6. Ceiling lighting 178 and a speaker 202 are mounted in the ceiling substructure 650. In addition, a wireless access point 112 is mounted in ceiling 650 for sensing personal devices (e.g., smart phones, a laptop, a tablet device, etc.). A video conferencing assembly 651 is positioned in front of a bench 653 where the bench 653 buts up against wall 644 so that the indirect light from panels 652 is directed at a user resting on bench 653 in an optimal fashion for video conferencing.

Figure 22:
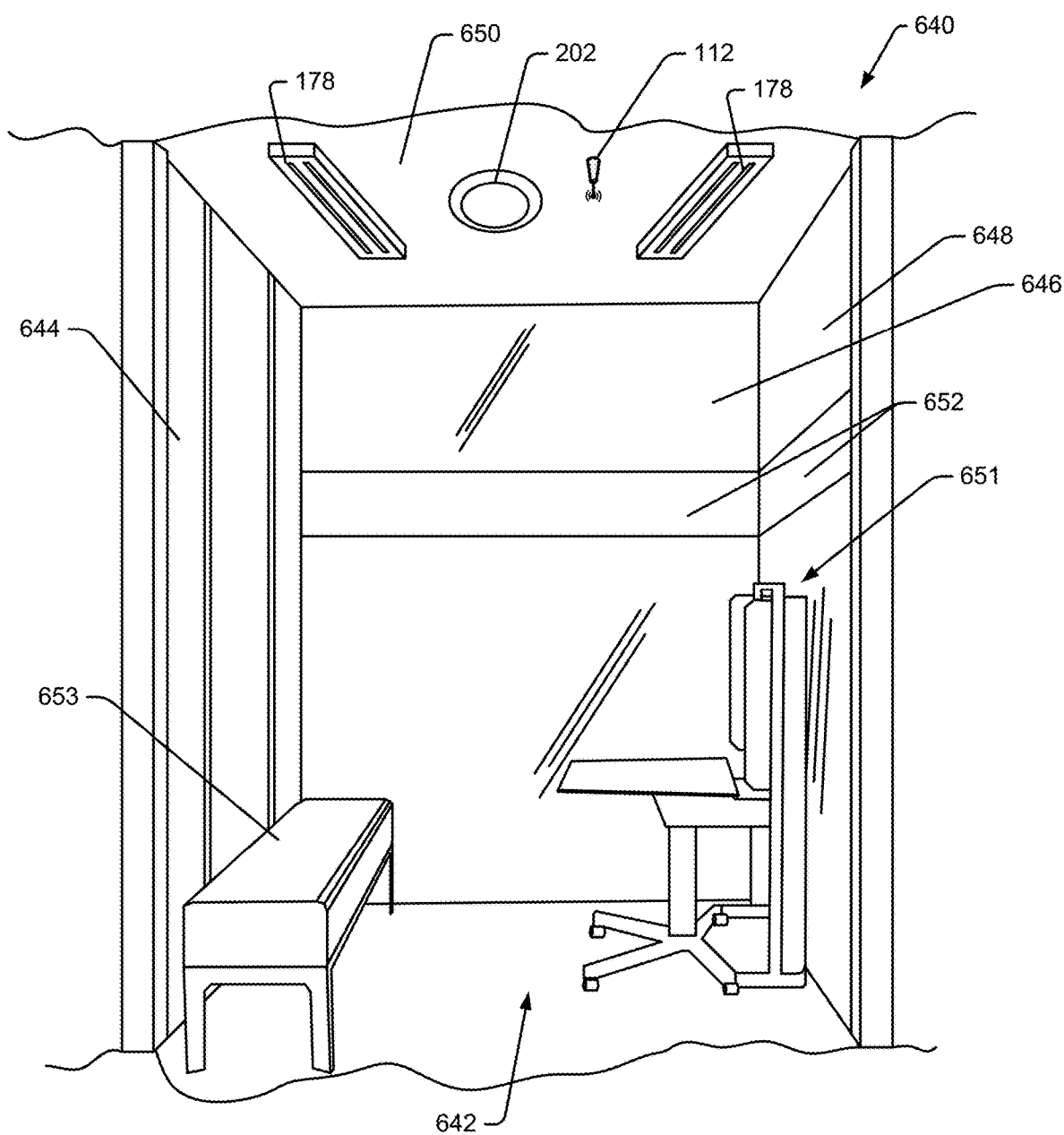
FIG. 22 is a partial side view of yet another space optimized for certain activities.

In FIG. 22, prior to a person entering space 642, server 102 may present the invite phase experience (e.g., green pulsing light). When a user enters space 642 with a personal portable computing device, signals received by access point 112 (and perhaps other access points within the general area of space 642) are processed to identify the location of the device within the space 642. Upon identifying a user's device in space 642, server 102 controls the space 642 affordances to fade to the welcome phase environment. Again, in at least some cases, this will include changing light color to a warm yellow/orange and presenting a sound track via speaker 202. In addition, server 102 may present a control interface to the user via the user's portable device asking the user if the user intends to claim the space 642 for video conferencing use. Here, the activity trigger may be selection of a video conferencing option on the portable device that is transmitted to the server 102 via access point 112. Upon receiving the trigger, server 102 may control assembly 651 to initiate a video conference and may adjust other space affordances including lighting 652 and the light generated by wall subassembly 644 to optimize for video conferencing.

Figure 23:
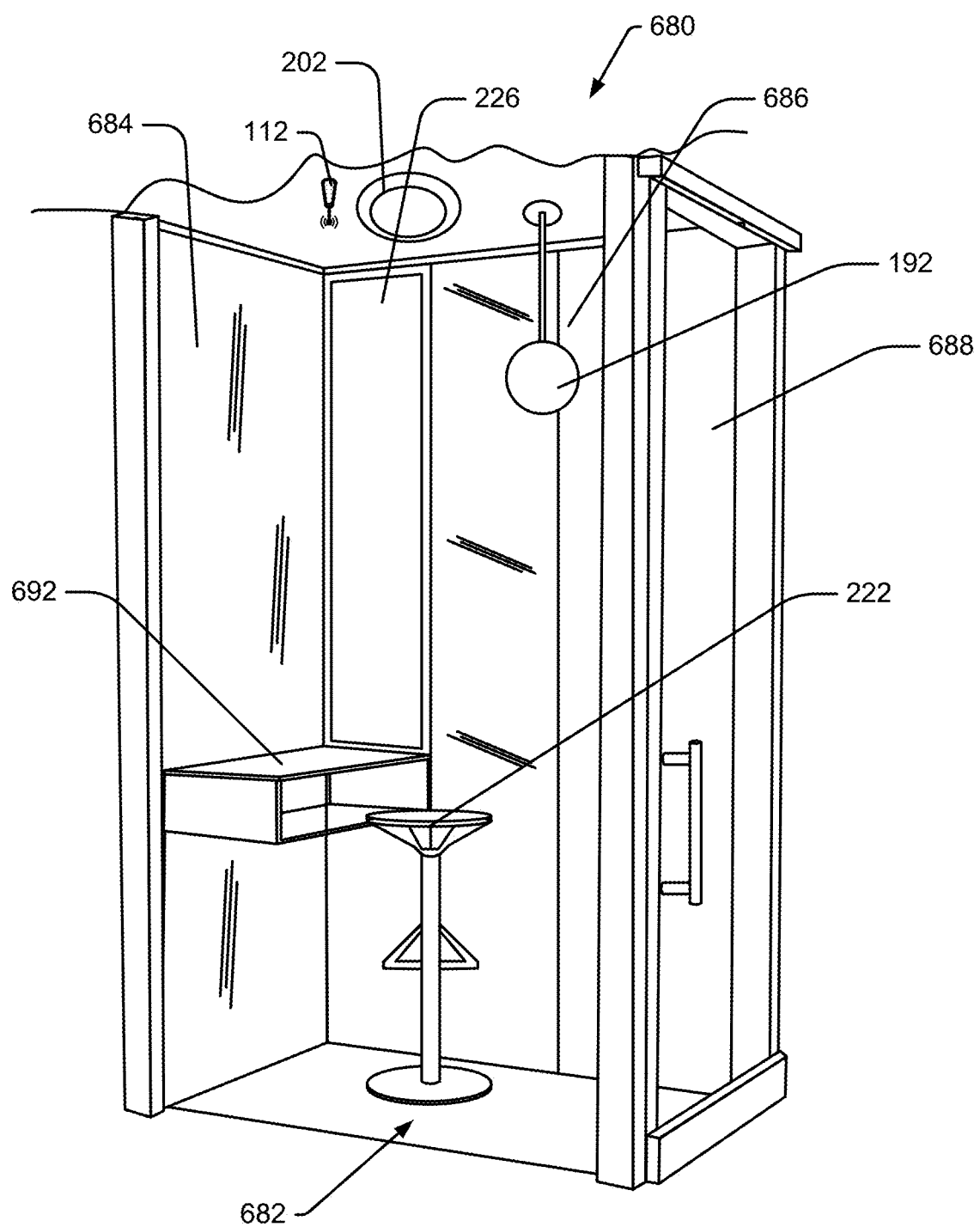
FIG. 23 is a partial side view of yet another space optimized for certain activities.

FIG. 23 shows a space configuration 680 that may be optimized for short individual activities like, for instance, fielding a phone call, generating an e-mail, reviewing a document, etc. To this end, configuration 680 includes wall subassemblies 684 and 686 (and a third wall now shown) that generally include opaque panels, albeit where assembly 686 includes a single sided light panel assembly 226 adjacent a desk or shelf assembly 692 that forms a horizontal work surface. A hanging light 192 extends downward from a ceiling substructure and a speaker 202 and an access point 112 are mounted to the ceiling structure as well. A door (either hinged or sliding) 688 is mounted to the wall substructures and is moveable between open and closed positions enabling access to the space 682 defined by the wall substructures. A stool 22 is provided within space 682 adjacent shelf assembly 692. Here again an invite phase environment is presented followed by a welcome phase environment, an activity environment and then an emerge environment during a space experience, with each transition between consecutive environments being initiated when one or more trigger activities occurs. In this case the activity phase environment may include illuminating panel light 226 with bright white light to illuminate the top surface of assembly 692 as well as playing a suitable sound track (e.g., white noise, etc.). Many other optimized spaces are contemplated.

Figure 24:
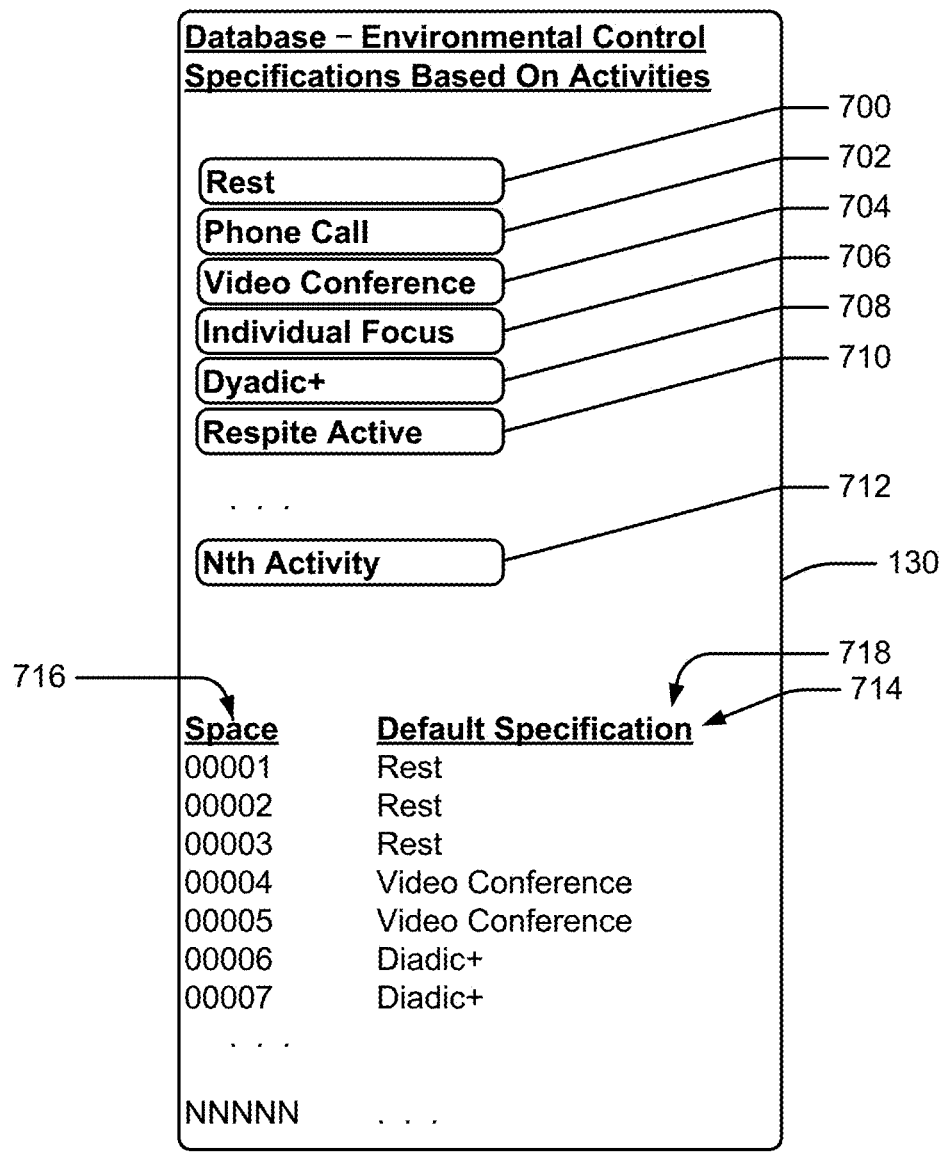
FIG. 24 is a schematic diagram of a database of space experience specifications.

In at least some embodiments, as explained above, the characteristics of any space experience of a specific type may all be substantially similar such that, for instance, any rest space experience presents the same phase characteristics to the extent possible given space affordances in specific spaces. To this end, referring again to FIG. 1 and now also to FIG. 24, database 130 may include space experience specifications 700 through 112 for each of N different space experiences including a rest space experience specification 700, a phone call space experience 702, a video conference space experience specification 704, an individual focus space experience specification 706, a dyadic space experience specification 708, a respite space experience specification 710, etc. Each specification indicates triggers as well as phase characteristics to be presented upon occurrence of each trigger.

Figure 25:
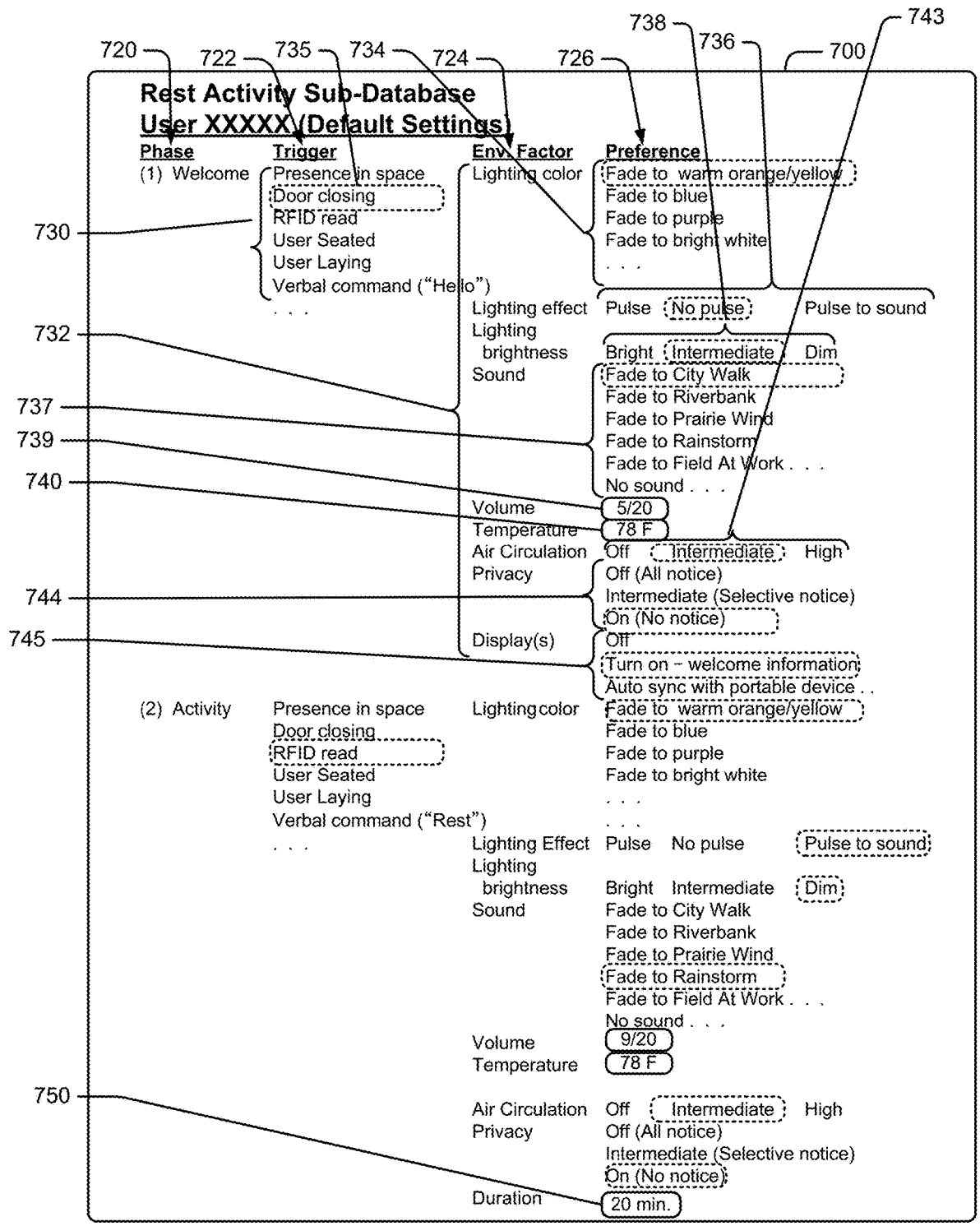
FIG. 25 is a detailed schematic diagram of apportion of an exemplary rest activity specification of FIG. 24.

For instance, see FIGS. 25 and 26 that show an exemplary rest space experience specification 700 including a phase column 720, a trigger column 722, an environmental factor column 724 and a preference column 726. The phase column 720 lists each of the four rest space experience phases including the welcome, activity, emerge and invite phased. For each phase in column 720, the trigger column 722 lists a set of possible triggers for initiating the phase in column 720 where currently set triggers are shown with phantom boxes there around. For instance, for the welcome phase in column 720, column 722 includes a set of possible triggers at 730 and the currently set or default trigger is the "door closing" trigger highlighted by a phantom box at 735. In FIG. 26 it can be seen that for the emerge phase, the trigger column includes three possible independent triggers including "end of duration", "door opening" and "space empty" triggers, any of which can trigger the emerge phase.

Referring still to FIGS. 25 and 26, in column 724, a set of possible controllable environmental factors are presented for each of the phases in column 720. Thus, for instance, the factor set 732 in column 724 are associated with the welcome phase in column 720 and includes all of the environmental factors that can or are controlled by the system server 102 to present the specific phase. In some cases the set of controlled factors may only be a subset of the full set 732 present in the database. Where a specific space is controlled to present a specific phase and the space does not include all of the affordances required to control all of the factors associated with the phase, the server will only control the subset of factors that can be controlled given the specific affordances within the space.

Referring yet again to FIGS. 25 and 26, preferences column 726 includes a set of effects that may be presented for each of the environmental factors in column 726. For instance, the set of effects 734 is specified for a lighting color factor in column 724, the set of effect 736 is presented for a lighting effect factor in column 724, set 739 is provided for the sound effect factor in column 724, set 738 is provided for a lighting brightness factor in column 724, set 737 is provided for a sound factor in column 724, set 743 is provided for an air circulation factor in column 724, set 744 is provided for a privacy factor in column 724, set 745 is provided for a display factor in column 724. Volume and temperature fields 739 and 740 are also indicated in preference column 736 for the welcome phase in column 720.

Again, default preferences are indicated by phantom boxes about specific preferences in column 736. Thus, for instance, the lighting color preference for the welcome phase is "fade to warm orange/yellow", the lighting effect is "no pulse", the sound effect is "fade to city walk", etc.

Some phases may have different subsets of triggers, environmental factors and preferences than others. For instance, see in FIG. 25 that there is a "duration" factor 750 associated with the activity phase while there is no duration factor associated with the welcome phase. FIGS. 25 and 26 represent default settings for the rest space experience. Referring again to FIG. 24, specifications similar to the FIG. 25 and FIG. 26 specification would be provided for each of the other space experiences 702 through 712.

In addition to including the experience specifications, database 130 also includes a sub-database 718 that associates different spaces with different default space experiences. Here the default experiences will usually be the experiences for which specific spaces have been optimized. Sub-database 718 includes a space column 716 and a default specification column 714. Column 716 lists each space that is associated with the FIG. 1 system and, for instance, may include a listing of a large number of differently afforded spaces 00001 through NNNNN. Column 714 includes a default specification (e.g., one of the specifications 700 through 712 in FIG. 24) for each of the spaces in column 716. For instance, each of spaces 00001, 00002 and 00003 are associated with the default rest specification 700, each of spaces 00004 and 00005 are associated with the default video conference specification 704, and so on.

Referring again to FIG. 1, in at least some embodiments it is contemplated that a system administrator may be able to use an administrator's computer 140 to change characteristics of each type of space experience. For instance, triggers for each phase of each experience as well as the characteristics of each phase experience may be customized given space affordances as well as the effects that an administrator intends to present. In at least some cases an administrator may also be able to change the space experiences that a specific space presents including, for instance, the default space experience associated with each space. To alter space experiences (e.g., triggers, characteristics, defaults, etc.), the administrator may access an interface that presents the database information as shown in FIGS. 25 and 26 for a specific space and may then be able to select a default space experience and then set triggers and preferences as desired.

It has been recognized that, in at least some cases, a space user will want the ability to customize space experiences during different space sessions. For instance, while a rest space experience may by default, present blue illumination that pulses with a sound track during the rest activity phase of the experience, a specific user may instead prefer a dark orange non-pulsing illumination during the activity phase. As another instance, the same user may prefer a different sound tract and a higher volume than the default track and volume during the emerge phase of the rest experience.

To accommodate customization of space experiences by specific users, in at least some embodiments a space user may use a computer (e.g., 140 in FIG. 1) to set personal parameters for each type of space experience or for a subset of the space experiences presentable by the system. Here, as in the case of a system administrator, the interface would present information akin to the FIGS. 25 and 26 database and allow the user to select different preferences and triggers.

In addition or instead of providing users the capability of setting parameters via a computer 140 that is separate from a space, an environment interface may be presented via a space or room controller (e.g., a Room Wizard) that is extremely intuitive and which can be used at the location of a space to set various space experience characteristics during any space session. To this end see the exemplary space controller interface screen shots in FIGS. 27 through 32. In at least some cases when a user determines that a particular space experience was particularly effective, the user may store the experience for subsequent use when the user wants another similar experience.

Figure 27:
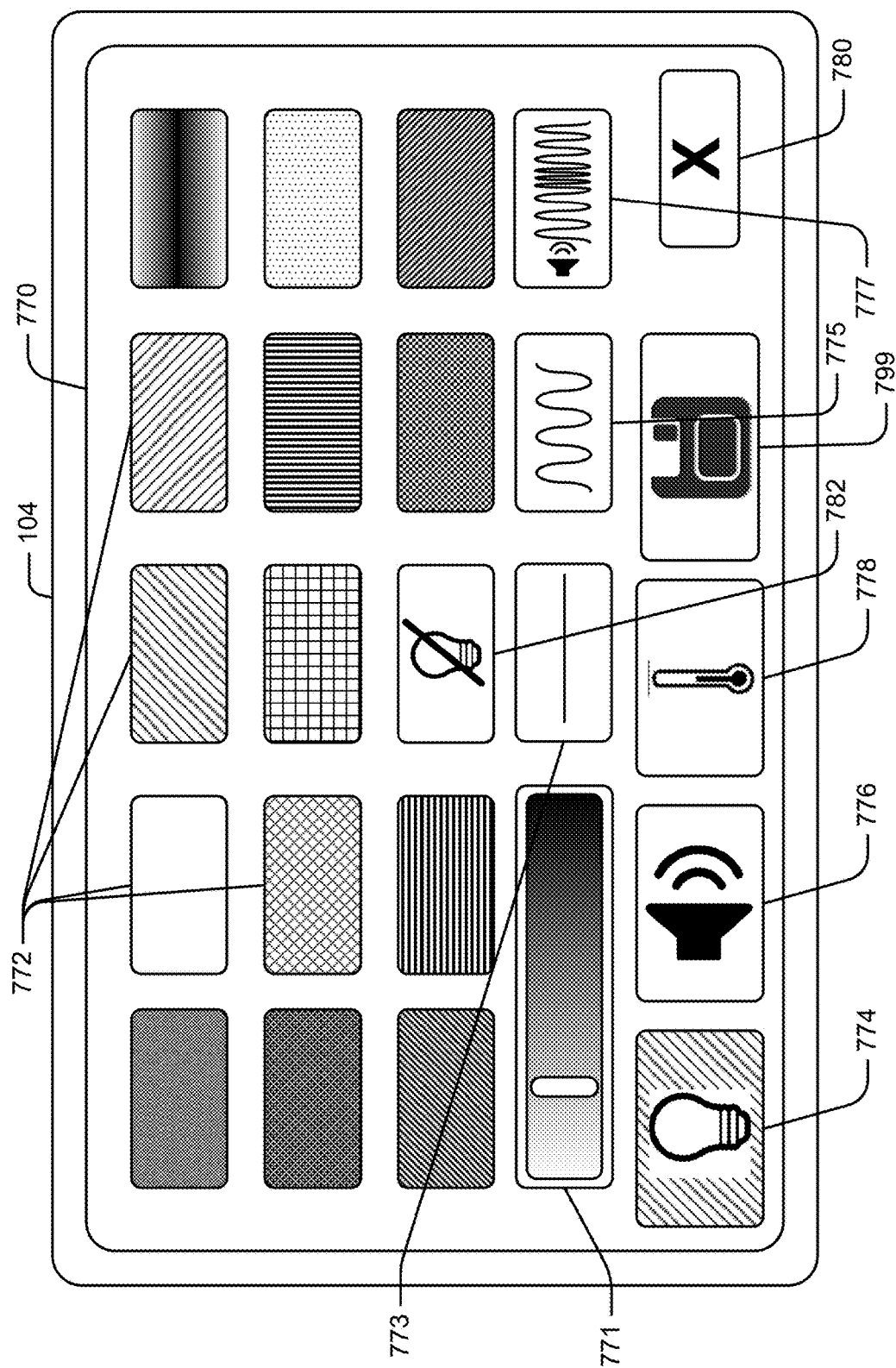
FIG. 27 is a schematic representation of a screen shot for controlling light effects within a space using a space control device according to at least some aspects of the present disclosure.
Figure 28:
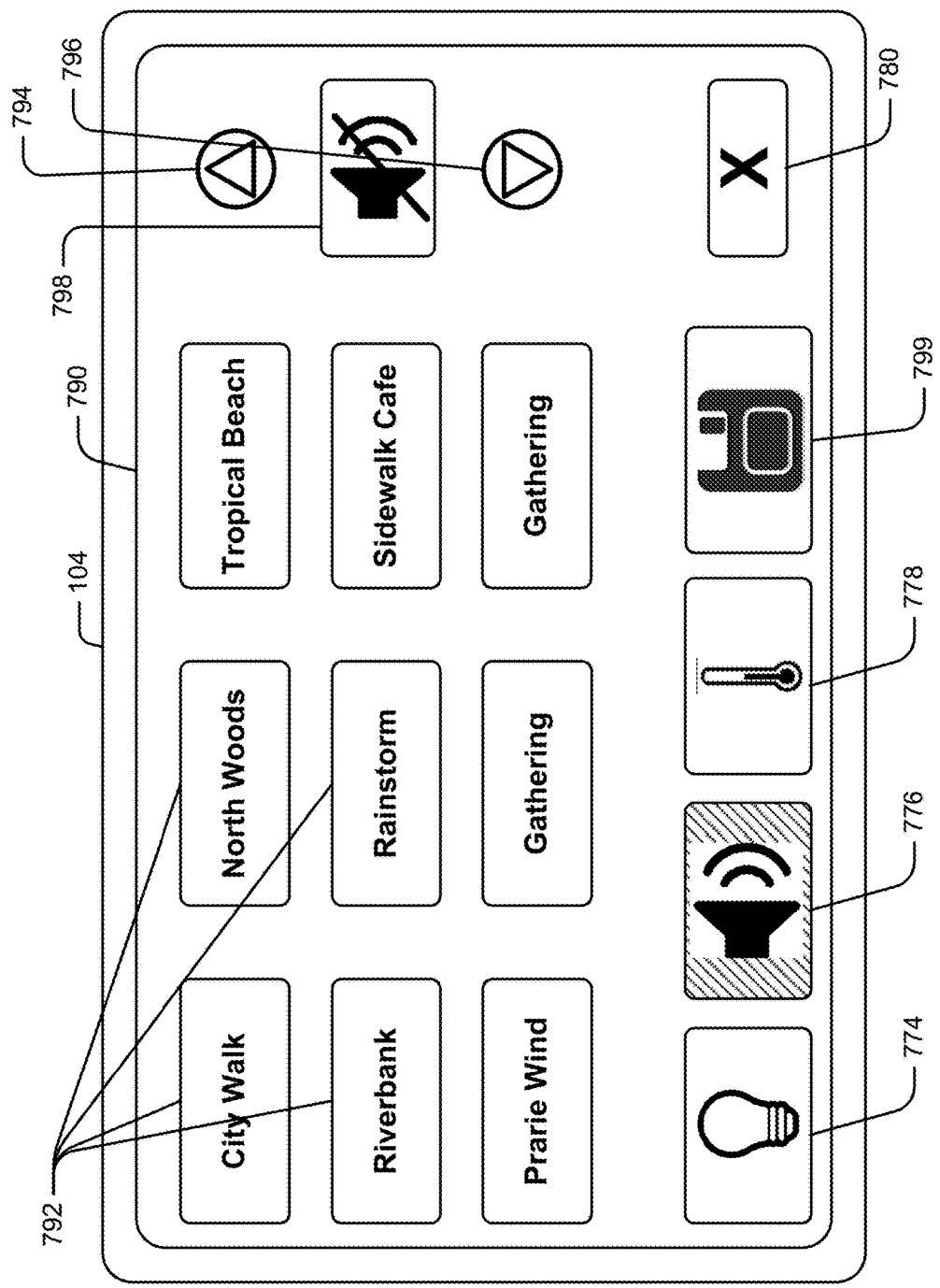
FIG. 28 is similar to FIG. 27, albeit showing a screen shot for selecting sound tracks and effects to be presented within a space.
Figure 29:
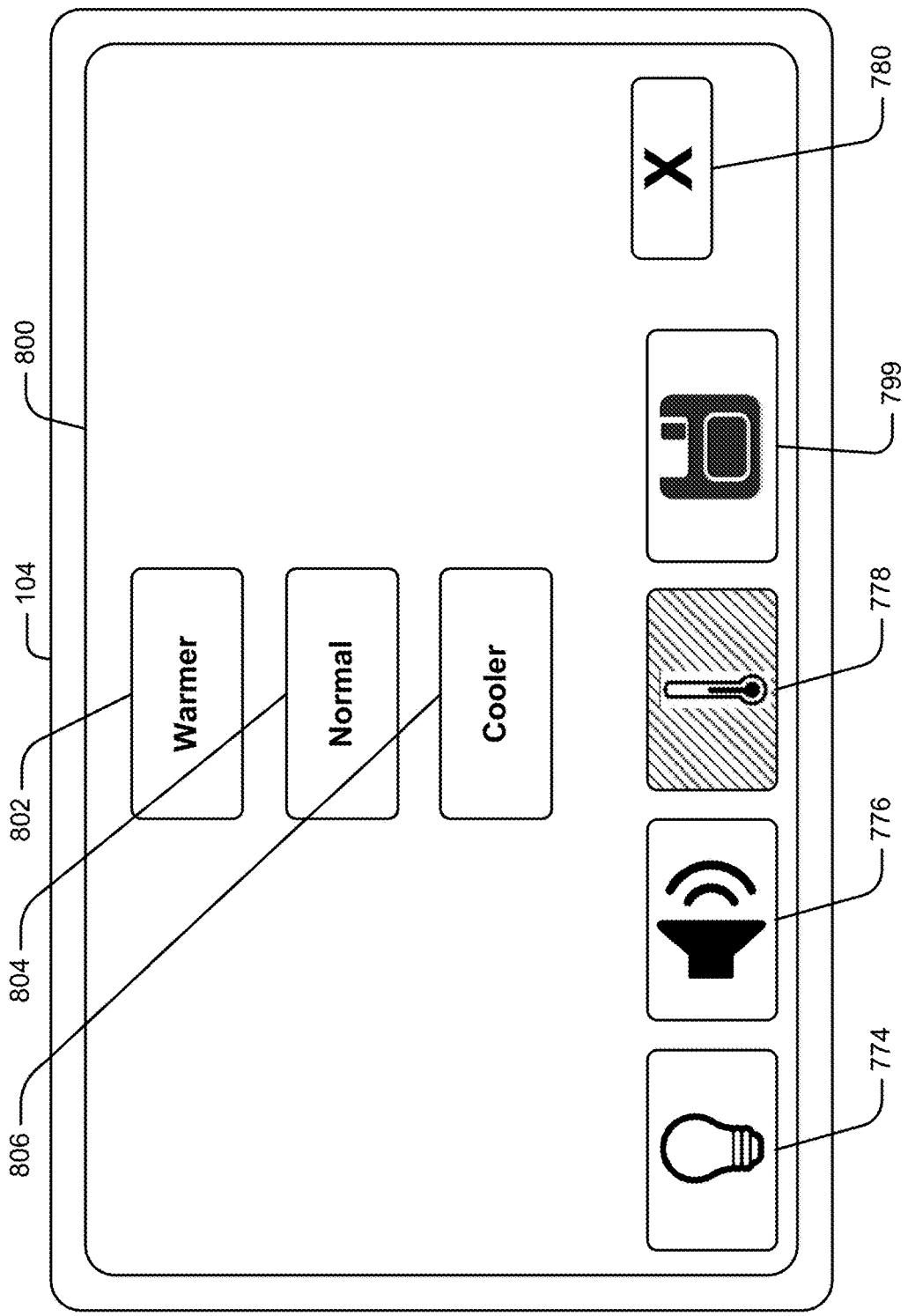
FIG. 29 is similar to FIG. 27, albeit showing a screen shot for selecting temperature effects to be controlled within a space.
Figure 30:
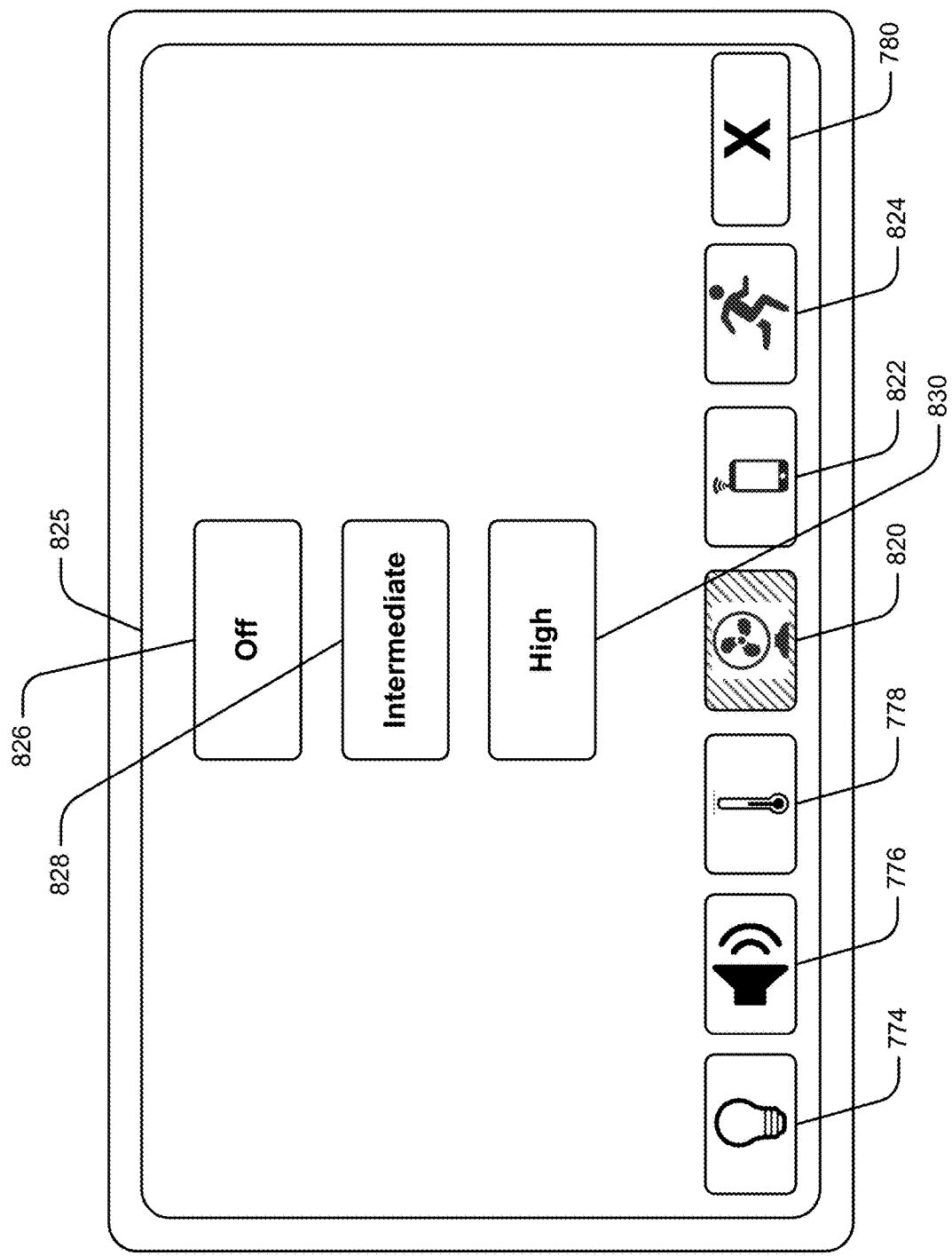
FIG. 30 is similar to FIG. 27, albeit showing a screen shot for selecting air circulation effects to be controlled within a space.
Figure 31:
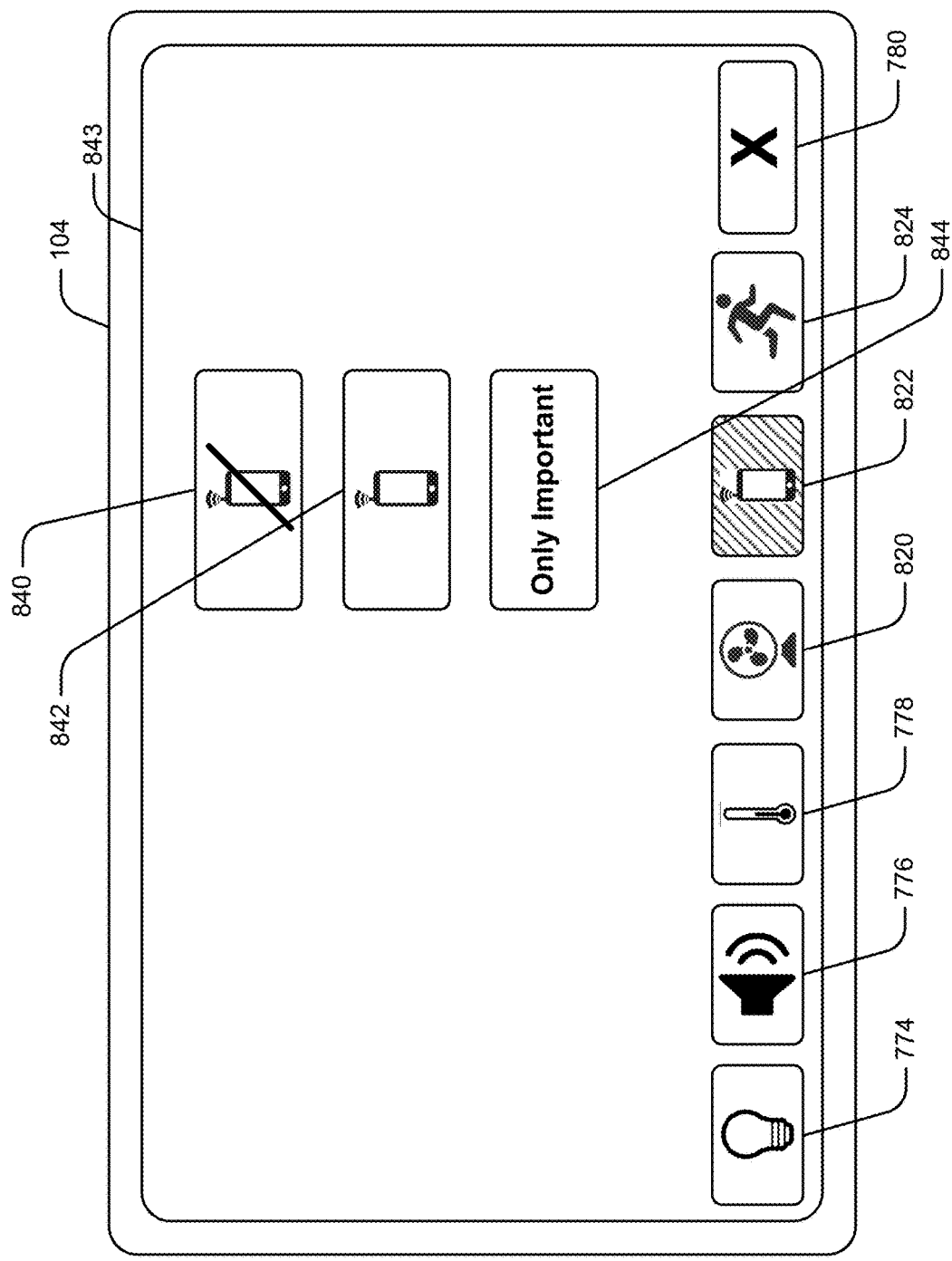
FIG. 31 is similar to FIG. 27, albeit showing a screen shot for selecting notice settings for a space during a space experience.

Referring specifically to FIG. 27, the screen shot 770 presented via device 104 (see also 104 in FIGS. 1 and 2) will include, in at least some embodiments, a persistent ribbon of tool icons along a lower edge which is always presented when the environment control functionality of the control device 104 is accessed so that any user will be familiar with how to access and use the tools. In FIGS. 27 through 29 an abbreviated set of three tool icons is presented that includes a light control icon 774, a sound control icon 776 and a temperature control icon 778. An exit icon 780 is also provided in the lower right hand corner of the screen shot that can be selected to return to the Room Wizard scheduling screen or some other general control interface in the case of some other control system.

When light control icon 774 is selected, the screen shot 770 in FIG. 27 is presented which includes fourteen different light color option icons (three labeled 772) and a light off icon 782. Each color option icon can be selected to change the color of light generated by the light devices within an associated space. Off icon 782 can be selected to turn off the light in the space. In addition, in at least some embodiments screen shot 770 will include a light intensity icon 771 and icons 773, 775 and 777 that can be used to select light pulsing characteristics for space lighting devices. Icon 771 is a slide button type icon where a user can select different points along the length of the icon to change light intensity along a range between a low level and a maximum level. The pulsing characteristic icons include a stead state or non-pulsing icon 773, a smooth pulsing icon 775 and an icon 777 that ties light pulsing to sound of a current sound track being played within an associated space. Non-pulsing icon 773 is selectable to have a steady light intensity set by icon 771. Smooth pulsing icon 775 sets the pulsing effect to follow a sinusoidal pattern where light intensity is faded on and off in a continuous pattern. Icon 777 is selectable to set the pulsing to follow the pattern of sound generated by a currently playing sound track. As the light control icons are selected, the light generated in the associated space may be controlled to present the selected light effect so that the user can see the effect selected and hunt for an optimized setting.

Referring to FIG. 28, when sound icon 776 is selected, a screen shot 790 presents sound control icons including sound track icons (four labeled 792), volume control icons 794 and 796 and a mute control icon 798. Each of the sound track icons 792 includes a text label that indicates the type of sound track generated. For instance, exemplary labels include a "city walk" icon, a "riverbank" icon, a "north woods" icon, etc., that are associated with different sound tracks. Icons 794 and 796 can be used to increase or decrease the volume of a selected sound track and icon 798 can be used to turn a selected sound track on and off.

Referring to FIG. 29. When temperature icon 778 is selected, a screen shot 800 for controlling space temperature is presented that includes "warmer", "normal" and "cooler" icons 802, 804 and 806, respectively. The temperature within an associated space can be controlled using the icons 802, 804 and 806. Here, the normal icon 804 may correspond to a preset or default temperature such as, for instance, 74 degrees and can be selected to revert back to the default setting.

In other embodiments additional space control icons may be presented within the ribbon of control icons along the bottom edge of the space control interface. For instance, see in FIG. 30 that additional control icons 820, 822 and 824 are included in the lower tool bar or tool ribbon. Icon 820 is an air circulation icon which can be selected to present the circulation control screen shot 825 that includes "off", "normal" and "high" icons 826, 828 and 830, respectively. Icons 826, 828 and 830 can be selected to turn off air circulation, revert back to a default circulation setting and increase air circulation, respectively, within an associated space.

Icon 822 is a notice control icon which can be selected to control electronic notifications such as e-mails, texts, social updates, etc., to a space user during a space experience or during a phase of one of the experiences. For instance, during the activity phase of a rest space experience, a space user likely would not want any electronic notifications/disturbances but the user may want all electronic notifications or updates received during a rest activity to be presented immediately at the end of the rest activity and during the emerge phase of an experience. Icon 822 can be used to control notifications. When icon 822 is selected, screen shot 839 may be presented including notice control icons 840, 842 and 844. Icon 840 can be selected to turn off all electronic notifications to the user in the space. Icon 842 can be used to turn on notifications to the user. Icon 844 can be selected to selectively activate notifications. For instance, a space user may always want to receive notifications from the user's boss regardless of any activity the user is participating in. A set of message senders that are particularly important may be associated with icon 844 in the system database 130 for each system user so that notifications from any of those users are receivable within an associated space while notifications from others are blocked.

When a notice icon is selected from screen shot 839, an indication of the selection is sent to system server 102 which uses the selection to control notice to the user in the space accordingly. Here, server 102 may send wireless signals to user devices within an associated space causing those devices to enter a no notice mode so that those devices do not provide notice during an experience or during one or more phases of an experience. At the end of a no notice phase, all notices received during the no notice phase may be provided as if they were received at that time.

Figure 32:
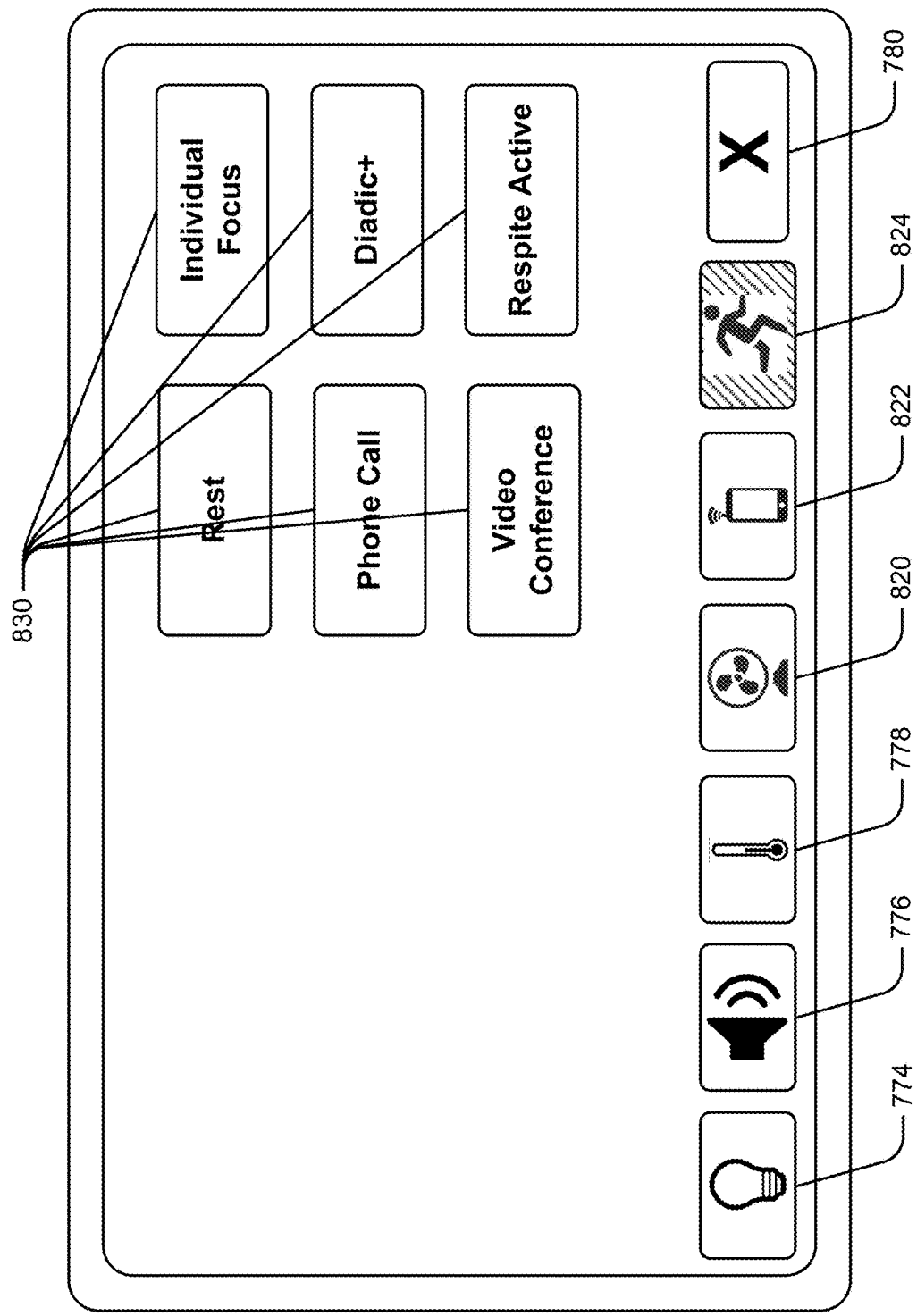
FIG. 32 is similar to FIG. 27, albeit showing a screen shot for selecting a space experience to be presented within a space.

Referring to FIG. 32, an activity icon 824 can be selected to select a session experience other than a default experience associated with a specific space. To this end, when icon 824 is selected, a screen shot 843 may be presented that lists different space experiences as selectable icons 830 including, for instance, a "rest" icon, an "individual focus" icon, a "dyadic+" icon, etc. Here, for instance, if a space is optimized for individual focus but a user wants to use the space to facilitate a rest space experience, the user may select the "rest" icon to cause server 102 to control the space experience during a session to present the rest experience instead of the individual focus experience. In this case, while the space may be optimized for individual focus, the affordances may nevertheless be controlled to facilitate a rest experience and server 102 simply controls the affordances within the space accordingly.

In at least some embodiments a space may not include a dedicated space control device like 104. In these cases it is contemplated that the functionality of the space control device 104 described above may be provided via portable user devices like smart phones, tablet computing devices, laptops, etc. Here, for instance, when a user is proximate or within a specific space, the system may enable the user to access a space control program that presents screen shots akin to the screen shots described above with respect to FIGS. 27 through 32 for customizing space experiences.

In at least some embodiments when space characteristics are set via interface screen shot 770, the space characteristics may remain as set during an entire space session. For instance, where light characteristics are set by a user during a welcome phase of a rest experience, the light characteristics may remain set until the end of the rest experience without cycling through different activity and emerge phases. In other embodiments it is contemplated that users will always want an emerge phase to indicate that a session period is nearing an end and to help transition the users out of the space. In these cases, user set light and other characteristics may persist from the time set through the activity phase of a space experience and the emerge phase may always occur per the default settings. In still other cases user light and other characteristic settings may be set only for a specific phase of a space experience and the settings may revert to default settings at the end of a current phase.

It has also been recognized that a space user may perceive that a specific set of space characteristics are optimal for the specific user. For instance, a user may perceive that a specific set of space characteristics set during a rest activity phase of an experience were particularly effective. In this case, instead of requiring the user to remember the settings and reselect the settings the next time the user participates in a rest space experience, the system enables each user to store their preferred and customized settings for any of the space experiences. For instance, a user may customize settings for a rest space experience and each time the user participates in a rest space experience thereafter in any space, the user's preferred phase settings may be replicated automatically. Thus, the next time a user claims or uses a space for a rest experience, the customized experience would be presented without requiring the user to set or select any settings. In this case, for example, a user may use a first space in a first facility for a rest experience on Monday and may use a second space in a second completely different facility for a rest experience on Friday and the same rest experience customized for the specific user may be presented in each space automatically.

Figure 33:
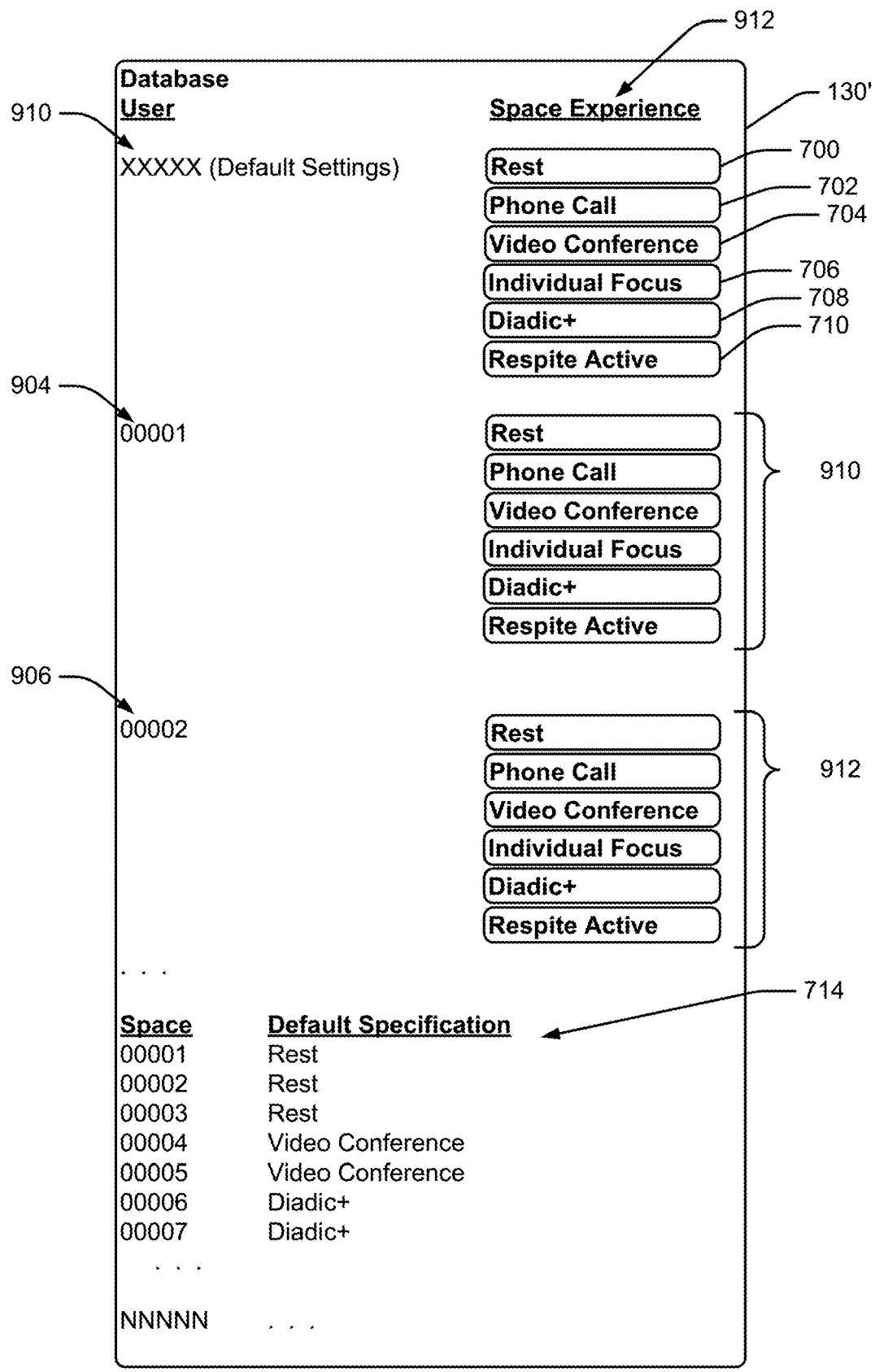
FIG. 33 is similar to FIG. 24, albeit showing a database including space experience specifications that are customized for different space users.

To enable a user to save a customized particular type of space experience, referring again to FIG. 27, a control interface may present a "save" icon 799 that can be selected to save the settings associated with a current space experience for the specific user. Here, after all characteristics for an experience have been set via the interface screen shots (e.g., FIGS. 27 through 32), the settings are stored for the user in the system database 130 (see again FIG. 1). See also FIG. 33 that shows an exemplary database 130' that, in addition to including the default space experience settings, also includes user specific settings 910, 912, etc., for at least a subset of users 904, 906, etc., that have customized settings for one or all of the possible space experiences. In this case each of the specifications in a space experience column 902 would be similar to the specifications described above with respect to FIGS. 25 and 26, albeit having different and customized selected settings where the settings have been changed from the default settings and saved. Here, many of the user specific settings in the specifications may be similar to the default settings as a user will often times like the default settings for some experiences or phases of experiences while only wanting to customize other settings.

In at least some embodiments it is contemplated that an invite phase may include different sub-phases to indicate status of a space prior to a user actually assuming control of or claiming the space for a session. For instance, where a first space is scheduled for use at 10 AM, server 102 may be programmed to control lighting in the space to present a standard invite phase (e.g., pulsing green light) within the space until fifteen minutes prior to the scheduled time (e.g., until 9:45 AM) and then the pulsing light may change to steady state green light for the 15 minute period preceding the scheduled use to indicate to perspective user's in the area that the space is only available for a relatively short period. Then, at 10 AM, if no user has assumed control of the space, server 102 may be programmed to start the welcome phase of the scheduled experience by changing the color of light associated with the space to warm orange/yellow, fade in a programmed sound track and adjust other parameters per the experience specification. If no one arrives in and assumes control of the space within a period (e.g., 10 minutes) of the start of the scheduled session, server 102 may perform some automated process designed to free up the space for others to use. In this regard, for instance, at 10:10 AM server 102 may change the space light again to a steady green and may discontinue the sound track. This change of conditions should prompt a user that intends to take control of the space to do so. This intermediate set of conditions may be presented for another short period (e.g., 5 minutes) after which server 102 may revert back to the invite phase so that other users in the area of the space can see that the space is available for use.

In at least some cases where one or more specific users are scheduled to use a specific space during a specific period, if other users are sensed within the space and the specific users are not sensed within the space, server 102 may be programmed to change conditions within the space to indicate that someone else has reserved the space during the period. For instance, where each space user includes a personal RFID badge, smart phone, tablet, or the like from which user identity can be determined, if users other than scheduled users are in a space, the server 102 may cause lighting in the space to turn bright red to indicate that the space is reserved for use by some other user.

While the system described above is described as one wherein invite phases for spaces used for different space experiences are similar (e.g., pulsing green light to invite use), in at least some embodiments the invite phase characteristics of spaces earmarked or optimized for different space experiences may be different so that users searching for specific experiences can fine optimized space for those experiences. For instance, all spaces optimized for facilitating a rest experience may pulse green to invite use while all spaces optimized for individual focused experiences may pulse red and still other spaces optimized for dyadic activities may pulse orange.

In at least some cases it is contemplated that a user that intends to use a space may indicate a specific space experience that the user would like and server 102 may control invite phases to, in effect, highlight spaces that are optimized or that are available for the specific experience. For instance, where there are thirty different spaces in an area and five of those spaces are optimized for rest space experiences, a user may use an application on the user's tablet or smart phone device to indicate that the user want a rest space experience. Upon receiving the request for a rest experience and identifying the location of the user in the general area, server 102 may be programmed to control space affordances only in available spaces optimized for rest experiences to present invite environments. In this case the user can simply walk about the space and identify one of the spaces presenting the invite environment and can assume control or use thereof in the way that is supported by the specific system (e.g., RFID reading, entering the space and closing the door, a verbal command within the space to take control, etc.).

In cases where a space user selects a space experience for a specific space where a different available space is better suited for the experience, server 102 may present an indication that the other space is better suited for the experience. For instance, referring again to FIG. 32, where a user uses an interface to select the "individual focus" icon for a first space that is optimized for dyadic activities and a second space in the near vicinity that is optimized for individual focus is available, server 102 may present a message via device 104 asking the user to consider the other space. The message may simply be a notice or may include a scheduling tool so that the user can select the other space for a session to reserve the space as the user moves to the location of the other space. Here, if the user schedules the second space, the color of light in the second space may be controlled to indicate that eh space has been claimed and will be used during a coming session.

In some cases space experiences may be programmed to mirror the natural light patterns people experience in nature. For instance, at the beginning of a rest period, light may fade from warm orange/yellow to dark blue to mimic the changing from day light to evening light. Here, at the beginning of an emerge phase, light may fade from dark blue to warm orange/yellow to mimic a sun rise. The fading from blue to the warm color may start with one light device and spread throughout a space to further mimic a rising sun. For instance, in a case where all walls that define a space are light emissive, centrally located LEDs along a lower edge of a first wall 466 may be controlled to fade from blue to orange/yellow initially followed by the laterally located LEDs along the lower edge of the first wall 466, followed by LEDs along the lower edge of the other two walls (e.g., 464) adjacent first wall 466 and that are near the side edges of the other two walls adjacent wall 466 and then followed by the LEDs in wall 462.

As another instance, where a space include light emissive walls as well as a central globe type light device 193 as in FIG. 2 where each light device is capable of generating virtually any color light, the globe light device 193 may at the end of a rest phase, fade slowly from dark blue to a warm orange/yellow. Here, as the globe light device color fades to warm, light generated by the light emissive walls may fade similarly and uniformly from dark blue to the warm orange/yellow to simulate a sun coming up. In other cases the fading to warm orange/yellow may be non-uniform with the portions of adjacent walls fading more quickly to the warm orange/yellow color than do other portions of the walls. For example, in FIG. 2, because globe 193 is proximate wall 222, wall 222 or portions thereof may fade to warm orange/yellow more rapidly than portions of wall 224. In a similar fashion, where multiple speakers are present proximate space 220, sound may fade in and out non-uniformly to give the effect of spreading sound within the space.

In still other cases where a space includes a display screen 200 (see again FIG. 2), a video of a sun rising or setting may be presented during a phase change and the lighting in the space may be controlled to simulate how light fills a space during such an activity.

During any of the experience phases, server 102 may be programmed to detect other intermediate triggers and to present other non-persistent characteristic sets. For instance, during the activity phase of a rest space experience, if a user stands up in an associated space (e.g., to get something out of a book bag), images from a camera in the space may be examined to determine that the user is standing and server 102 may control the space affordances in a way designed to help the user. For example, when the user stands, server 102 may change lighting of at least a subset of light devices within the space to help the user see within the relatively dark space. As another example, during individual focus activity where light is bright on a work surface but dimmed throughout the rest of a space, server 102 may increase the intensity of ambient light generally in the space if the user stands up, if a second person enters the space or if a door to the space is opened. In either of the above cases, if the intermediate condition ceases (e.g., the user sits down, the second person leaves the space, etc.), server 102 control may revert back to the phase characteristics specified for a specific space and/or a specific user.

While at least some embodiments of the present disclosure contemplate essentially completely automatic systems where space experiences are presented with little or no specific controlling activities by a user, in other cases more specific controlling actions may also operate as triggers for experiences, phase changes, etc. To this end, referring again to FIG. 2, in at least some cases a system server 102 may be programmed to examine images from camera 116 to identify controlling gestures for starting an experience, changing experience phases, etc. For instance, cameras 116 may each include a Kinect type camera and processor from Microsoft Corporation that can distinguish gestures and generate control commands associated therewith. In this case, when a user enters a space, the user may signal a desire to control and use the space during a session by performing some gesture (e.g., form a circle in the air) within the field of view of at least one of the cameras 116. As another instance, microphone 139 may be useable to obtain verbal commands from a space user (e.g., "start rest experience") that can be used to start an experience or change experience phases.

While the systems described above include speakers, microphones and, in some cases, space control devices 104, in at least some other embodiments a smart phone, tablet type computing device, etc., may be used to provide those components. For instance, once a space user's personal device (see 600 in FIG. 21) is associated with a space 530, any audio to be presented to the space user as part of a space experience may be provided via a speaker in the user's device 600. Similarly, the microphone in the device 600 may be used to obtain verbal commands from a space user and to provide the verbal commands via a wireless access point to the system server 102 (see again FIG. 1). For instance, if a space user wants to start a rest space experience upon entering a space, after associating the user's device 600 with the space, the user may verbally request a rest session via device 600 which in turn sends the verbal request to the system server. Thus, in at least some embodiments a personal device 600 may operate as a space microphone, a space speaker, a space control device akin to control device 104 for scheduling space use, setting affordance settings and selecting space experiences, a user identifying device enabling the system server to establish the identify of a system user in a space and allocation beacon useable with access points or the like to generate data useable to triangulate the location of a user device within an area and more specifically proximate one of the spaces within an area.

Referring again to FIG. 1, in some embodiments it is contemplated that most if not all of the functions described above with respect to server 102 may be performed by a portable personal device 110 (e.g., a tablet type device) running an application to generate control signals transmitted to control system 150 for controlling space affordances per default or customized space experience specifications. Thus, for instance, when a user enters a space and the user's device is spatially associated (either automatically or via some process performed by the user) with a specific space, user's device may identify the space that it is associated in, identify affordance associated with the space, ascertain the space experience to be presented by the space or an experience requested by the user and then transmit control signals to control system 150 for controlling the space. Any triggers sensed by sensors (e.g., 112, 114, 116, etc.) within the space may cause trigger signals to be sent to the user's portable device which the device then uses to control the space affordances accordingly. Here, an interface like the interfaces shown in FIGS. 27 through 32 may be presented to the user via the user's device for controlling the affordances differently than defined in the specifications and changes to affordance control may be stored in updated specifications for subsequent use.

In at least some cases panel light devices may be replaced by display screens that can generate virtually any light color.

In some cases a welcome phase may include playing an audible welcome message to a user in a space or presenting a welcome message via a display screen if one exists within the space. The welcome message may also invite the user to take some other action to transition to the experience to be facilitated within the space. For instance, in some cases the system may require a user to place an RFID card or other device within the reading range of an RFID reader device (see 108 in FIG. 2). Here, the welcome message may instruct the user to swipe an ID tag in front of the reader 108 to claim the space for a period.

It should be appreciated from the above description that environmental factors or conditions may be controlled as a function of various factors and inputs, some being simple actions or activities that are not dedicated to initiating control but that are used as proxies to start some control action and others that are specifically dedicated to initiating control. For instance, presence of a personal portable device within a space may operate as a control trigger in some cases while in other cases some dedicated action may be required to initiate a control activity.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims. To apprise the public of the scope of this invention, the following claims are made:

What is claimed is:

1. A method for automatically controlling presentation of digital content on an emissive surface within a facility space, the method for use with a first facility space that includes at least a first user sensor and at least an emissive surface, the user sensor for detecting location and facing directions of users within the facility space, the emissive surface for presenting digital content to users within the facility space, the method comprising the steps of:
    detecting a first user location and facing direction within the facility space;
    based on the first user location and facing direction within the facility space, identifying a first portion of the emissive surface on which to present digital content wherein the first portion is less than the entire emissive surface; and
    presenting digital content on the identified first portion of the emissive surface.

2. The method of claim 1 wherein the at least a first portion of the emissive surface includes a portion of the emissive surface that is positioned adjacent the first user location and along the trajectory of the first user facing direction within the facility space.

3. The method of claim 2 wherein the emissive surface includes first and second emissive surfaces that face in first and second different directions within the first facility space, respectively, the method further including, persistently tracking the location and facing direction of the first user while the first user remains within the first facility space and, upon the first user changing position within the first facility space from facing the first emissive surface to facing the second emissive surface, presenting the digital content on a first portion of the second emissive surface.

4. The method of claim 3 wherein the digital content is removed from the first portion of the first emissive surface when presented on the first portion of the second emissive surface.

5. The method of claim 1 wherein the at least a first user sensor further detects second user presence within the first facility space and the method further includes modifying at least one aspect of the digital content presented on the emissive surface based on second user presence within the first facility space.

6. The method of claim 5 wherein the step of modifying includes removing the digital content from the emissive surface.

7. The method of claim 5 wherein the step of modifying includes changing the dimensions of the first portion of the emissive surface so that the digital content is presented in a smaller format on the emissive surface.

8. The method of claim 5 wherein the step of modifying includes moving the digital content to a second portion of the emissive surface that is different than the first portion of the emissive surface.

9. The method of claim 8 wherein the emissive surface is supported by a wall that in part defines the first facility space and wherein the second user location is determined to be between the first user and the emissive surface, the step of moving the digital content to a second portion of the emissive surface including identifying a portion of the emissive surface which is not blocked by the second user within the first facility space.

10. The method of claim 1 further including the steps of:
    subsequent to detecting the first user location and facing direction, detecting a second user location and facing direction within the facility space;
    based on the second user location and facing direction within the facility space, identifying a second portion of the at emissive surface on which to present digital content wherein the second portion does not overlap the first portion; and
    presenting digital content on the identified second portion of the emissive surface.

11. The method of claim 10 wherein the digital content presented on the second portion is identical to the digital content presented on the first portion.

12. The method of claim 10 wherein the at least a first portion of the emissive surface includes a portion of the first emissive surface that is positioned adjacent the first user location and along the trajectory of the first user facing direction within the facility space and wherein the at least a second portion of the emissive surface includes a portion of the emissive surface that is positioned adjacent the second user location and along the trajectory of the second user facing direction within the facility space.

13. The method of claim 12 wherein the emissive surface includes first and second emissive surfaces that face in opposite directions and wherein the first portion of the emissive surface includes a first portion of the first emissive surface and the second first portion of the emissive surface includes a first portion of the second emissive surface.

14. The method of claim 13 wherein the first portion of the second emissive surface is selected so that the first user does not obstruct the second user's view of the first portion of the second emissive surface.

15. The method of claim 1 wherein the at least a first user sensor includes a camera, the step of detecting including obtaining camera images including the first user and identifying the first user location and facing direction within the camera images.

16. The method of claim 1 further including a database storing digital content associated with the first user, the method further including, upon detecting the first user within the first facility space, determining the first user's identity, accessing the digital content associated with the first user and presenting the digital content via the first portion of the emissive surface.

17. The method of claim 1 wherein the first facility space includes a lounge chair facing the emissive surface and at least one light device, the method further including detecting that the first user sits in the lounge chair and, upon the first user sitting in the lounge chair, controlling the light device to change intensity of light generated thereby.

18. The method of claim 17 wherein the step of presenting digital content include presenting the digital content upon detecting that the user sits in the lounge chair.

19. A method for automatically controlling presentation of digital content on an emissive surface within a facility space, the method for use with a first facility space that includes at least a first user sensor and at least first and second oppositely facing emissive surfaces located along opposite peripheral edges of the first facility space, the user sensor for detecting locations and facing directions of users within the facility space, the emissive surfaces for presenting digital content to users within the facility space, the method comprising the steps of:
  detecting a first user location and facing direction within the facility space;
  based on the first user location and facing direction within the facility space, identifying a first portion of one of the first and second emissive surfaces on which to present digital content wherein the first portion is less than the entirety of the one of the first and second emissive surfaces; and
  presenting digital content on the identified first portion of the one of the first and second emissive surfaces.

20. A method for automatically controlling presentation of digital content on an emissive surface within a facility space, the method for use with a first facility space that includes at least a first user sensor and at least an emissive surface, the user sensor for detecting location and facing directions of users within the facility space, the emissive surface for presenting digital content to users within the facility space, the method comprising the steps of:
  detecting a first user location and facing direction within the facility space;
  detecting a second user location within the facility space which is between the first user location and the emissive surface;
  based on the first user location and facing direction within the facility space and the location of the second user within the facility space, identifying a first portion of the emissive surface on which to present digital content wherein the first portion positioned with respect to the first and second users such that the first user's view of the first portion is unobstructed by the second user within the first facility space.

* * * * *